US011982433B2

(12) United States Patent
Lys et al.

(10) Patent No.: US 11,982,433 B2
(45) Date of Patent: May 14, 2024

(54) FLUID-COOLED LED-BASED LIGHTING METHODS AND APPARATUS IN CLOSE PROXIMITY GROW SYSTEMS FOR CONTROLLED ENVIRONMENT HORTICULTURE

(71) Applicant: Agnetix, Inc., San Diego, CA (US)

(72) Inventors: Ihor Lys, La Jolla, CA (US); Nicholas Maderas, Richmond, CA (US)

(73) Assignee: Agnetix, Inc., San Diego, CA (US)

( * ) Notice: Subject to any disclaimer, the term of this patent is extended or adjusted under 35 U.S.C. 154(b) by 0 days.

(21) Appl. No.: 17/238,044

(22) Filed: Apr. 22, 2021

(65) Prior Publication Data

US 2021/0278072 A1    Sep. 9, 2021

Related U.S. Application Data

(63) Continuation of application No. PCT/US2020/064837, filed on Dec. 14, 2020.
(Continued)

(51) Int. Cl.
*F21V 29/51* (2015.01)
*A01G 9/24* (2006.01)
(Continued)

(52) U.S. Cl.
CPC .............. *F21V 29/51* (2015.01); *A01G 9/249* (2019.05); *F21S 4/28* (2016.01); *F21V 29/503* (2015.01);
(Continued)

(58) Field of Classification Search
CPC ........ F21V 29/51; F21V 29/503; F21V 29/56; F21V 23/06; F21S 4/28; A01G 9/249;
(Continued)

(56) References Cited

U.S. PATENT DOCUMENTS 3,869,605 A    3/1975    Davis
4,300,623 A    11/1981    Meckler
(Continued)

FOREIGN PATENT DOCUMENTS

CA    2632307 A1    11/2009
CN    101636076 A    1/2010
(Continued)

OTHER PUBLICATIONS

LED Application. Odtech 2014. Accessed at http://www.od-tech.com/eng/sub1/s42.php?PHPSESSID=64d5029f1b80d6df54ab87468d7f9172 on Apr. 23, 2018, 1 page.
(Continued)

*Primary Examiner* — Tsion Tumebo
(74) *Attorney, Agent, or Firm* — Smith Baluch LLP

(57) ABSTRACT

A lighting fixture includes a frame, one or more LED light sources to emit radiation, control circuitry to receive AC power and control the one or more LED light sources, and a coolant pipe to carry a fluid coolant. The lighting fixture further includes a tube and end caps that together form an enclosed cavity to contain the frame, the LED light sources, and the control circuitry. In example implementations, the tube does not physically contact the frame, the LED light sources, and the control circuitry. The cavity may further contain air, gas, or vacuum that forms a thermal barrier between the tube and the LED light sources to reduce heat dissipation from the LED light sources to the environment. The tube may further enable the lighting fixture to be rotatably and/or translationally adjustable relative to a support structure after installation in a close proximity grow system.

50 Claims, 59 Drawing Sheets

Related U.S. Application Data

(60) Provisional application No. 62/947,538, filed on Dec. 12, 2019.

(51) Int. Cl.
  *F21S 4/28* (2016.01)
  *F21V 29/503* (2015.01)
  *F21V 29/56* (2015.01)
  *F21V 29/57* (2015.01)
  *F21V 29/58* (2015.01)
  *F21W 131/109* (2006.01)
  *F21Y 103/10* (2016.01)
  *F21Y 113/13* (2016.01)
  *F21Y 115/10* (2016.01)

(52) U.S. Cl.
  CPC .............. *F21V 29/56* (2015.01); *F21V 29/57* (2015.01); *F21V 29/58* (2015.01); *F21V 29/59* (2015.01); *F21W 2131/109* (2013.01); *F21Y 2103/10* (2016.08); *F21Y 2113/13* (2016.08); *F21Y 2115/10* (2016.08)

(58) Field of Classification Search
  CPC . A01G 7/045; F21Y 2113/13; F21Y 2103/10; F21Y 2115/10; F21W 2131/109
  See application file for complete search history.

(56) References Cited

U.S. PATENT DOCUMENTS

| | | | | |
|---|---|---|---|---|
| 4,947,291 | A | 8/1990 | McDermott | |
| 5,012,609 | A | 5/1991 | Ignatius et al. | |
| 6,431,723 | B1 | 8/2002 | Schubert et al. | |
| 6,683,970 | B1 | 1/2004 | Satake et al. | |
| 6,880,952 | B2 * | 4/2005 | Kiraly | F21V 29/74 362/373 |
| 7,095,053 | B2 | 8/2006 | Mazzochette et al. | |
| 7,252,408 | B2 | 8/2007 | Mazzochette et al. | |
| 7,339,660 | B1 | 3/2008 | Cohn et al. | |
| 7,456,733 | B2 | 11/2008 | Joy et al. | |
| 7,635,205 | B2 | 12/2009 | Yu et al. | |
| 7,905,051 | B2 | 3/2011 | Lysa | |
| 7,933,060 | B2 | 4/2011 | Ishii et al. | |
| 8,033,688 | B2 * | 10/2011 | Warton | F21V 19/008 362/418 |
| 8,177,388 | B2 * | 5/2012 | Yen | F21V 19/02 362/225 |
| 8,192,053 | B2 | 6/2012 | Owen et al. | |
| 8,297,782 | B2 | 10/2012 | Bafetti et al. | |
| 8,358,097 | B2 | 1/2013 | Cartwright | |
| 8,373,361 | B2 | 2/2013 | Smits et al. | |
| 8,390,454 | B2 | 3/2013 | Lyon et al. | |
| 8,558,413 | B1 | 10/2013 | Lepard | |
| 8,651,704 | B1 | 2/2014 | Gordin et al. | |
| 8,668,350 | B2 | 3/2014 | Wells et al. | |
| 8,752,978 | B2 * | 6/2014 | Bloom | H05B 45/52 362/249.02 |
| 8,757,832 | B2 * | 6/2014 | Kim | F21K 9/27 362/249.02 |
| 8,764,221 | B2 * | 7/2014 | Chiang | F21V 19/008 362/249.02 |
| 8,850,742 | B2 | 10/2014 | Dube | |
| 8,920,001 | B2 | 12/2014 | Part | |
| 8,967,825 | B2 * | 3/2015 | Fukui | F21V 23/006 362/373 |
| 9,137,874 | B2 | 9/2015 | Maxik et al. | |
| 9,310,027 | B2 | 4/2016 | Wells | |
| 9,310,049 | B2 | 4/2016 | Wells | |
| 9,392,753 | B2 | 7/2016 | Krijn et al. | |
| 9,404,648 | B2 | 8/2016 | Druchinin | |
| D768,901 | S | 10/2016 | Hillberg et al. | |
| 9,516,822 | B2 | 12/2016 | Gonyer et al. | |
| 9,644,828 | B1 * | 5/2017 | May | F21S 4/28 |
| 9,688,951 | B2 | 6/2017 | Krenbrink et al. | |
| 9,693,512 | B2 | 7/2017 | Chen et al. | |
| 9,857,068 | B2 | 1/2018 | Nguyen et al. | |
| 10,021,838 | B1 | 7/2018 | Gustafik | |
| 10,034,435 | B2 | 7/2018 | Helene et al. | |
| 10,161,568 | B2 * | 12/2018 | Amrine, Jr. | F21V 23/023 |
| 10,175,215 | B2 | 1/2019 | Ozcan et al. | |
| 10,188,046 | B2 | 1/2019 | Wik et al. | |
| 10,261,493 | B2 | 4/2019 | Hillberg et al. | |
| 10,339,380 | B2 | 7/2019 | Greenberg et al. | |
| 10,426,099 | B2 | 10/2019 | Clendinning et al. | |
| 10,512,221 | B2 | 12/2019 | Wells | |
| 10,517,226 | B2 | 12/2019 | Lee | |
| 10,555,466 | B2 | 2/2020 | Gonyer et al. | |
| 10,627,785 | B2 | 4/2020 | King et al. | |
| 10,635,274 | B2 | 4/2020 | Greenberg et al. | |
| 10,660,170 | B2 | 5/2020 | Wells | |
| 10,674,677 | B2 | 6/2020 | Pohjanvouri et al. | |
| 10,750,671 | B2 | 8/2020 | Wik et al. | |
| 10,842,082 | B1 | 11/2020 | Genga, Jr. et al. | |
| 10,856,470 | B2 | 12/2020 | Lys et al. | |
| 10,881,051 | B2 | 1/2021 | Lys et al. | |
| 10,925,219 | B2 | 2/2021 | Nguyen et al. | |
| 10,949,974 | B2 | 3/2021 | King et al. | |
| 10,959,383 | B2 | 3/2021 | Lys | |
| 10,999,976 | B2 | 5/2021 | Lys et al. | |
| 11,013,078 | B2 | 5/2021 | Lys et al. | |
| 11,044,854 | B2 | 6/2021 | Lys et al. | |
| 11,076,536 | B2 | 8/2021 | Lys et al. | |
| 11,193,653 | B1 * | 12/2021 | Dijkstra | F21V 15/015 |
| 11,266,081 | B2 | 3/2022 | Lys et al. | |
| 11,272,589 | B2 | 3/2022 | Lys et al. | |
| 11,310,885 | B2 | 4/2022 | Lys et al. | |
| 11,678,422 | B2 | 6/2023 | Lys et al. | |
| 2003/0216837 | A1 | 11/2003 | Reich et al. | |
| 2004/0120156 | A1 | 6/2004 | Ryan | |
| 2005/0103473 | A1 | 5/2005 | Todd et al. | |
| 2005/0152143 | A1 | 7/2005 | Lee et al. | |
| 2005/0162850 | A1 * | 7/2005 | Luk | F21S 4/26 362/227 |
| 2007/0033999 | A1 | 2/2007 | Bothe et al. | |
| 2008/0061717 | A1 | 3/2008 | Bogner et al. | |
| 2008/0205030 | A1 | 8/2008 | Hargreaves | |
| 2009/0027888 | A1 | 1/2009 | Yu et al. | |
| 2009/0040759 | A1 | 2/2009 | Zhang et al. | |
| 2010/0102729 | A1 * | 4/2010 | Katzir | F21V 23/006 315/297 |
| 2010/0201239 | A1 * | 8/2010 | Mostoller | F21V 23/06 313/1 |
| 2010/0321950 | A1 | 12/2010 | Wong | |
| 2011/0037369 | A1 | 2/2011 | Van Elmpt | |
| 2011/0075416 | A1 * | 3/2011 | Chou | F21V 29/70 362/373 |
| 2011/0153093 | A1 | 6/2011 | Aidun | |
| 2012/0033431 | A1 * | 2/2012 | Martinez | H05K 13/04 362/294 |
| 2012/0162976 | A1 | 6/2012 | Claeys | |
| 2012/0211201 | A1 | 8/2012 | Kunstwadl et al. | |
| 2012/0250302 | A1 * | 10/2012 | Edwards | F21V 31/005 362/223 |
| 2012/0257375 | A1 | 10/2012 | Tickner et al. | |
| 2013/0000185 | A1 * | 1/2013 | Tanase | A01G 9/249 362/249.02 |
| 2013/0003382 | A1 * | 1/2013 | Ohura | A01G 9/249 362/253 |
| 2013/0006401 | A1 | 1/2013 | Shan | |
| 2013/0048879 | A1 | 2/2013 | Clark | |
| 2013/0057247 | A1 | 3/2013 | Russell et al. | |
| 2013/0293156 | A1 | 11/2013 | Wells | |
| 2014/0009926 | A1 * | 1/2014 | Simon | F21V 23/02 362/217.13 |
| 2014/0042915 | A1 | 2/2014 | Ono et al. | |
| 2014/0092255 | A1 | 4/2014 | Choiniere et al. | |
| 2014/0259920 | A1 | 9/2014 | Wilson | |
| 2014/0301067 | A1 | 10/2014 | Morgan | |
| 2015/0003070 | A1 * | 1/2015 | Medendorp, Jr. | F21K 9/60 362/294 |

(56) References Cited

U.S. PATENT DOCUMENTS

| | | | |
|---|---|---|---|
| 2015/0092404 A1* | 4/2015 | Kim | F21V 29/506 362/227 |
| 2015/0250106 A1 | 9/2015 | Wik et al. | |
| 2015/0254738 A1 | 9/2015 | Wright, III et al. | |
| 2015/0313092 A1 | 11/2015 | Pocock et al. | |
| 2015/0356894 A1 | 12/2015 | Petrocy et al. | |
| 2015/0377427 A1* | 12/2015 | Richert | F21V 21/005 362/218 |
| 2016/0007424 A1 | 1/2016 | Maxik et al. | |
| 2016/0081178 A1 | 3/2016 | D'Onofrio | |
| 2016/0113211 A1 | 4/2016 | MacKenzie | |
| 2016/0113213 A1 | 4/2016 | Berinsky | |
| 2016/0183351 A1 | 6/2016 | Snyder et al. | |
| 2016/0209020 A1 | 7/2016 | Sprankle et al. | |
| 2016/0217562 A1 | 7/2016 | Ulman | |
| 2016/0235013 A1 | 8/2016 | Pohjanvouri et al. | |
| 2016/0262313 A1 | 9/2016 | Szeto et al. | |
| 2016/0278300 A1 | 9/2016 | Clendinning et al. | |
| 2016/0286747 A1 | 10/2016 | Matsumoto et al. | |
| 2016/0320951 A1 | 11/2016 | Ernst et al. | |
| 2016/0360712 A1 | 12/2016 | Yorio et al. | |
| 2016/0366833 A1 | 12/2016 | Pohjanvouri et al. | |
| 2017/0023193 A1 | 1/2017 | Thosteson et al. | |
| 2017/0055474 A1 | 3/2017 | Storey | |
| 2017/0074471 A1* | 3/2017 | Panek | F21V 17/12 |
| 2017/0074474 A1 | 3/2017 | Bailey | |
| 2017/0095639 A1 | 4/2017 | Trzecieski | |
| 2017/0134623 A1 | 5/2017 | Lee | |
| 2017/0142813 A1 | 5/2017 | Sahni et al. | |
| 2017/0146226 A1* | 5/2017 | Storey | F21V 17/002 |
| 2017/0208262 A1 | 7/2017 | Sheridan et al. | |
| 2017/0215252 A1 | 7/2017 | Wells | |
| 2017/0219711 A1 | 8/2017 | Redden et al. | |
| 2017/0231169 A1 | 8/2017 | Gillard et al. | |
| 2017/0241632 A1* | 8/2017 | Nguyen | F21V 29/59 |
| 2017/0244934 A1 | 8/2017 | Chien | |
| 2017/0303478 A1 | 10/2017 | Smith et al. | |
| 2017/0311414 A1 | 10/2017 | Kido et al. | |
| 2017/0339839 A1 | 11/2017 | Carstensen et al. | |
| 2018/0007845 A1 | 1/2018 | Martin | |
| 2018/0014485 A1 | 1/2018 | Whitcher et al. | |
| 2018/0042192 A1 | 2/2018 | Volpe et al. | |
| 2018/0054985 A1 | 3/2018 | Li | |
| 2018/0089843 A1 | 3/2018 | Miecznik | |
| 2018/0116025 A1* | 4/2018 | Adams | H05B 47/18 |
| 2018/0122099 A1 | 5/2018 | Lee | |
| 2018/0128472 A1 | 5/2018 | Nguyen et al. | |
| 2018/0177008 A1* | 6/2018 | Jiang | F21V 23/009 |
| 2018/0213735 A1 | 8/2018 | Vail et al. | |
| 2018/0242539 A1 | 8/2018 | Bhattacharya et al. | |
| 2018/0259550 A1 | 9/2018 | Nakamura et al. | |
| 2018/0295783 A1 | 10/2018 | Alexander et al. | |
| 2018/0309941 A1 | 10/2018 | Lopez et al. | |
| 2018/0313760 A1 | 11/2018 | Kramer et al. | |
| 2018/0363886 A1 | 12/2018 | Narayanaswamy et al. | |
| 2019/0008096 A1* | 1/2019 | Lee | A01G 7/045 |
| 2019/0364743 A1 | 1/2019 | Lys et al. | |
| 2019/0116739 A1 | 4/2019 | Lys et al. | |
| 2019/0141911 A1 | 5/2019 | Nguyen et al. | |
| 2019/0221044 A1 | 7/2019 | Motta et al. | |
| 2019/0234603 A1 | 8/2019 | Treible, Jr. et al. | |
| 2019/0234797 A1 | 8/2019 | Ramer et al. | |
| 2019/0244417 A1 | 8/2019 | Ashdown et al. | |
| 2019/0244428 A1 | 8/2019 | Greenberg et al. | |
| 2019/0246278 A1 | 8/2019 | Dorfman et al. | |
| 2019/0259108 A1 | 8/2019 | Bongartz et al. | |
| 2019/0303164 A1 | 10/2019 | King | |
| 2019/0338934 A1* | 11/2019 | Ray | F21K 9/27 |
| 2019/0353341 A1* | 11/2019 | Spiro | F21K 9/275 |
| 2019/0360941 A1 | 11/2019 | Ziltz | |
| 2020/0012852 A1 | 1/2020 | Ding | |
| 2020/0068810 A1 | 3/2020 | Pahlevaninezhad et al. | |
| 2020/0077598 A1 | 3/2020 | Wells | |
| 2020/0134741 A1 | 4/2020 | Bongartz et al. | |
| 2020/0163183 A1 | 5/2020 | Lys et al. | |
| 2020/0236862 A1 | 7/2020 | Lys et al. | |
| 2020/0236870 A1 | 7/2020 | Lys et al. | |
| 2021/0000097 A1 | 1/2021 | Marchesini et al. | |
| 2021/0059123 A1 | 3/2021 | Lys et al. | |
| 2021/0120748 A1 | 4/2021 | Lys et al. | |
| 2021/0321573 A1 | 10/2021 | Lys et al. | |
| 2021/0398281 A1 | 12/2021 | Lys et al. | |
| 2022/0053706 A1 | 2/2022 | Lys et al. | |

FOREIGN PATENT DOCUMENTS

| | | |
|---|---|---|
| CN | 101737694 A | 6/2010 |
| CN | 102016407 A | 4/2011 |
| CN | 201811100 U | 4/2011 |
| CN | 102287711 A | 12/2011 |
| CN | 102421281 A | 4/2012 |
| CN | 102811606 A | 12/2012 |
| CN | 103091296 A | 5/2013 |
| CN | 202955670 U | 5/2013 |
| CN | 203628582 U | 6/2014 |
| CN | 203656872 U | 6/2014 |
| CN | 203686764 U | 7/2014 |
| CN | 203872684 U | 10/2014 |
| CN | 104520636 A | 4/2015 |
| CN | 104981147 A | 10/2015 |
| CN | 105180018 A | 12/2015 |
| CN | 204929810 U | 1/2016 |
| CN | 105423198 A | 3/2016 |
| CN | 105717115 A | 6/2016 |
| CN | 105975777 A | 9/2016 |
| CN | 106151982 A | 11/2016 |
| CN | 205896799 U | 1/2017 |
| CN | 106402746 A | 2/2017 |
| CN | 106596412 A | 4/2017 |
| CN | 206132218 U | 4/2017 |
| CN | 206181943 U | 5/2017 |
| CN | 107091467 A | 8/2017 |
| CN | 107208871 A | 9/2017 |
| CN | 107807125 A | 3/2018 |
| CN | 107942955 A | 4/2018 |
| CN | 207369705 U | 5/2018 |
| DE | 202014105523 U1 | 2/2016 |
| DK | 2129212 T3 | 3/2016 |
| EP | 3123823 A1 | 2/2017 |
| EP | 3269231 A1 | 1/2018 |
| EP | 3281514 A1 | 2/2018 |
| EP | 3324099 A1 | 5/2018 |
| EP | 3326452 A1 | 5/2018 |
| EP | 3065535 B1 | 7/2020 |
| FR | 2173912 A1 | 10/1973 |
| JP | 2000207933 A | 7/2000 |
| JP | 2010192152 A | 9/2010 |
| JP | 2011054529 A | 3/2011 |
| JP | 2012217352 A | 11/2012 |
| JP | 2014209850 | 11/2014 |
| JP | 2015526104 | 9/2015 |
| JP | 2016504030 A | 2/2016 |
| JP | 2016214153 A | 12/2016 |
| KR | 10-0941000 B1 | 2/2010 |
| KR | 101020063 B1 | 3/2011 |
| KR | 101068315 B1 | 9/2011 |
| KR | 201125871 A | 9/2011 |
| KR | 1020120130897 A | 12/2012 |
| KR | 101234587 B1 | 2/2013 |
| KR | 20150033363 A | 4/2015 |
| KR | 20150035102 A | 4/2015 |
| KR | 20170021662 A | 2/2017 |
| KR | 10-1730069 B1 | 4/2017 |
| KR | 20170085194 A | 7/2017 |
| KR | 20170115987 A | 10/2017 |
| KR | 20170127406 A | 11/2017 |
| RU | 2010150292 A | 6/2012 |
| TW | 200926883 A | 6/2009 |
| TW | M 471005 U | 1/2014 |
| TW | 201501570 A | 1/2015 |
| WO | WO 2008/112822 | 9/2008 |
| WO | WO 2009/074602 A3 | 6/2009 |
| WO | WO 2012/067499 A1 | 5/2012 |
| WO | WO-2014/011444 A3 | 3/2014 |

(56) References Cited

FOREIGN PATENT DOCUMENTS

| | | |
|---|---|---|
| WO | WO-2014/064893 A1 | 5/2014 |
| WO | WO 2014/098735 A1 | 6/2014 |
| WO | WO 2015/004179 A1 | 1/2015 |
| WO | WO 2015/144660 A1 | 10/2015 |
| WO | WO-2016/115314 A1 | 7/2016 |
| WO | WO-2016/166311 | 10/2016 |
| WO | WO-2017015664 A1 | 1/2017 |
| WO | WO-2017/024079 A2 | 2/2017 |
| WO | WO-2017/044177 A1 | 3/2017 |
| WO | WO-2017087644 A1 | 5/2017 |
| WO | WO-2017/134623 A1 | 8/2017 |
| WO | WO 2017/184448 A1 | 10/2017 |
| WO | WO-2017/192566 A1 | 11/2017 |
| WO | WO 2018/010946 A1 | 1/2018 |
| WO | WO 2018/013161 A1 | 1/2018 |
| WO | WO 2018/017451 A1 | 1/2018 |
| WO | WO 2018/091560 A1 | 5/2018 |
| WO | WO 2019/014703 A1 | 1/2019 |
| WO | WO 2019/040944 A2 | 2/2019 |
| WO | WO 2019/204805 A1 | 10/2019 |
| WO | WO 2019/213652 A1 | 11/2019 |
| WO | WO 2020/030825 | 2/2020 |
| WO | WO 2020/144269 | 7/2020 |
| WO | WO 2020/167934 | 8/2020 |
| WO | WO 2020/219832 | 10/2020 |
| WO | WO 2021/119363 | 6/2021 |

OTHER PUBLICATIONS

PFLi Water-cooled LED Bar. NewLux Horticultural LED Lighting. Accessed at http://newlux.com/product/pfli-water-cooled-led-bar/ on Apr. 23, 2018, 8 pages.

Our Grow Light Models. GS Thermal Solutions 2018. Accessed at http://gsgrow.com/technology/liquid-cooled-led-models/ on Apr. 23, 2018.

GC-Plus Control System. Agrowtek Inc. Accessed at http://agrowtek.com/component/page,shop.product_details/flypage,flypage.tpl/product_id,53/category_id,14/option,com_virtuemart/Itemid,26/ on May 25, 2018, 4 pages.

Cooking Hacks. Accessed at https://www.cooking-hacks.com/documentation/tutorials/open-garden-hydroponics-irrigation-system-sensors-plant-monitoring on May 25, 2018, 11 pages.

LED Lighting for Horticulture, Aquabar LED Grow System brochure. Genesis Scientific. Accessed at www.gs.horti.com on Oct. 31, 2017, 4 pages.

Intravision Spectra R&D, Water-cooled 7-LED band Plant Research Rig., Accessed at <www.intravisiongroup.com> on Apr. 7, 2016, 1 page.

LED Grow World, Liquid Cooled LED Grow Light brochure, Model BLE-GL9015, 2017. Accessed at www.ledgrowworld.co, 3 pages.

JPFA Plant Factory Association. Accessed at http://npoplantfactory.org/english.html on May 18, 2018, 6 pages.

Harper, 2017: The OpenAG Ecosystem Expands Research, Non-Profit Ventrures. The Medium, Jan. 27, 2017. Accessed at https://medium.com/@calebgrowsfood/2017-the-openag-ecosystem-expands-research-non-profit-ventures-b5762beed64b, 10 pages.

Fenome. Vimeo. Accessed at https://vimeo.com/219601049, 3 pages, 2018.

Agnetix—The A3 Product Brochure, 2 pages, Aug. 24, 2017.
Agnetix—A3 Cables, 5 pages, Feb. 26, 2018.
Agnetix—Liquid-cooled, intelligent LED horticultural platform, 5 pages, Jan. 31, 2018.
Agnetix—A3 Horticulture LED, 6 pages, Jan. 31, 2018.
Agnetix—4' x 1 A3 Light Assembly, 1 page, Jan. 24, 2018.
Agnetix—8' x 2 A3 Light Assembly, 1 page, Jan. 24, 2018.
Agnetix—12' x 3 A3 Light Assembly, 1 page, Jan. 24, 2018.
Agnetix—16' x 3 A3 Light Assembly, 1 page, Jan. 23, 2018.
Agnetix—20' x 4 A3 Light Assembly, 1 page, Jan. 23, 2018.
Agnetix—20' x 5 A3 Light Assembly, 1 page, Mar. 8, 2018.
Agnetix—24' x 5 A3 Light Assembly, 1 page, Apr. 3, 2018.
Agnetix—24' x 6 A3 Light Assembly, 1 page, Jan. 16, 2018.
Agnetix—36' x 9 A3 Light Assembly, 1 page, Dec. 5, 2017.
Agnetix—32' x 8 A3 Light Assembly, 1 page, Feb. 12, 2017.
Agnetix—24'x12'x8' Growth Chamber, 1 page, Mar. 1, 2018.
Agnetix—42'x180'x12' Greenhouse, 1 page, Jan. 29, 2018.
Agnetix—20'x8'x9.5' 3-Light Isopod, 1 page, Mar. 17, 2018.
Agnetix—Hydronics Loop Diagram, 1 page, Mar. 9, 2018.

Bah, A. et al., "Sensor Technologies for Precision Soil Nutrient Management and Monitoring," American Journal of Agriculture and Biological Sciences 7(1): pp. 43-49, 2012.

Chandra, S. et al., "Photosynthetic response of Cannabis sativa L. to variations in Photosynthetic photon flux densities, temperature and $CO_2$ conditions," Physiol. Mol. Biol. Plants, vol. 14, No. 4, pp. 299-306, 2008.

Hamza, B. et al., "Distributed Polymer Optical Fibre Sensing of Moisture and pH in Soils: Feasibility for E-Agriculture," retrieved from https://www.research.manchester.ac.ukportal/files/38209074/FULL_TEXT.pdf, 7 pages, Nov. 3, 2017.

Nakano, A., "Plant Factories in Japan—An Integrated Approach," NARO Institute of Vegetable and Floriculture Science, National Agriculture and Food Research Organization (NARO), Tsukuba, Ibaraki, Japan, 11 pages. Sep. 11, 2017.

Nelson, J. A. et al., "Economic Analysis of Greenhouse Lighting: Light Emitting Diodes vs. High Intensity Discharge Features," PLoS One, vol. 9, Issue 6, e99010, 10 pages, 2014.

Photosynthetically Active Radiation (PAR) Units, 1 page, Aug. 16, 2000.

Sihombing, P. et al., "Automated hydroponics nutrition plants systems using arduino uno microcontroller based on android," 2nd International Conference on Computing and Applied Informatics, IPO Conf. Series: Journal of Physics 978 012014, 6 pages, 2018.

Vellidis, G., "The University of Georgia Smart Sensor Array," <http://scienceinhydroponics.com/2017/03/automating-a-hydroponic-system-sensors-and-monitoring.html>, 11 pages, 2018.

Vellidis, G. et al., "A real-time wireless smart sensor array for scheduling irrigation," Computers and Electronics in Agriculture 61, pp. 44-50, 2008.

Vijay, N., "Application of sensor networks in agriculture," https://ieeexplore.ieee.org/document/6719103/, Third International Conference on Sustainable Energy and Intelligent System, Dec. 27-29, 2012.

AgNetix Liquid Cooled Horitcultural Lighting and AgNetix Water-Cooled Le & Sensory Platform, Jan. 31, 2018, 25 pages.

Products—Thrive Agritech. Accessed at http://www.thriveagritech.com/products/on May 16, 2019. 9 pages.

Intravision Products. Accessed at https://www.intravisiongroup.com/products on May 16, 2019. 2 pages.

Smart LED Grow Lights with Wireless Control LumiGrow. Accessed at https://www.lumigrow.com/ accessed on May 16, 2019. 8 pages.

PlantLab. Accessed at https://www.plantlab.com/ on May 16, 2019. 8 pages.

Aquabar. Genesis Scientific. Accessed at https://gs-horti.com/products/led-grow-lights/aquabar.html on May 16, 2019. 7 pages.

Viparspectra. Accessed at http://www.viparspectra.com/ on May 16, 2019. 10 pages.

Which regions of the electromagnetic spectrum do plants use to drive photosynthesis? Heliospectra. Accessed at www.heliospectra.com, Oct. 5, 2012.

International Search Report and Written Opinion in International Patent Application No. PCT/US2018/048190 dated Feb. 8, 2019, 100 pages.

Guidelines for Measuring and Reporting Environmental Parameters for Experiments in Greenhouses. International Committee for Controlled Environment Guidelines, Feb. 2016, 37 pages.

2JCIE-BU Environment Sensor (USB Type). Omron Electronic Components. Accessed at https://www.components.omron.com/product-detail?partNumber=2JCIE-BU on Apr. 13, 2019, 5 pages.

Environment Sensor Integrating various sensing capabilities into one single IoT sensor. Accessed at https://www.components.omron.com/solutions/mems-sensors/environment-sensor on Apr. 13, 2019, 6 pages.

(56) References Cited

OTHER PUBLICATIONS

Environment Sensor 2JCIE Series Catalog. Omron Electronic Components. Accessed at https://www.components.omron.com/solutions/mems-sensors/environment-sensor on May 16, 2019, 16 pages.

Schriber, Smart Agriculture Sensors: Helping Small Farmers and Positively Impacting Global Issues, Too. Mouser Electronics. Accessed at https://www.mouser.com/applications/smart-agriculture-sensors/ on Apr. 13, 2019, 4 pages.

Lakhiar et al., "Monitoring and Control Systems in Agriculture Using Intelligent Sensor Techniques: A Review of the Aeroponic System." Journal of Sensors 2018 (2018), 19 pages.

Hwang et al., "Study on an agricultural environment monitoring server system using wireless sensor networks." Sensors 10.12 (2010): 11189-11211.

Kerns et al., "Automated aeroponics system using IoT for smart farming." European Scientific Journal, ESJ 13.10 (2017), 7 pages.

Tsitsimpelis et al., "Development of a grow-cell test facility for research into sustainable controlled-environment agriculture." Biosystems Engineering 150 (2016): 40-53.

Keshtgary et al., "An efficient wireless sensor network for precision agriculture." Canadian Journal on Multimedia and Wireless Networks 3.1 (2012): 1-5.

Jawad et al., "Energy-efficient wireless sensor networks for precision agriculture: A review." Sensors 17.8 (2017): 1781, 45 pages.

Shamshiri et al., "Advances in greenhouse automation and controlled environment agriculture: A transition to plant factories and urban agriculture." (2018), 22 pages.

Ruiz-Garcia et al., "A review of wireless sensor technologies and applications in agriculture and food industry: state of the art and current trends." sensors 9.6 (2009): 4728-4750.

Dener et al., "Smart technologies with wireless sensor networks." Procedia-Social and Behavioral Sciences 195 (2015): 1915-1921.

Pahuja et al., "A wireless sensor network for greenhouse climate control." IEEE Pervasive Computing 12.2 (2013): 49-58.

Balendonck et al., "Monitoring spatial and temporal distribution of temperature and relative humidity in greenhouses based on wireless sensor technology." International Conference on Agricultural Engineering-AgEng. 2010, 10 pages.

Chaudhary et al., "Application of wireless sensor networks for greenhouse parameter control in precision agriculture." International Journal of Wireless & Mobile Networks (IJWMN) 3.1 (2011): 140-149.

Ferentinos et al., "Wireless sensor networks for greenhouse climate and plant condition assessment." Biosystems engineering 153 (2017): 70-81.

Vox et al., "A wireless telecommunications network for real-time monitoring of greenhouse microclimate." Journal of Agricultural Engineering 45.2 (2014): 70-79.

Sánchez-Álvarez et al., "A Framework to Design the Computational Load Distribution of Wireless Sensor Networks in Power Consumption Constrained Environments." Sensors 18.4 (2018): 954, 20 pages.

Laamrani et al., "Using a Mobile Device "App" and Proximal Remote Sensing Technologies to Assess Soil Cover Fractions on Agricultural Fields." Sensors 18.3 (2018): 708, 16 pages.

Peng et al., "Comparative study of the detection of chromium content in rice leaves by 532 nm and 1064 nm laser-induced breakdown spectroscopy." Sensors 18.2 (2018): 621, 18 pages.

Pichorim et al., "Two solutions of soil moisture sensing with RFID for landslide monitoring." Sensors 18.2 (2018): 452, 11 pages.

Behmann et al., "Specim IQ: evaluation of a new, miniaturized handheld hyperspectral camera and its application for plant phenotyping and disease detection." Sensors 18.2 (2018): 441, 20 pages.

Nie et al., "Research on the effects of drying temperature on nitrogen detection of different soil types by near infrared sensors." Sensors 18.2 (2018): 391, 22 pages.

Cui et al., "Plant pest detection using an artificial nose system: a review." Sensors 18.2 (2018): 378, 18 pages.

Kafarski et al., "Evaluation of apple maturity with two types of dielectric probes." Sensors 18.1 (2018): 121, 13 pages.

Lim et al., "Application of near infrared reflectance spectroscopy for rapid and non-destructive discrimination of hulled barley, naked barley, and wheat contaminated with Fusarium." Sensors 18.1 (2018): 113, 16 pages.

Barriuso et al., "Combination of multi-agent systems and wireless sensor networks for the monitoring of cattle." Sensors 18.1 (2018): 108, 27 pages.

Meng et al., "A Compound Sensor for Simultaneous Measurement of Packing Density and Moisture Content of Silage." Sensors 18.1 (2018): 73, 10 pages.

Brinkhoff et al., "Multisensor capacitance probes for simultaneously monitoring rice field soil-water-crop-ambient conditions." Sensors 18.1 (2018): 53, 14 pages.

Bengochea-Guevara et al., "A low-cost approach to automatically obtain accurate 3D models of woody crops." Sensors 18.1 (2018): 30, 17 pages.

Skovsen et al., "Estimation of the Botanical Composition of Clover-Grass Leys from RGB Images Using Data Simulation and Fully Convolutional Neural Networks." Sensors 17.12 (2017): 2930, 18 pages.

Ravichandran et al., "In vivo non-destructive monitoring of capsicum annuum seed growth with diverse nacl concentrations using optical detection technique." Sensors 17.12 (2017): 2887, 12 pages.

Mao et al., "Contamination Event Detection with Multivariate Time-Series Data in Agricultural Water Monitoring." Sensors 17.12 (2017): 2806, 19 pages.

Castrignanò et al., "A combined approach of sensor data fusion and multivariate geostatistics for delineation of homogeneous zones in an agricultural field." Sensors 17.12 (2017): 2794, 20 pages.

Al-Saddik et al., "Development of spectral disease indices for 'Flavescence Dorée' grapevine disease identification." Sensors 17.12 (2017): 2772, 25 pages.

Wojnowski et al., "Portable electronic nose based on electrochemical sensors for food quality assessment." Sensors 17.12 (2017): 2715, 14 pages.

Dong et al., "Estimating crop area at county level on the North China Plain with an indirect sampling of segments and an adapted regression estimator." Sensors 17.11 (2017): 2638, 9 pages.

Kragh et al., "Fieldsafe: dataset for obstacle detection in agriculture." Sensors 17.11 (2017): 2579, 11 pages.

Zou et al., "A Real-Time Smooth Weighted Data Fusion Algorithm for Greenhouse Sensing Based on Wireless Sensor Networks." Sensors 17.11 (2017): 2555, 14 pages.

Fan et al., "Fast detection of striped stem-borer (Chilo suppressalis Walker) infested rice seedling based on visible/near-infrared hyperspectral imaging system." Sensors 17.11 (2017): 2470, 13 pages.

Nawar et al., "Comparison between random forests, artificial neural networks and gradient boosted machines methods of on-line Vis-NIR spectroscopy measurements of soil total nitrogen and total carbon." Sensors 17.10 (2017): 2428, 22 pages.

Moorhead et al., "Evaluation of sensible heat flux and evapotranspiration estimates using a surface layer scintillometer and a large weighing lysimeter." Sensors 17.10 (2017): 2350, 23 pages.

Corwin et al., "Evaluating Oilseed Biofuel Production Feasibility in California's San Joaquin Valley Using Geophysical and Remote Sensing Techniques." Sensors 17.10 (2017): 2343, 25 pages.

Nader et al., "Assessing white wine viscosity variation using polarized laser speckle: A promising alternative to wine sensory analysis." Sensors 17.10 (2017): 2340, 12 pages.

Tamouridou et al., "Application of multilayer perceptron with automatic relevance determination on weed mapping using UAV multispectral imagery." Sensors 17.10 (2017): 2307, 9 pages.

Lim et al., "Classification of Fusarium-Infected Korean Hulled Barley Using Near-Infrared Reflectance Spectroscopy and Partial Least Squares Discriminant Analysis." Sensors 17.10 (2017): 2258, 15 pages.

Jia et al., "Hyperspectral imaging analysis for the classification of soil types and the determination of soil total nitrogen." Sensors 17.10 (2017): 2252, 14 pages.

Fuentes et al., "A robust deep-learning-based detector for real-time tomato plant diseases and pests recognition." Sensors 17.9 (2017): 2022, 21 pages.

(56) References Cited

OTHER PUBLICATIONS

Alexandridis et al., "Novelty detection classifiers in weed mapping: Silybum marianum detection on UAV multispectral images." Sensors 17.9 (2017): 2007, 12 pages.
Feng et al., "Discrimination of transgenic maize kernel using NIR hyperspectral imaging and multivariate data analysis." Sensors 17.8 (2017): 1894, 14 pages.
Schmittmann et al., "A True-Color Sensor and Suitable Evaluation Algorithm for Plant Recognition." Sensors 17.8 (2017): 1823, 16 pages.
Villarrubia et al., "Combining multi-agent systems and wireless sensor networks for monitoring crop irrigation." Sensors 17.8 (2017): 1775, 23 pages.
Kicherer et al., "Phenoliner: A new field phenotyping platform for grapevine research." Sensors 17.7 (2017): 1625, 18 pages.
Wei et al., "Leaf area index estimation using Chinese GF-1 wide field view data in an agriculture region." Sensors 17.7 (2017): 1593, 14 pages.
Martínez-Guanter et al., "Optical sensing to determine tomato plant spacing for precise agrochemical application: Two scenarios." Sensors 17.5 (2017): 1096, 19 pages.
Shi et al., "Spectroscopic diagnosis of arsenic contamination in agricultural soils." Sensors 17.5 (2017): 1036, 15 pages.
Kameoka et al., "A wireless sensor network for growth environment measurement and multi-band optical sensing to diagnose tree vigor." Sensors 17.5 (2017): 966, 21 pages.
Shiffler, Smart Sensors in Farming: 10 Startups to Watch in 2018. Mar. 7, 2018. Accessed at https://www.disruptordaily.com/smart-sensors-farming-10-startups-watch-2018/ on May 17, 2019, 10 pages.
Danckwerts, A decentralized future for food: Indoor Farming, the Internet of Things and Blockchain Technology. Medium. Jun. 11, 2017. Accessed at https://medium.com/@forbesdanckwerts/a-decentralized-future-for-food-indoor-farming-the-internet-of-things-and-blockchain-technology-8d905b6dcb27 on May 17, 2019, 10 pages.
Agriculture Market 2018-2023: Focus on Systems (Sensing, Communication, Cloud Computing, Data), Applications (Precision Crop, Indoor, Livestock Monitoring, Aquaculture). Research and Markets Nov. 23, 2018. Accessed at https://www.prnewswire.com/news-releases/global-iot-in-agriculture-market-2018-2023-focus-on-systems-sensing-communication-cloud-computing-data-applications-precision-crop-indoor-livestock-monitoring-aquaculture-300754772.html on May 17, 2019, 8 pages.
Global IoT in Agriculture Market: Focus on Systems (Sensing, Communication, Cloud Computing, Data Management), Applications (Precision Crop Farming, Indoor Farming, Livestock Monitoring, Aquaculture)-Analysis and Forecast (2018-2023) Description. Nov. 2018 Research and Markets. Accessed at https://www.researchandmarkets.com/research/w5t7j8/global_iot_in?w=5 on May 21, 2019. 14 pages.
Environmental Monitoring & Aiflow for Climate Uniformity. The University of Arizona Controlled Environment Agriculture Center. Accessed at http://ceac.arizona.edu/environmental-monitoring on May 17, 2019, 6 pages.
Multi-Sensor Modules Ease Indoor Agriculture Design Challenges. Techmezine Feb. 19, 2019. Accessed at https://www.techmezine.com/internet-of-things/multi-sensor-modules-ease-indoor-agriculture-design-challenges/ on May 17, 2019, 8 pages.
Indoor Precision Farming in American medical marijuana plantations. Libelium Dec. 13, 2016. Accessed at http://www.libelium.com/indoor-precision-farming-in-american-medical-marijuana-plantations/ on May 17, 2019, 7 pages.
<https://sensorinsight.io/> Accessed on May 17, 2019, 7 pages.
Internet of Things Hardware Distributor. Accessed at https://sensorinsight.io/hardware/ on May 17, 2019, 4 pages.
Modular Farming Systems. Cityblooms. Accessed at https://cityblooms.com/modular-farms/ on May 17, 2019, 6 pages.
The Orchestra Conductor for Your Farm. The Cityblooms Commander. Accessed at https://cityblooms.com/commander/ on May 17, 2019, 12 pages.
New controlled-environment agriculture solution in Chile enables up to 50% energy saving. Advanticsys Feb. 3, 2018. Accessed at https://www.advanticsys.com/new-controlled-environment-agriculture-solution-in-chile-enables-up-to-50-energy-saving/ on May 17, 2019, 3 pages.
4-In-1 Sensor. Growlink. Accessed at https://growlink.com/shop/4-in-1-sensor/ on May 17, 2019, 7 pages.
Growlink Climate Sensor. Growlink. Accessed at https://growlink.com/shop/environment-sensor-module/ on May 17, 2019, 7 pages.
Smart Sense Wireless Module. Growlink. Accessed at https://growlink.com/shop/remotesense/ on May 17, 2019, 7 pages.
Blink XP Plant Vision Cameras. Growlink. Accessed at https://growlink.com/shop/plant-vision-camera-system/ on May 17, 2019, 6 pages.
Advanced Soil Moisture Sensing. Growlink. Accessed at https://growlink.com/shop/terros12/ on May 17, 2019, 6 pages.
Small Soil Moisture Sensor. Growlink. Accessed at https://growlink.com/shop/ec-5-small-soil-moisture-sensor/ on May 17, 2019, 7 pages.
TE Connectivity AmbiMate Sensor Module MS4 Series. Mouser Electronics. Accessed at https://www.mouser.com/new/TE-Connectivity/te-connectivity-ambimate-sensor-module/ on May 17, 2019, 2 pages.
LED Grow Lights. Heliospectra. Accessed at https://www.heliospectra.com/led-grow-lights/ on May 17, 2019, 9 pages.
Oreon Grow Light 2.1 (GL 600 2.1 XXX) Installation Manual. Oreon. Jan. 22, 2018. Accessed at https://www.oreon-led.com/cache/InstallationManual20180122USCA.107/InstallationManual20180122USCA.pdf, 18 pages.
Oreon Grow Light 2.1. Oreon 2016. Accessed at https://hortinext.com/wp-content/uploads/2016/08/Lemnis-Oreon-Brochure_EN.pdf, 2 pages.
International Search Report and Written Opinion in International Patent Application No. PCT/US19/28493 dated Jul. 25, 2019, 15 pages.
Purwar, "In-situ Real-time Field Imaging and Monitoring of Leaf Stomata by High-resolution Portable Microscope." bioRxiv (2019): 677450. 24 pages.
Roots Corporate Presentation. Roots Sustainable Agricultural Technologies Ltd. Oct. 2018. 28 pages.
Model-W LED Grow Light. ThinkGrow 2019. Accessed at https://www.thinkgrowled.com/First/IndexW on Mar. 11, 2020. 3 pages.
Rosenthal, Light Dep vs Outdoor: Why Light Deprivation Greenhouses Are a Good Investment. Ed Rosenthal.com May 3, 2019. Accessed at https://www.edrosenthal.com/the-guru-of-ganja-blog/light-dep-vs-outdoor on Mar. 11, 2020. 10 pages.
YellowScan Forestry. Accessed at https://www.yellowscan-lidar.com/applications/forestry/ on Mar. 16, 2020. 9 pages.
Bowen, GreenThumb IO Platform. GreenThumb.IO. Feb. 16, 2019. Accessed at https://medium.com/greenthumbio/greenthumb-io-platform-d6d09ca7fafb on Mar. 16, 2020. 4 pages.
Smarter Farming. TortugaAgTech. Accessed at https://www.tortugaagtech.com/ on Mar. 24, 2020. 10 pages.
PlantEye F500 multispectral 3D scanner for plants. Phenospec Smart Plant Analysis. Accessed at https://phenospex.com/products/plant-phenotyping/planteye-f500-multispectral-3d-laser-scanner/?gclid=Cj0KCQjwmdzzBRC7ARIsANdqRRn6QO5qmh0wwGnlkROEuysd8CaRKe94_kmoBIPuJzwlvcQGzgWGksMaAmt_EALw_wcB on Mar. 24, 2020.
Russo, "The case for the entourage effect and conventional breeding of clinical cannabis: no "strain," no gain." Frontiers in plant science 9 (2019): 1969. 8 pages.
US Energy Use Intensity by Property Type. Energy Star PortfolioManager Technical Reference. Aug. 2018. 6 pages.
International Search Report and Written Opinion in International Patent Application No. PCT/US2019/030889 dated Sep. 26, 2019, 22 pages.
Rodrigues, Agnetix—Most Powerful and Efficient LED Horticulture Lighting Platform. YouTube Jan. 8, 2018. Accessed at https://www.youtube.com/watch?v=y6rZeJ6V8Ug. 7 pages.
International Search Report and Written Opinion in International Patent Application No. PCT/US2019/061324 dated Mar. 18, 2020, 92 pages.

(56) References Cited

OTHER PUBLICATIONS

Spectranomics. Carnegie Airborne Observatory as of Dec. 5, 2019. Accessed at https://web.archive.org/web/20191205203624/https://cao.carnegiescience.edu/spectranomics on Apr. 17, 2020. 2 pages.
TerrAvion Product Info. Accessed at https://www.terravion.com/product-info/ on Apr. 17, 2020. 3 pages.
Story et al., "Design and implementation of a computer vision-guided greenhouse crop diagnostics system." Machine vision and applications 26.4 (2015): 495-506.
Canopy Scanalyzer. LemnaTec. Accessed at https://www.lemnatec.com/products/canopy-scanalyzer/ on Apr. 17, 2020. 2 pages.
PAM Chlorophyll Fluorescence Imaging. LemnaTec. Accessed at https://www.lemnatec.com/pam-chlorophyll-fluorescence-imaging/ on Apr. 17, 2020. 2 pages.
Cerna® Modular Microscopes. Thorlabs May 10, 2018. Accessed at https://www.thorlabs.com/images/Brochures/Thorlabs_Cerna_Brochure.pdf on Apr. 17, 2020. 6 pages.
Murphy et al., "OpenFluor—an online spectral library of autofluorescence by organic compounds in the environment." Analytical Methods 6.3 (2014): 658-661.
Ubbens et al., "Deep plant phenomics: a deep learning platform for complex plant phenotyping tasks." Frontiers in plant science 8 (2017): 1190. 11 pages.
YellowScan Reliable UAV LiDAR Mapping. Accessed at https://www.yellowscan-lidar.com/ on Apr. 17, 2020. 3 pages.
Earles et al., "Beyond porosity: 3D leaf intercellular airspace traits that impact mesophyll conductance." Plant physiology 178.1 (2018): 148-162.
LI-6400XT Portable Photosynthesis System. Li-Cor . Accessed at https://www.licor.com/env/products/photosynthesis/ on Apr. 17, 2020. 1 page.
Controlled Environment Agriculture. Cornell University college of Agriculture and Life Sciences Sep. 2, 2019. Accessed at https://web.archive.org/web/20190902094759/http://cea.cals.cornell.edu/bestPractices/lightControl.html on Apr. 17, 2020. 2 pages.
Sentera. Accessed at https://sentera.com/sensors/ on Apr. 17, 2020. 4 pages.
Accesssories: UV & NIR Illuminators, Filter Modules. Eigen Imaging. Accessed at https://www.eigenimaging.com/collections/uv-nir-illuminator on Apr. 17, 2020. 5 pages.
360 Soilscan. 360yieldcenter.com. Dec. 24, 2014. Accessed at http://nebula.wsimg.com/45a21444c39dcfb4b9ca43dedf13076e?AccessKeyId=42F03180740870DBA0EF&disposition=0&alloworigin=1 on Apr. 17, 2020. 2 pages.
TerrAvion + FluroSense: nitrogen management. TerrAvion Jun. 3, 2019. Accessed at https://blog.terravion.com/blog/terravion-flurosat-nitrogen-management on Apr. 17, 2020. 4 pages.
Osburn et al., "Predicting sources of dissolved organic nitrogen to an estuary from an agro-urban coastal watershed." Environmental science & technology 50.16 (2016): 8473-8484.
Excitation-Emission Matrix (EEM) Fluorescence Spectroscopy for Analysis of Dissolved Organic Matter (DOM) in Natural Water and Wastewaters. Application News No. AD-0133 Shimadzu Nov. 15, 2016. Accessed at https://solutions.shimadzu.co.jp/an/n/en/rf/apa417010.pdf?_ga=2.70350806.735204626.1575945001-871956823.1575945001 on Apr. 16, 2020.
Abramowitz et al., Overview of Fluorescence Excitation and Emission Fundamentals. Olympus. Accessed at https://www.olympus-lifescience.com/en/microscope-resource/primer/lightandcolor/fluoroexcitation/ on Apr. 17, 2020. 4 pages.
Fluorescence Imaging Filters. ThorLabs. Accessed at https://www.thorlabs.com/newgrouppage9.cfm?objectgroup_id=2990 on Apr. 17, 2020. 4 pages.
Shortwave Infrared Camera Core Tau™ SWIR. FLIR. Accessed at https://www.flir.com/products/tau-swir/?model=Tau-Vis-SWIR on Apr. 17, 2020. 2 pages.
Natali et al., "Light-harvesting complexes (LHCs) cluster spontaneously in membrane environment leading to shortening of their excited state lifetimes." Journal of Biological Chemistry 291.32 (2016): 16730-16739.
Ghassemi et al., "Evaluation of mobile phone performance for near-infrared fluorescence imaging." IEEE Transactions on Biomedical Engineering 64.7 (2016): 1650-1653.
310nm UV LED Fluorescence using iPhone 6s. Youtube Jul. 15, 2018. Accessed at https://www.youtube.com/watch?v=hA6VPmJWE_8 on Apr. 17, 2020. 3 pages.
Tran et al., Smartphone Multi-Spectral Imaging. Eigen Imaging Inc., Apr. 2013. Accessed at https://sites.google.com/a/eigenimaging.com/eigen/learn-more/smartphone-multi-spectral-imaging on Apr. 17, 2020. 5 pages.
Non Final Office Action in U.S. Appl. No. 16/824,495 dated May 22, 2020, 47 pages.
Non Final Office Action in U.S. Appl. No. 16/114,088 dated May 5, 2020, 38 pages.
Notice of Allowance in U.S. Appl. No. 16/114,088 dated Jul. 24, 2020, 20 pages.
Non Final Office Action in U.S. Appl. No. 16/828,521 dated Jul. 28, 2020, 30 pages.
Notice of Allowance in U.S. Appl. No. 16/824,495 dated Jul. 29, 2020, 21 pages.
Notice of Allowance in U.S. Appl. No. 16/390,501 dated Aug. 24, 2020, 10 pages.
LAI—theory and practice. Accessed at https://www.metergroup.com/environment/articles/lai-theory-practice/ on Sep. 2, 2020. 35 pages.
Nynomic—The Photonics Group. Company Presentation Nynomic AG Dec. 10, 2019. Accessed at https://www.nynomic.com/wp-content/uploads/2019/12/Nynomic_28.MKK_2019.pdf. 34 pages.
Apogee Instruments. Accessed at https://www.apogeeinstruments.com/ on Sep. 2, 2020. 6 pages.
OCO-3 Instrument. NASA Jet Propulsion Laboratory California Institute of Technology. Accessed at https://ocov3.jpl.nasa.gov/instrument/ on Sep. 2, 2020. 3 pages.
Sensors, Sonars, and Cameras. BlueRobotics. Accessed at https://bluerobotics.com/product-category/sensors-sonars-cameras/ on Sep. 2, 2020. 6 pages.
Aidukas et al., "Low-cost, sub-micron resolution, wide-field computational microscopy using opensource hardware." Scientific reports 9.1 (2019): 1-12.
Koyama et al., "High-image quality, high-resolution camera with high sensitivity up to 1,100 nm." Ultra-High-Definition Imaging Systems. vol. 10557. International Society for Optics and Photonics, 2018. 32 pages.
About LCI. Bliportal. Accessed at https://www.bli.eu/about-multi-light/about-lci/ on Sep. 2, 2020. 5 pages.
Prairie et al., "An accurate, precise, and affordable light emitting diode spectrophotometer for drinking water and other testing with limited resources." Plos one 15.1 (2020): e0226761. 32 pages.
Spectral Indices. L3Harris Geospatial. Accessed at https://www.harrisgeospatial.com/docs/spectralindices.html on Sep. 2, 2020. 12 pages.
Wünsch et al., "Fluorescence quantum yields of natural organic matter and organic compounds: Implications for the fluorescence-based interpretation of organic matter composition." Frontiers in Marine Science 2 (2015): 98. 15 pages.
Terra Mepp. Accessed at https://terra-mepp.illinois.edu/ on Sep. 2, 2020. 9 pages.
Valle et al., "PYM: a new, affordable, image-based method using a Raspberry Pi to phenotype plant leaf area in a wide diversity of environments." Plant methods 13.1 (2017): 98. 17 pages.
Mudhar, Using near IR to look for photosynthesis and plant health with NDVI. Richard Mudhar Blog. Jul. 21, 2015. Accessed at https://www.richardmudhar.com/blog/2015/07/using-near-ir-to-look-for-photosynthesis-and-plant-health-with-ndvi/. 7 pages.
Lapa, Raspberry + NoIR cam + Sensors to detect water stress of the plants during their growing. Public Lab Mar. 31, 2016. Accessed at https://publiclab.org/notes/LaPa/03-31-2016/raspberry-noir-cam-sensors-to-detect-water-stress-of-the-plants-during-their-growing. 11 pages.
Blonquist, Using Infrared Thermometers for Plant Science Research. Apogee Insturments Inc. Youtube Jul. 31, 2017. Accessed at https://www.youtube.com/watch?time_continue=120&v=U_azOSSvBW8&feature=emb_logo. 3 pages.

(56) References Cited

OTHER PUBLICATIONS

Notice of Allowance in U.S. Appl. No. 16/114,088 dated Sep. 30, 2020, 5 pages.
Notice of Allowance in U.S. Appl. No. 16/390,501 dated Oct. 15, 2020, 7 pages.
Notice of Allowance in U.S. Appl. No. 16/824,495 dated Oct. 23, 2020, 5 pages.
Notice of Allowance in U.S. Appl. No. 16/828,521 dated Nov. 9, 2020, 5 pages.
Notice of Allowance in U.S. Appl. No. 16/390,501 dated Feb. 10, 2021, 10 pages.
Notice of Allowance in U.S. Appl. No. 17/083,461 dated Feb. 26, 2021, 9 pages.
Extended European Search Report in European Patent Application No. 18848610.4 dated Mar. 2, 2021, 11 pages.
Notice of Allowance in U.S. Appl. No. 16/404,192 dated Mar. 30, 2021, 9 pages.
Notice of Allowance in U.S. Appl. No. 17/141,173 dated Mar. 30, 2021, 24 pages.
Corrected Notice of Allowance in U.S. Appl. No. 16/390,501 dated Apr. 8, 2021, 2 pages.
First Office Action in Chinese Patent Application 201880069341.0 and English Translation Thereof dated Mar. 31, 2021, 17 pages.
Notice of Allowance in U.S. Appl. No. 17/083,461 dated May 3, 2021, 8 pages.
Corrected Notice of Allowance in U.S. Appl. No. 17/141,173 dated May 25, 2021, 2 pages.
International Search Report and Written Opinion in International Patent Application No. PCT/US2020/064382 dated May 27, 2021, 15 pages.
Yang et al., Application of Integrated Sensing and Automation Technology, and Preventive Bio-Control Agent for Greenhouse Precision Cultivation. Mardi Regionsl Workshop FFTC Sep. 21, 2017, 67 pages.
Non Final Office Action in U.S. Appl. No. 17/216,291 dated Jul. 9, 2021, 7 pages.
U.S. Appl. No. 16/114,088, filed Aug. 27, 2018, Lys et al.
U.S. Appl. No. 16/390,501, filed Apr. 22, 2019, Lys et al.
U.S. Appl. No. 16/404,192, filed May 6, 2019, Lys et al.
U.S. Appl. No. 16/824,495, filed Mar. 19, 2020, Lys et al.
U.S. Appl. No. 16/828,521, filed Mar. 24, 2020, Lys et al.
U.S. Appl. No. 17/141,173, filed Jan. 4, 2021, Lys et al.
U.S. Appl. No. 17/083,461, filed Oct. 29, 2020, Lys et al.
U.S. Appl. No. 17/216,291, filed Mar. 29, 2021, Lys et al.
The Greencube. Youtube Nov. 5, 2015. Accessed at https://www.youtube.com/watch?v=IqoENjkruMc on Apr. 17, 2020. 3 pages.
Executive Summary Eden ISS. Apr. 2019. Accessed at https://eden-iss.net/wp-content/uploads/EDEN-ISS-Complete-Brochure_ONLINE_small.pdf on Apr. 17, 2020.
International Search Report and Written Opinion in International Patent Application No. PCT/US2020/064837 dated Mar. 31, 2021, 13 pages.
Non Final Office Action in U.S. Appl. No. 17/323,822 dated Jul. 14, 2021, 8 pages.
U.S. Appl. No. 17/317,792, filed May 11, 2021, Lys et al.
Notice of Allowance in U.S. Appl. No. 17/317,792 dated Sep. 16, 2021, 7 pages.
Final Office Action in U.S. Appl. No. 17/323,822 dated Nov. 3, 2021, 10 pages.
Notice of Allowance in U.S. Appl. No. 17/216,291 dated Nov. 16, 2021, 8 pages.
Notice of Allowance in U.S. Appl. No. 17/317,792 dated Nov. 26, 2021, 8 pages.
Notice of Allowance in U.S. Appl. No. 17/323,822 dated Dec. 1, 2021, 8 pages.
Japanese Office Action and English Translation Thereof in Japanese Application No. 2021-525751 dated Nov. 30, 2021, 14 pages.
Chinese Office Action and English Translation Thereof in Chinese Application No. 201980044374.4 dated Dec. 3, 2021, 21 pages.
Chinese Office Action and English Translation Thereof in Chinese Application No. 201880069341.0 dated Dec. 24, 2021, 21 pages.
Extended European Search Report in European Patent Application No. 19796862.1 dated Jan. 3, 2022, 9 pages.
Corrected Notice of Allowance in U.S. Appl. No. 17/323,822 dated Jan. 25, 2022, 2 pages.
Corrected Notice of Allowance in U.S. Appl. No. 17/323,822 dated Feb. 4, 2022, 2 pages.
Non-Final Office Action in U.S. Appl. No. 17/362,938 dated Feb. 10, 2022, 9 pages.
Chinese Office action and English Translation thereof in Chinese App. No. 201980074643.1 dated Apr. 7, 2022 54 pages.
Extended European Search Report in European App. No. EP 19883460.8 dated Jul. 25, 2022 14 pages.
International Search Report and Written Opinion in International App. No. PCT/US2022/013755 dated Jul. 20, 2022 21 pages.
Notice of Allowance in U.S. Appl. No. 17/392,152 dated Aug. 26, 2022, 9 pages.
Ex Parte Quayle Action in U.S. Appl. No. 17/362,938 mailed Aug. 26, 2022 5 pages.
Third Office Action and English translation thereof in Chinese Application No. 2018806934.1 dated Aug. 10, 2022, 8 pages.
Second Office Action and English Translation thereof in Chinese Application No. CN Appl.No. 201980044374.4 dated Aug. 16, 2022, 16 pages.
Korean Office Action and English Translation thereof in Korean Application No. 10-2020-7034729 dated Sep. 19, 2022, 7 pages.
Corrected Notice of Allowance in U.S. Appl. No. 17/392,152 dated Sep. 6, 2022, 3 pages.
International Search Report and Written Opinion in International Patent Application No. PCT/US2022/032392 dated Nov. 18, 2022, 15 pages.
Notice of Allowance in U.S. Appl. No. 17/392,152 dated Dec. 16, 2022, 9 pages.
Notice of Allowance in U.S. Appl. No. 17/723,366 dated Jan. 26, 2023, 7 pages.
Korean Notice of Allowance and English Translation thereof in Korean Application No. 10-2020-7034729 dated Jan. 20, 2023, 8 pages.
Corrected Notice of Allowance in U.S. Appl. No. 17/392,152 dated Feb. 15, 2023, 2 pages.
Third Office Action and English Translation thereof in Chinese Application No. 201980044374.4 dated Feb. 8, 2023, 12 pages.
Official Action in European Application No. 19796862.1 dated Feb. 28, 2023, 4 pages.
Office Action and English Translation thereof in Korean Application No. 10-2021-7017428 dated Mar. 28, 2023, 13 pages.
U.S. Appl. No. 17/323,822, filed May 18, 2021, Lys et al.
U.S. Appl. No. 17/688,701, filed Mar. 7, 2022, Lys et al.
U.S. Appl. No. 17/392,152, filed Aug. 2, 2021, Lys et al.
U.S. Appl. No. 17/688,729, filed Mar. 7, 2022, Lys et al.
U.S. Appl. No. 17/723,366, filed Apr. 18, 2022, Lys et al.
U.S. Appl. No. 17/356,429, filed Jun. 23, 2021, Lys et al.
Chinese Office Action and English Translation Thereof in Chinese Application No. 201980044374.4 dated Jun. 20, 2023, 8 pages.
Israeli Office Action with Translation Thereof in Israeli Application No. 278388 dated Sep. 21, 2023, 6 pages.
Korean Notice of Allowance and English Translation thereof in Korean Application No. 10-2021-70017428 dated Nov. 6, 2023, 7 pages.
Notice of Allowance in U.S. Appl. No. 17/362,938 dated Feb. 21, 2023, 8 pages.
Non-Final Office Action in U.S. Appl. No. 17/356,429 dated Jun. 7, 2023, 26 pages.
Notice of Allowance in U.S. Appl. No. 17/362,938 dated Jun. 16, 2023, 8 pages.
Notice of Allowance in U.S. Appl. No. 17/362,938, dated Sep. 26, 2023, 8 pages.
U.S. Appl. No. 18/301,797, filed Apr. 17, 2023, Lys et al.
U.S. Appl. No. 18/334,236, filed Jun. 13, 2023, Lys et al.
U.S. Appl. No. 18/358,145, filed Jul. 25, 2023, Lys et al.

* cited by examiner

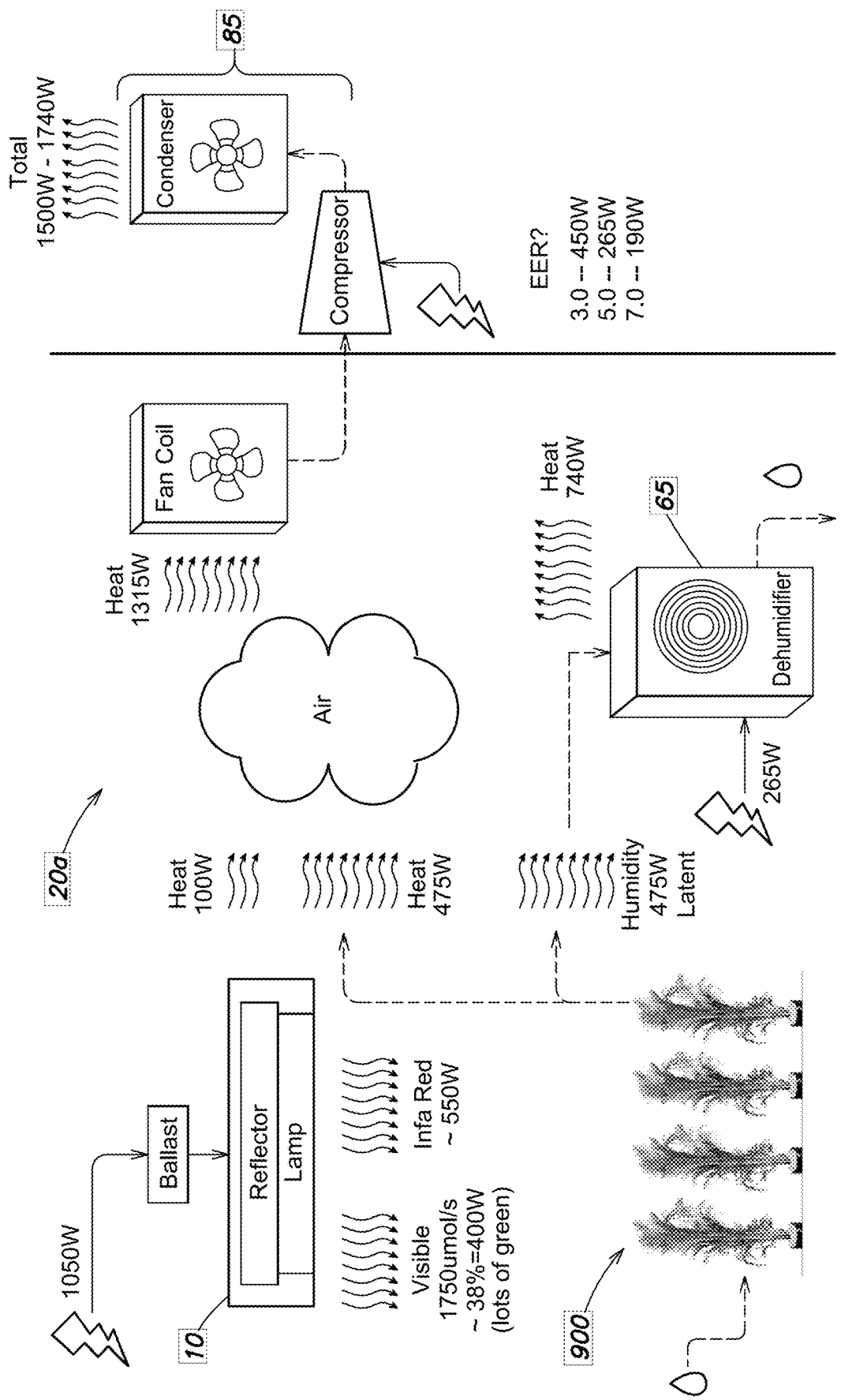

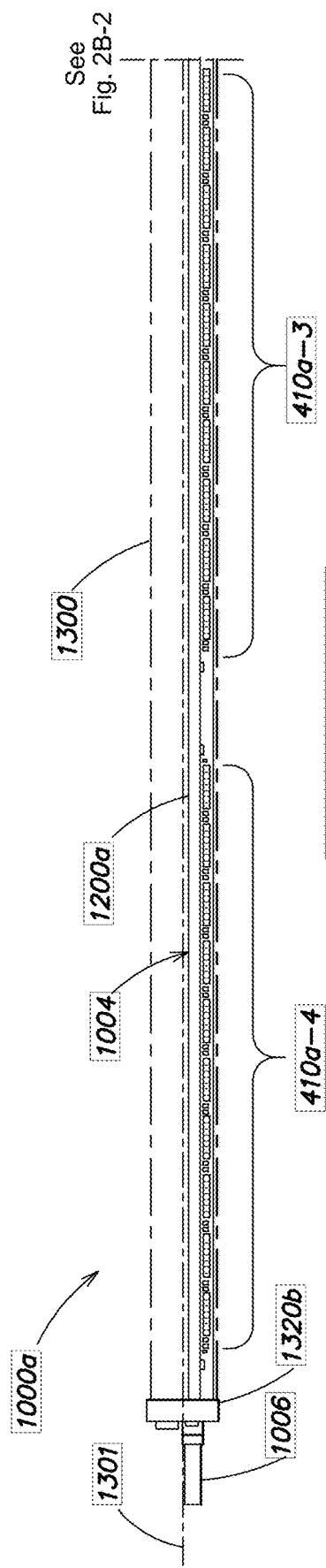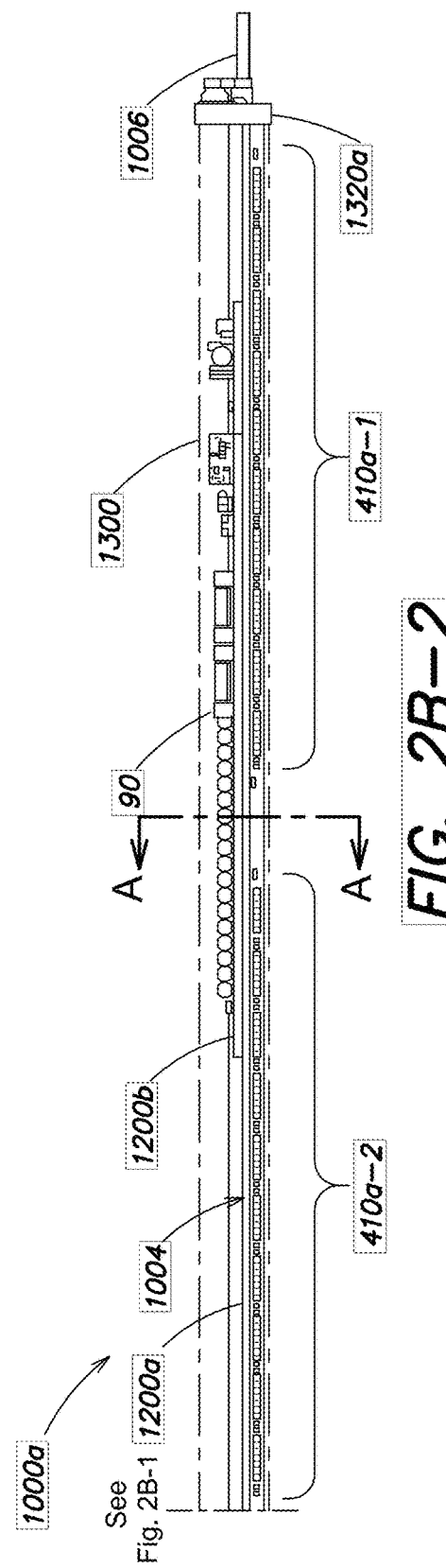

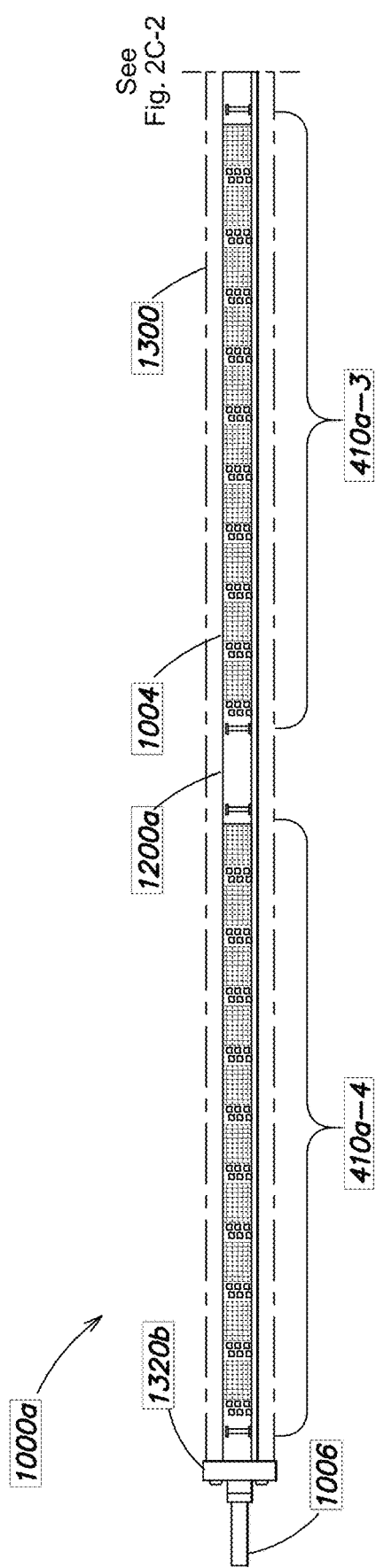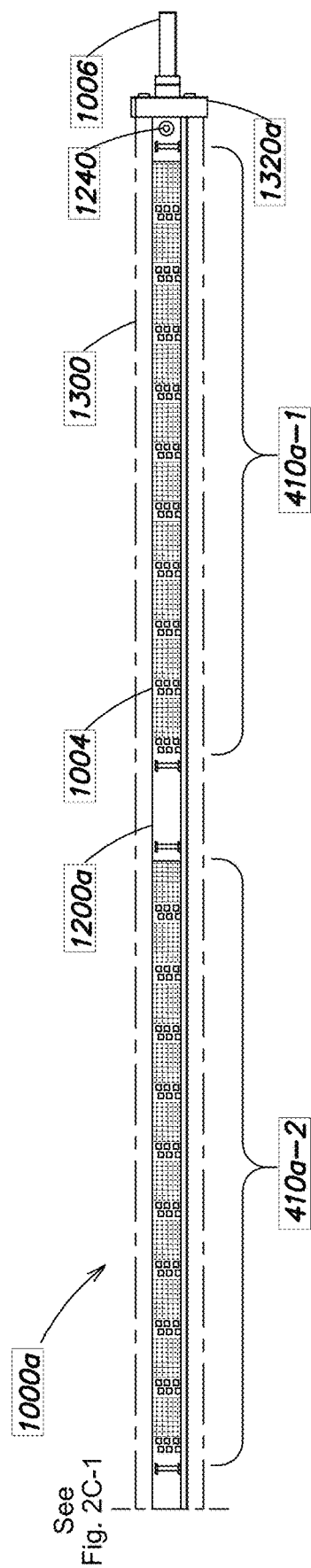

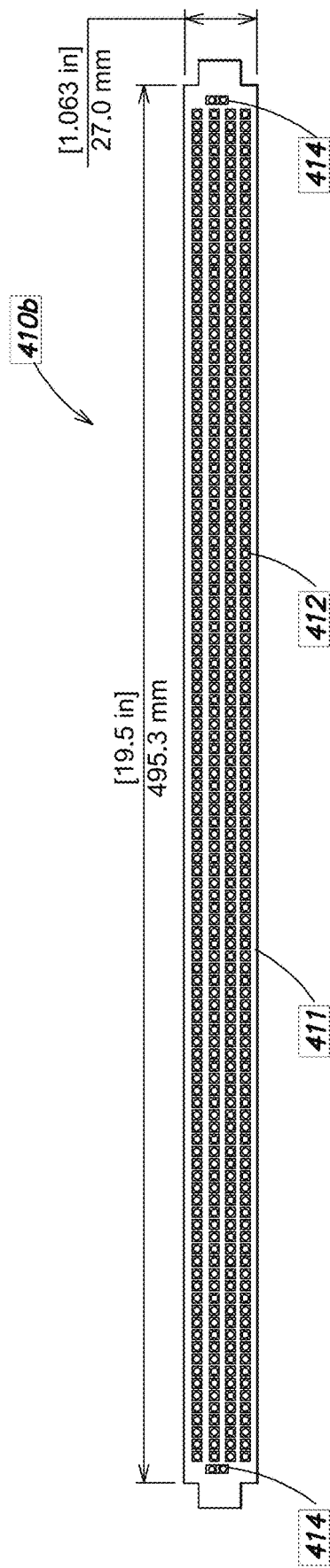
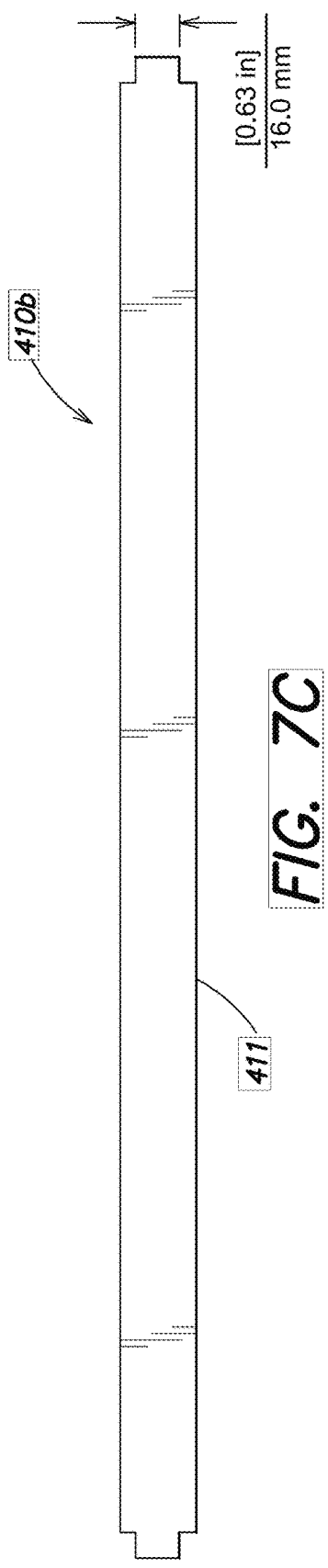
FIG. 7B
FIG. 7C

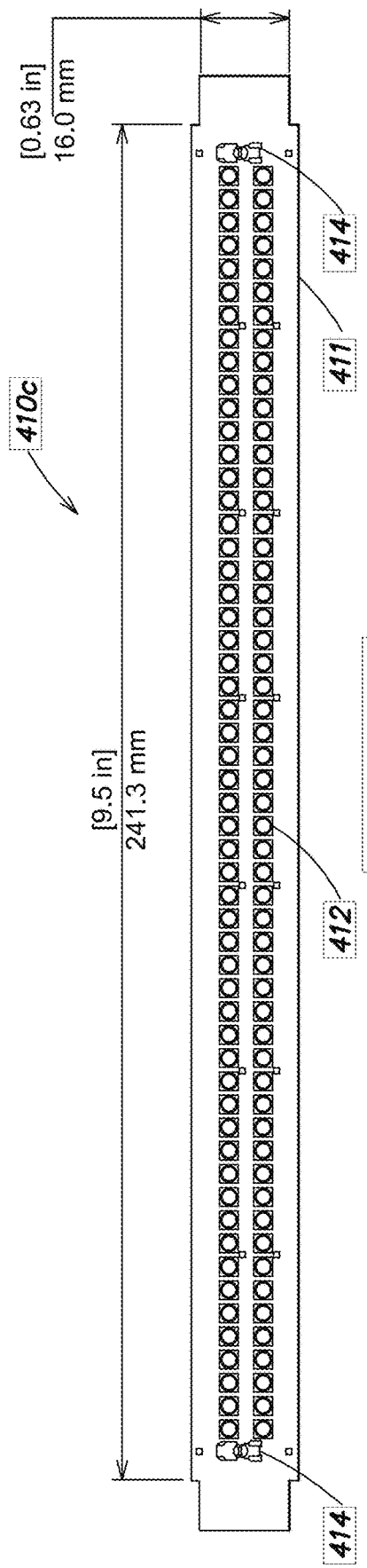
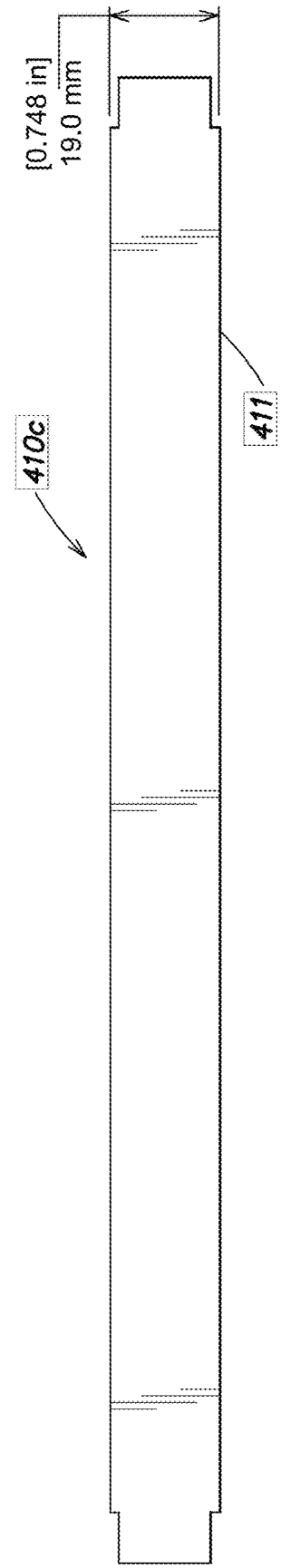
FIG. 8B
FIG. 8C

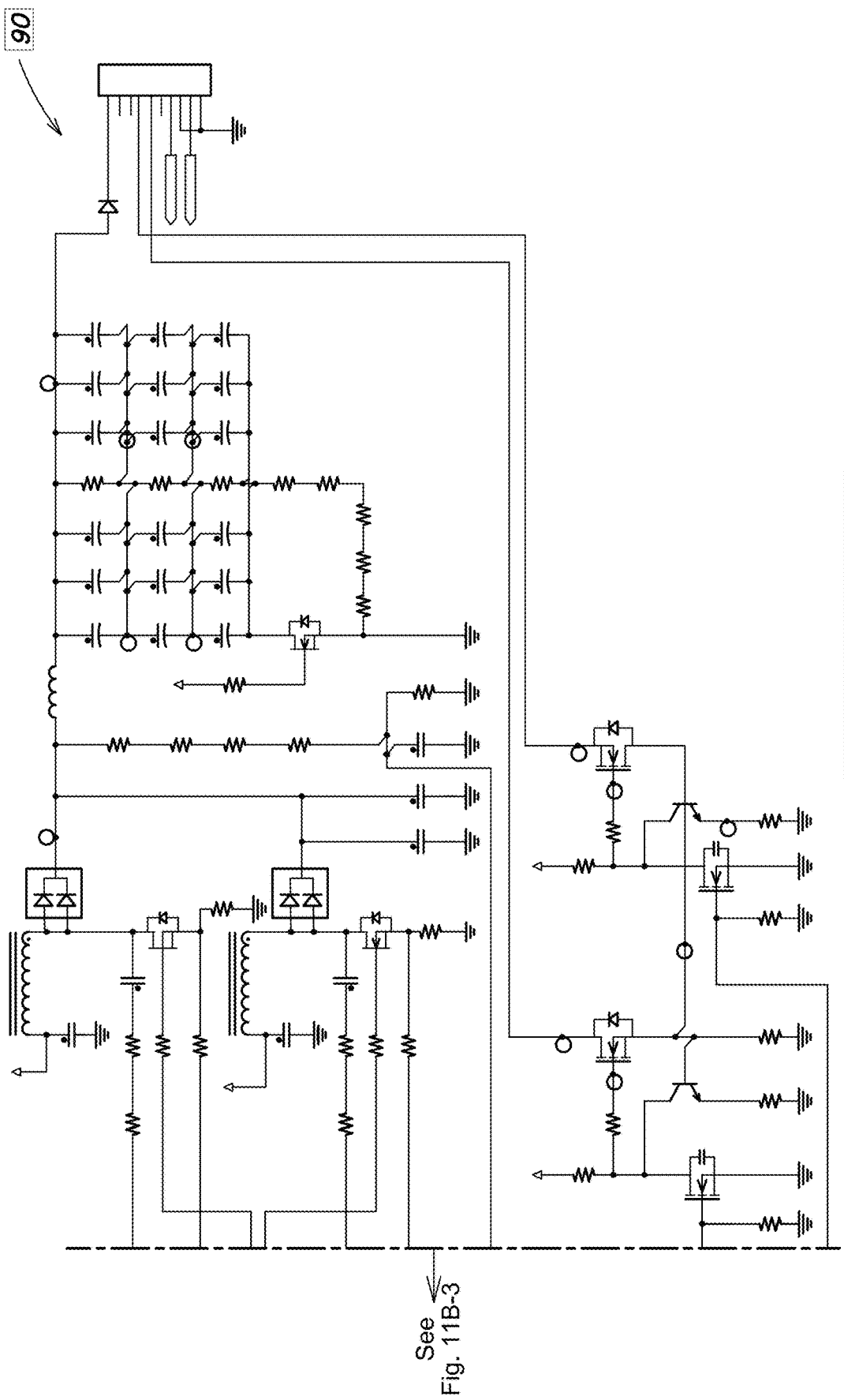

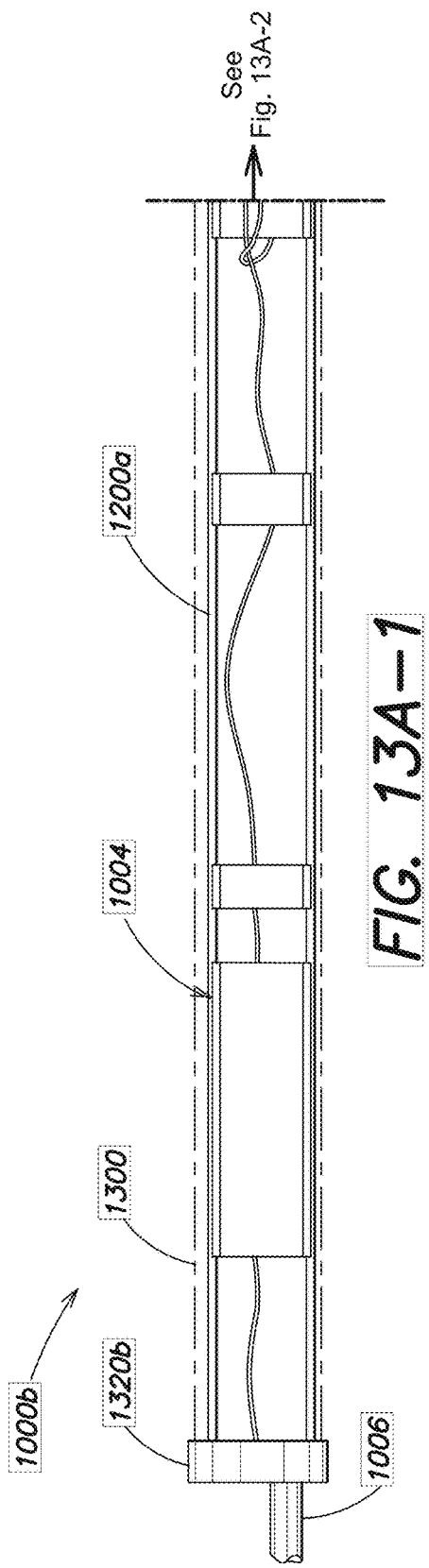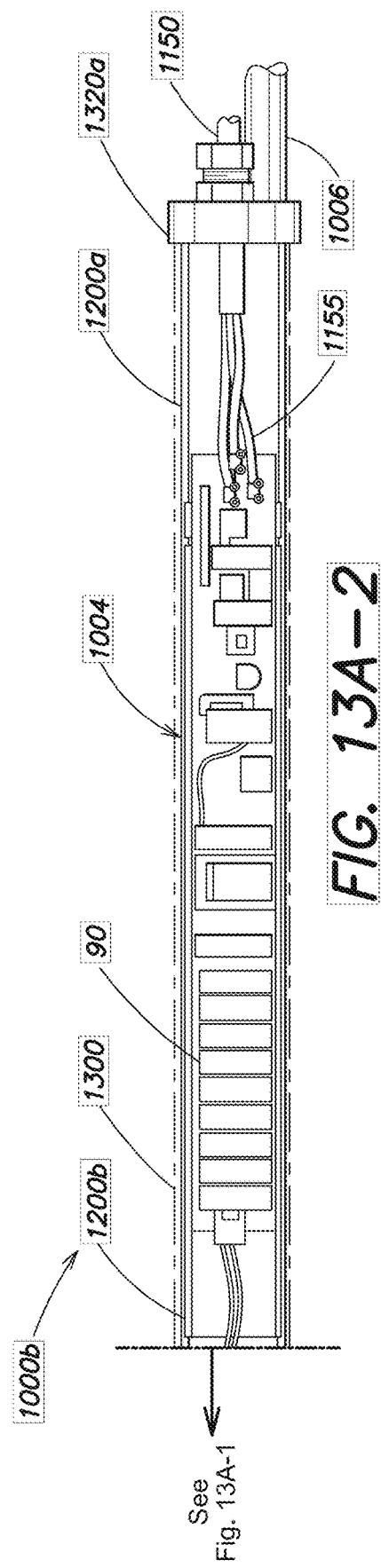

FLUID-COOLED LED-BASED LIGHTING METHODS AND APPARATUS IN CLOSE PROXIMITY GROW SYSTEMS FOR CONTROLLED ENVIRONMENT HORTICULTURE

CROSS-REFERENCE TO RELATED PATENT APPLICATION(S)

The present application is a bypass continuation of international application No. PCT/US2020/064837, filed on Dec. 14, 2020, entitled "FLUID-COOLED LED-BASED LIGHTING FIXTURE IN CLOSE PROXIMITY GROW SYSTEMS FOR CONTROLLED ENVIRONMENT HORTICULTURE," which claims priority to U.S. provisional application No. 62/947,538, filed on Dec. 12, 2019, entitled "FLUID-COOLED LED-BASED LIGHTING METHODS AND APPARATUS IN CLOSE PROXIMITY GROW SYSTEMS FOR CONTROLLED ENVIRONMENT HORTICULTURE," each of which is incorporated herein by reference in its entirety.

BACKGROUND

Controlled Environment Horticulture (CEH) (also referred to as Controlled Environment Agriculture or CEA) is the process of growing plants in a controlled environment where various environmental parameters are monitored and adjusted to improve the quality and yield of the plants. Compared to conventional approaches for plant cultivation, CEH may provide the year-round cultivation of plants, a grow environment that is insensitive to variable weather conditions and has fewer pests, healthier plants that are less prone to disease, and less consumption of resources on a per plant basis. A CEH system (also referred to herein as a "controlled agricultural environment") is typically enclosed, at least in part, by a building structure such as a greenhouse, a grow room, or a covered portion of a field in order to provide some degree of control over environmental conditions. A CEH system often includes one or more artificial lighting systems to supplement and/or replace natural sunlight, which may be obstructed by the building structure or insufficient during certain periods of the year (e.g., winter months). Various types of artificial lighting systems may be used including, but not limited to, a high intensity discharge lamp, a light emitting diode (LED), and a fluorescent lamp.

SUMMARY

The Inventors have recognized and appreciated CEH systems have the potential to provide greater control over environmental conditions to improve the overall quality and yield of plants and enable deployment in locations that are traditionally not suitable for agriculture, i.e., non-arable land (e.g., a city, a desert, an arctic landscape, land with no source of fresh water). However, the Inventors also recognize previous CEH systems often lack the flexibility to adaptively tailor environmental conditions for plants progressing through different stages of growth (e.g., the vegetative stage, the flowering stage) and/or different plant species.

For example, artificial lighting systems in CEH systems generate an appreciable amount of heat, especially when higher light levels are desired (e.g., to illuminate plants at the flowering stage). In some conventional CEH systems, the heat generated by the artificial lighting systems is dissipated directly into the agricultural environment. To prevent an undesirable increase in the environment temperature, conventional CEH systems often include one or more air conditioners within the agricultural environment to regulate the environment temperature, resulting in greater energy consumption.

In some instances, the CEH system may be a close proximity grow system where the distance separating the artificial lighting systems from the plants ranges between 6 inches and 72 inches. The close proximity between the artificial lighting systems and the plants may reduce the effectiveness of the air conditioner(s) in regulating the temperature within the immediate vicinity of the plants. This, in turn, may necessitate the artificial lighting systems operate at lower light levels than desired to ensure the lighting systems do not overheat and/or the plants are not exposed to excessive temperatures. One example of a close proximity grow system is a vertical grow rack system where the plants are grown on multiple, vertically-stacked shelves to provide a higher density grow area with a smaller footprint.

Additionally, conventional CEH systems are generally fixed installations where the artificial lighting systems are deployed at a predetermined location and/or orientation that can only be changed with substantial modification and/or reassembly of the CEH system. As a result, each lighting fixture typically emits radiation that only illuminates one side or one portion of the plants and cannot be readily adjusted to illuminate a different side or a different portion of the plants. Returning again to the example of a vertical grow rack system, the lighting fixture(s) in a conventional vertical grow rack system are typically affixed to a rack, thus constraining the lateral spacing and orientation of the lighting fixture(s) and, thus, the illumination profile of the radiation (e.g., spatial and angular distribution of radiation) incident on the plants. For some plants, it may be desirable to illuminate different sides of the plants to simulate illumination by the sun during a typical day cycle. However, this may only be accomplished by the addition of more lighting fixtures given the fixed installation of the artificial lighting systems or by disassembling and reassembling the lighting system to change the locations of the lighting fixtures.

In view of the foregoing limitations of conventional CEH systems and lighting fixtures, the present disclosure is thus directed to various implementations of a compact LED-based lighting fixture for CEH systems with an integrated fluid cooling system that enables higher light levels while reducing the amount of heat dissipated to the environment.

The lighting fixture may generally include a frame to mechanically support one or more LED modules. Each LED module may include one or more LED light sources that emit radiation with different spectral content (e.g., photosynthetically active radiation or PAR, infrared radiation, ultraviolet radiation) to illuminate one or more plants. The frame may also support control circuitry (also referred to as the "circuitry board" or the "processor") to electrically power and control the LED module(s). The control circuitry may provide several functions to the operation of the lighting fixture including, but not limited to, receiving alternate current (AC) power, supplying direct current (DC) power to the LED module(s), adjusting an operating parameter of the LED module(s) (e.g., the total intensity, the spectral intensity at a particular wavelength or wavelength band, turning the LED module(s) on or off, adjusting the rate of change with which the total intensity or spectral intensity is changed), and transmitting sensory data acquired by sensors and/or cameras (also referred to herein as "imaging systems") integrated within the lighting fixture and/or electrically connected to the lighting fixture (e.g., the lighting fixture temperature, the operating status or operating conditions of the lighting fixture). In this manner, the lighting fixture may provide lighting, power electronics, and data communication integrated into a single device. In some implementations, the control circuitry may also provide a dimmer to adjust the radiation output of the LED module(s). For example, the dimmer may reduce the intensity of radiation down to 1% of the nominal intensity when the dimmer is not activated.

The lighting fixture may further include one or more coolant pipes coupled to the frame to carry a flow of fluid coolant to extract the heat generated by the LED module(s). In some implementations, the coolant pipe(s) may be press-fit or crush-fit into respective coolant channel(s) formed along a portion of the frame to increase thermal contact. The coolant pipe(s) may be formed from various materials, such as a copper due, in part, to its antimicrobial and antifouling properties. The coolant pipes may be further plated with nickel.

In some implementations, the frame may be shaped and/or dimensioned such that the coolant channel(s) and, hence, the coolant pipe(s) are disposed between the LED module(s) and the control circuitry. In this manner, the fluid coolant may extract the heat generated by the LED module(s) while reducing or, in some instances, preventing the control circuitry from being heated by the LED module(s). Said in another way, the frame may be structured to provide a thermal break or barrier between the LED module(s) and the control circuitry such that the heat generated by the LED module(s) is primarily transferred to the fluid coolant.

In some implementations, the frame may be an assembly of multiple components supporting the LED module(s) and the control circuitry. For example, the frame may include a first frame component to support the LED module(s) and a second frame component to support the control circuitry. The first frame component may include the coolant channel(s) formed therein and may be formed from a thermally conductive material, such as aluminum, to conduct the heat generated by the LED module(s) to the coolant pipe(s). The second frame component may be formed from an electrically insulating material, such as plastic, to electrically isolate the control circuitry from the other components of the lighting fixture. In some implementations, the first frame component may span a length of the lighting fixture while the second frame component may only span a portion of the length of the lighting fixture.

The first frame component may also have at least two sides that each have mounting channels formed therein to support the LED module(s) and the second frame component. In particular, one or more LED modules may be slidably positioned along one of the mounting channels of the first frame component and secured to the first frame component using various coupling mechanisms including, but not limited to, a zip tie and a fastener. Similarly, the second frame component supporting the control circuitry may also be slidably positioned along a mounting of the first frame component and coupled to the first frame component using, for example, a zip tie and/or a fastener.

In some implementations, the LED modules may be disposed on different sides of the frame to provide bi-directional, tri-directional, quad-directional, and/or omni-directional lighting from the lighting fixture. In other words, the LED modules may be positioned and/or oriented to emit radiation in different directions having an angular distribution up to $4\pi$ steradians. This may be accomplished, in part, by the frame having multiple sides to support the multiple LED modules. It should be appreciated the frame may still support one or more coolant channels for coolant pipes arranged to extract the heat generated from each LED module. Furthermore, it should also be appreciated the frame may have a structure that forms a thermal break or barrier to reduce or, in some instances, prevent heating of the control circuitry by the LED modules.

Additionally, the lighting fixture may further include an enclosure, such as a tube, that surrounds and encapsulates the frame, the LED module(s), the control circuitry, and at least a portion of the coolant pipe. For example, the lighting fixture may include a tube that spans the length of the lighting fixture and defines a cavity to contain the frame, the LED module(s), the control circuitry, and at least a portion of the coolant pipe. The tube may thus be transparent to the radiation emitted by the LED module(s). The tube may further include a first open end and a second open end, which may each be covered by end caps, thus sealing the cavity of the tube. The cooling pipe may be routed through respective fluidic feedthroughs of each end cap and the electrical cable(s) providing electrical power and/or data communication may be routed through an electrical feedthrough on one or both of the end caps.

In some implementations, the tube and the end caps may sufficiently seal the cavity to reduce or, in some instances, prevent the infiltration of dust, dirt, and/or water. For example, the end caps may form a water-resistant seal with the tube to protect the various components disposed within the cavity of the tube. In some implementations, the water-resistant seal may also enable the lighting fixture to be submerged in a liquid (e.g., water) to illuminate the plants (e.g., algae, seaweed). Additionally, the tube and the end caps may provide a smooth exterior surface that may be more easily cleaned compared to conventional lighting fixtures, which often include corrugated exterior surfaces for convective air cooling (e.g., heat fins) or for manufacturability (e.g., recesses to reduce the weight of the lighting fixture).

In some implementations, the tube may be shaped and/or dimensioned to reduce or, in some instances, eliminate physical contact with the frame, the LED module(s), the control circuitry, and the portion of the coolant pipe disposed within the cavity of the tube. The tube may further contain air, gas (e.g., an inert gas such as argon or nitrogen), or vacuum separating the tube from the various components disposed therein to provide a thermally insulating barrier that reduces or, in some instances, prevents the heat generated by the LED module(s) from being dissipated directly into the surrounding environment.

The tube and the end caps may also enable the lighting fixture to be translationally and/or rotationally adjustable, thus enabling the user to change the illumination profile of the lighting fixture after installation. For example, the lighting fixture may be coupled to a support structure in the environment (e.g., a rack structure) by a clamping mechanism (e.g., a swivel joint clamp) that enables rotation of the lighting fixture about a longitudinal axis of the tube while mechanically constraining the other translational and rotational degrees of freedom. In another example, the lighting fixture may be coupled to the support structure by a commodity clamp that provides sufficient clearance for the tube to be slidably adjustable along the longitudinal axis of the tube. This may enable adjustments to the lateral spacing between neighboring lighting fixtures in the CEH system, particularly if the lighting fixtures are electrically and fluidically coupled to one another via compliant cabling and/or hoses. In yet another example, the lighting fixture may be coupled to a motorized, electronically controllable clamping mechanism that provides translational and/or rotational adjustment of the lighting fixture. Thus, a single lighting fixture may be adjusted to provide, for example, simulated sunlight.

The tube may be formed from various materials including, but not limited to, glass (e.g., quartz), polycarbonate, acrylic, and polymethylmethacrylate (PMMA). The tube may generally provide a transmittance greater than or equal to about 80% and, more preferably, greater than or equal to 90% across various wavelength regimes including, but not limited to, ultraviolet, visible, near-infrared, mid-infrared, and long-infrared wavelength ranges. Depending on the materials used to form the tube 1300, various methods of manufacture may be utilized including, but not limited to, extrusion, injection molding, blow molding, and manual molding. For instances where the tube 1300 is assembled from multiple parts, various coupling mechanisms may be used for assembly including, but not limited to, snap fits, screw fasteners, bolt fasteners, adhesives, brazing, and welding.

In some implementations, each end cap may be a two-part assembly that includes an end cap support that couples to the frame and an end cap cover that covers an open end of the tube and the end cap support. The end cap support and the end cap cover may together form a clamp that couples the tube to the end cap. In some implementations, a clamp may couple the end cap cover to the tube.

In some implementations, the frame of the lighting fixture may thermally expand during operation due to the heat generated by the LED module(s). To accommodate a change in length of the frame, the end cap cover may be formed from a compliant material that deforms in shape as the frame thermally expands (or contracts). The compliance of the end cap cover may further ensure the end cap remains coupled to the tube so that the cavity remains substantially sealed or sealed. In some implementations, the end cap support may be formed from a rigid plastic or polymer including, but not limited to, polycarbonate and glass-filled polycarbonate. In some implementations, the end cap cover may be formed from a compliant plastic or polymer including, but not limited to, urethane, rubber, and silicone.

The integrated fluid cooling system in the lighting fixture may enable a power density, defined as the ratio of the electrical power input to the exterior length or volume of the lighting fixture and/or the volume of the grow space, appreciably higher than conventional lighting fixtures. For example, the lighting fixture may nominally have a width (e.g., the exterior width of the frame or the tube) of about 2 inches and a length (e.g., the exterior length of the fame or the tube) of ranging between about 48 and about 96 inches. Generally, the length of the lighting fixture may correspond to standard rack lengths in a vertical grow rack system. The lighting fixture may further receive AC power that may scale with the length of the lighting fixture.

For example, the lighting fixture may receive an AC power greater than or equal to about 175 W for a length of about 96 inches, resulting in a power density per unit length of the lighting fixture greater than or equal to about 1.8 W per inch. If the lighting fixture further has a width of about 2 inches, the power density per unit volume of the lighting fixture may be greater than or equal to about 0.6 W per cubic inches. In another example, the power density per unit volume of the grow space may be greater than about 5 W per cubic feet corresponding to an AC power of about 175 W and a cubic grow space volume with 3.27 feet (i.e., 1 m) long sides. These dimensions may enable the lighting fixture to be installed in close proximity grow systems, such as a vertical grow rack system. The combination of the electrical power input and the cooling provided by the coolant pipes may enable the lighting fixture to provide higher light levels to illuminate plants across later growth stages.

The lighting fixture may generally receive electrical power and data communication via one or more electrical cables. In some implementations, the electrical cable(s) may be routed through an electrical feedthrough in the end caps. In some implementations, the lighting fixture may include one or more power and/or communication ports. The power and/or communication ports may be various types of ports including, but not limited to, a Universal Serial Bus (USB) port, a Power over Ethernet (PoE) port, a RS-485 port, a power line carrier (PLC) port, and a wireless communication device (e.g., WiFi). The electrical power may be AC power supplied at a voltage ranging between 208 V to 277 V and a current ranging between 15 A and 30 A.

In some implementations, the lighting fixture may include a port that provides both electrical power and data communication. For example, the lighting fixture may include a PLC port to connect to a PLC cable with a single conductor (e.g., a single wire) that carries both power and data signals. The control circuitry may include electronics to extract the data signals from the power. In this manner, a single electrical cable may be connected to the lighting fixture, thus simplifying installation.

Additionally, the electrical cable (also referred to herein as the "electrical cable assembly") that is coupled to the lighting fixture may include one or more drop tee connectors to provide multiple branches to provide electrical power and/or data communication to other lighting fixtures. In other words, the electrical cable assembly may supply power and data communication to an array of lighting fixtures, further simplifying installation. In some implementations, the electrical cable assembly may be a modular configuration where multiple drop tee connectors and cables may be coupled together based on the number of lighting fixtures being connected together.

Various sensors may be integrated into the lighting fixture and/or communicatively coupled to the lighting fixture including, but not limited to, a light temperature sensor to monitor the temperature of the LED module(s), a cold-side fluid coolant temperature sensor to measure the temperature of the fluid coolant entering the coolant pipe of the lighting fixture, a hot-side fluid coolant temperature sensor to measure the temperature of the fluid coolant exiting the coolant pipe of the lighting fixture, an ambient air temperature sensor, a relative humidity sensor, a carbon dioxide sensor, an air speed sensor, and a camera.

In one exemplary implementation, a fluid-cooled LED-based lighting fixture for an agricultural environment includes a frame having a coolant channel, at least one LED light source coupled to the frame to emit radiation, control circuitry coupled to the frame and electrically coupled to the at least one LED light source to receive AC power and to control the at least one LED light source, a tube defining a cavity with a first open end and a second open end where the cavity contains the frame, the at least one LED light source, and the control circuitry and the tube is transparent to the radiation, a first end cap disposed at the first open end of the tube and coupled to the frame, a second end cap disposed at the second open end of the tube and coupled to the frame where the first and second end caps enclosing the cavity of the tube, and a coolant pipe at least partially disposed in and thermally coupled to the coolant channel of the frame to carry a fluid coolant that extracts heat generated by the at least one LED light source during operation of the lighting fixture where the coolant pipe passes through a first fluidic feedthrough in the first end cap and a second fluidic feedthrough in the second end cap.

In another exemplary implementation, a fluid-cooled LED-based lighting fixture includes a frame with a first frame component having a first side and a second side opposite the first side where the second side has a coolant channel formed therein and a second frame component coupled to the second side of the first frame component. The lighting fixture further includes at least one LED light source coupled to the first frame component to emit radiation, control circuitry coupled to the second frame component and electrically coupled to the at least one LED light source to receive AC power and to control the at least one LED light source, and a coolant pipe at least partially disposed in and thermally coupled to the coolant channel of the first frame component to carry a fluid coolant that extracts heat generated by the at least one LED light source. The first frame component thermally conducts the heat generated by the at least one LED light source to the coolant pipe and the second frame component electrically isolates the control circuitry from the first frame component.

In another exemplary implementation, a fluid-cooled LED-based lighting fixture includes a frame having a coolant channel, at least one LED light source coupled to the frame to emit radiation, control circuitry coupled to the frame and electrically coupled to the at least one LED light source to receive an electrical power input and to control the at least one LED light source where the electrical power input being greater than or equal to about 175 W, and a coolant pipe at least partially disposed in and thermally coupled to the coolant channel of the frame to carry a fluid coolant that extracts heat generated by the at least one LED light source during operation of the lighting fixture. The frame, the at least one LED light source, the control circuitry, and at least a portion of the coolant pipe are dimensioned to fit within a tube having an exterior diameter of about 2 inches and an exterior length of about 96 inches.

In another exemplary implementation, a fluid-cooled LED-based lighting fixture for an agricultural environment includes a frame having a coolant channel, at least one white LED light source coupled to the frame to emit photosynthetically active radiation (PAR) at a first intensity, control circuitry coupled to the frame and electrically coupled to the at least one white LED light source to receive an electrical power input and to control the at least one white LED light source where the electrical power input is greater than or equal to about 175 W and the control circuitry includes a dimmer to controllably reduce the first intensity of the PAR to a second intensity less than the first intensity, a tube defining a cavity with a first open end and a second open end where the cavity contains the frame, the at least one white LED light source, and the control circuitry and further contains one of air, gas, or vacuum physically separating the tube from the frame, the at least one white LED light source, and the control circuitry to form a thermal barrier that reduces transfer of heat generated by the at least one white LED light source during operation of the lighting fixture to the agricultural environment, a first end cap disposed at the first open end of the tube and coupled to the frame, a second end cap disposed at the second open end of the tube and coupled to the frame, the first and second end caps enclosing the cavity of the tube, and a coolant pipe at least partially disposed in and thermally coupled to the coolant channel of the frame to carry a fluid coolant that extracts heat generated by the at least one white LED light source during operation of the lighting fixture, the coolant pipe passing through a first fluidic feedthrough in the first end cap and a second fluidic feedthrough in the second end cap. The tube is also transparent to the radiation and the tube has an exterior diameter of about 2 inches and an exterior length of about 96 inches.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A shows a conventional controlled agricultural environment where one or more HPS lamps are used.

FIG. 2B-1 shows a front view of a first portion of the lighting fixture of FIG. 2A.

FIG. 2B-2 shows a front view of a second portion of the lighting fixture of FIG. 2B-1.

FIG. 2C-1 shows a bottom view of the first portion of the lighting fixture of FIG. 2B-1.

FIG. 2C-2 shows a bottom view of the second portion of the lighting fixture of FIG. 2B-2.

FIG. 2I shows a cross-sectional view of the lighting fixture of FIG. 2A corresponding to the plane A-A of FIG. 2B-2.

FIG. 7B shows a bottom view of the LED module of FIG. 7A.

FIG. 7C shows a top view of the LED module of FIG. 7A.

FIG. 8B shows a bottom view of the LED module of FIG. 8A.

FIG. 8C shows a top view of the LED module of FIG. 8A.

FIG. 11B-1 shows a first portion of a circuit diagram corresponding to the control circuitry of FIG. 9A.

FIG. 11B-2 shows a second portion of a circuit diagram corresponding to the control circuitry of FIG. 9A.

FIG. 11B-3 shows a third portion of a circuit diagram corresponding to the control circuitry of FIG. 9A.

FIG. 11B-4 shows a fourth portion of a circuit diagram corresponding to the control circuitry of FIG. 9A.

FIG. 13A-1 shows a top view of a first portion of another exemplary lighting fixture with a tube enclosure.

FIG. 13A-2 shows a top view of a second portion of the lighting fixture of FIG. 13A.

DETAILED DESCRIPTION

Figure 1B:
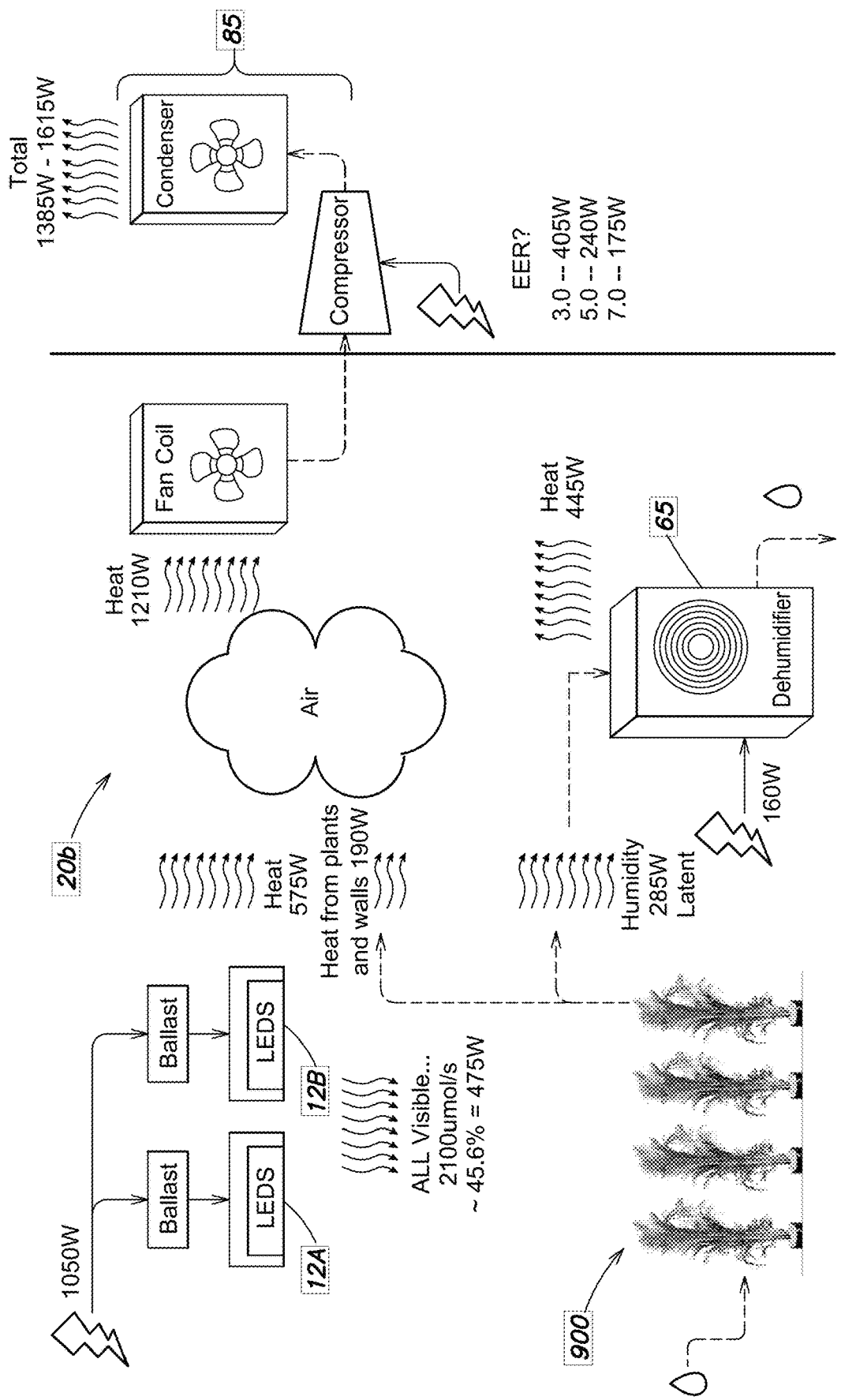
FIG. 1B shows a conventional controlled agricultural environment where one or more conventional LED-based lighting fixtures are used.

Following below are more detailed descriptions of various concepts related to, and implementations of, a fluid-cooled LED-based lighting fixture for a close proximity grow system. It should be appreciated that various concepts introduced above and discussed in greater detail below may be implemented in numerous ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive lighting fixtures are provided, wherein a given example or set of examples showcases one or more particular features of a frame, a LED module, control circuitry, a tube, and an end cap. It should be appreciated that one or more features discussed in connection with a given example of components of a lighting fixture may be employed in other examples of lighting fixtures according to the present disclosure, such that the various features disclosed herein may be readily combined in a given system according to the present disclosure (provided that respective features are not mutually inconsistent).

Certain dimensions and features of the lighting fixture are described herein using the terms "approximately," "about," "substantially," and/or "similar." As used herein, the terms "approximately," "about," "substantially," and/or "similar" indicates that each of the described dimensions or features is not a strict boundary or parameter and does not exclude functionally similar variations therefrom. Unless context or the description indicates otherwise, the use of the terms "approximately," "about," "substantially," and/or "similar" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

A Fluid-Cooled LED-Based Lighting Fixture

Controlled Environment Horticulture (CEH) (also referred to as controlled environment agriculture or CEA) is the process of growing plants in a controlled environment where various environmental parameters, such as lighting, temperature, humidity, nutrient levels, soil moisture, and carbon dioxide ($CO_2$) concentrations are monitored and adjusted to improve the quality and yield of the plants. Compared to conventional approaches of plant cultivation, CEH may enable year-round production of plants, insensitivity to variable weather conditions, reduce pests and diseases, and reduce the amount of resources consumed on a per plant basis. Additionally, the general concepts of CEH may be applied to various types of growing systems including, but not limited to soil-based systems and hydroponics systems.

A controlled agricultural environment is typically enclosed, at least in part, by a building structure such as a greenhouse, a grow room, or a covered portion of a field in order to provide some degree of control over environmental conditions. One or more artificial lighting systems are often used in such controlled agricultural environments to supplement and/or replace natural sunlight that may be obstructed by the building structure or insufficient during certain periods of the year (e.g., winter months). The use of an artificial lighting system may also provide yet another measure of control where the intensity and spectral characteristics of the lighting system may be tailored to improve the photosynthetic rates of plants. Various types of artificial lighting systems may be used including, but not limited to, a high intensity discharge lamp, a light emitting diode (LED), and a fluorescent lamp.

Artificial lighting systems, however, generate heat, which when dissipated into the environment may contribute appreciably to the cooling load of the controlled agricultural environment. In order to accommodate the higher cooling load and thus maintain the controlled agricultural environment within a desired temperature envelope, the cooling capacity of a cooling system may need to be increased resulting in greater energy consumption. For a controlled agricultural environment on a variable energy budget, greater energy consumption may lead to higher energy costs. Alternatively, for a controlled environment on a fixed energy budget, a larger portion of the energy budget may be consumed by the cooling system, thus reducing the energy and capacity available to support a larger growing area.

To illustrate the impact that excess heat generated by an artificial lighting system has on energy consumption, FIG. 1A shows a conventional controlled agricultural environment 20a with one or more high pressure sodium (HPS) lamps 10, which is a particular type of high intensity discharge lamp used to irradiate a plurality of plants 900. The exemplary controlled agricultural environment 20a shown in FIG. 1A further includes a dehumidifier 65 to manage the relative humidity of the environment and an air conditioner 85, which may include a fan coil, compressor, and condenser. Energy consumption by the air conditioner 85 generally depends on (1) the total cooling load of the environment and (2) the energy efficiency ratio (EER) of the air conditioner 85. The EER of an air conditioner is defined as the ratio of the cooling capacity (in Watts) to the input power (in Watts) at a given operating point. The EER was calculated with a 35° C. (95° F.) outside temperature and an inside (return air) temperature of 26.7° C. (8° F.) and 50% relative humidity. A higher EER indicates the air conditioner 85 is more efficient.

As shown in FIG. 1A, the HPS lamps 10 may increase the cooling load of the environment by (1) dissipating heat convectively and/or radiatively directly into the environment and (2) increasing the relative humidity of the environment and thus, the power input and resultant heat generated by the dehumidifier 65. The cooling load in this exemplary controlled agricultural environment is about 1315 W. For an EER ranging from 3 to 7, the input power for the air conditioner thus ranges from 450 to 190 W, respectively. Based on the input power to the HPS lamps 10 of 1009 W and the dehumidifier 65 of 265 W, the air conditioner 85 thus consumes about 13% and 26% of the total energy budget, corresponding to an EER of 7 and 3, respectively. Furthermore, the heat dissipated by the HPS lamps 10 may give rise to appreciably large temperature differences in the environment, which, in some instances, may compromise the temperatures of different growing areas (e.g., the air conditioner 85 may cause one growing area to become too cold in order to compensate the heat dissipated in another growing area).

The amount of heat generated may vary depending on the type of lighting system used. However, artificial lighting systems for controlled agricultural environments may have large power inputs (e.g., greater than 1000 W) in order to sustain a desired level of photosynthetically active radiation (PAR) and/or may operate in confined spaces (e.g., a close proximity grow system). Thus, the heat generated by various types of lighting systems may still constitute a large portion of the heat produced within the environment.

In another example, FIG. 1B shows a conventional controlled agricultural environment 20b where one or more conventional LED-based lighting fixtures 12A and 12B irradiate a plurality of plants 900. In the controlled agricultural environment 20b, the LED-based lighting fixtures 12A and 12B dissipates heat primarily via convection, which may reduce the power input and heat generated by the dehumidifier 65. In this example, the total cooling load is about 1210 W. For an EER ratio ranging from 3 to 7, the input power for the air conditioner 85 ranges from 405 W to 175 W. Compared to the controlled agricultural environment 20a, the LED-based lighting fixtures 12A and 12B decreases the total energy budget of the controlled agricultural environment 20b. However, the proportion of energy used by the air conditioner 85 remains similar to the first example at about 13% and 25% for an EER ratio of 7 and 3, respectively.

As shown in the two exemplary controlled agricultural environments 20a and 20b, artificial lighting systems may generate a substantial amount of heat, which may result in air conditioning systems consuming a substantial portion of the total energy budget in a controlled agricultural environment. Furthermore, the heat generated by the artificial lighting systems is directly dissipated into the environment in an uncontrolled manner, thus making it more challenging to regulate the temperature of the environment.

For these reasons, the lighting fixtures disclosed herein utilize LED light sources to lower the total energy budget in combination with an integrated fluid-cooled system to extract a substantial portion of the heat generated by the LED light sources. In this manner, the amount of heat transferred to the environment by the lighting fixture may be substantially reduced or, in some instances, eliminated, thus decreasing the cooling load. In some implementations, the lower cooling load may reduce the energy input for any air conditioning systems in the controlled agricultural environment. However, it should be appreciated that, in other implementations, the cooling load may be reduced to such an extent that the air conditioning systems may be eliminated from the controlled agricultural environment.

Figure 1C:
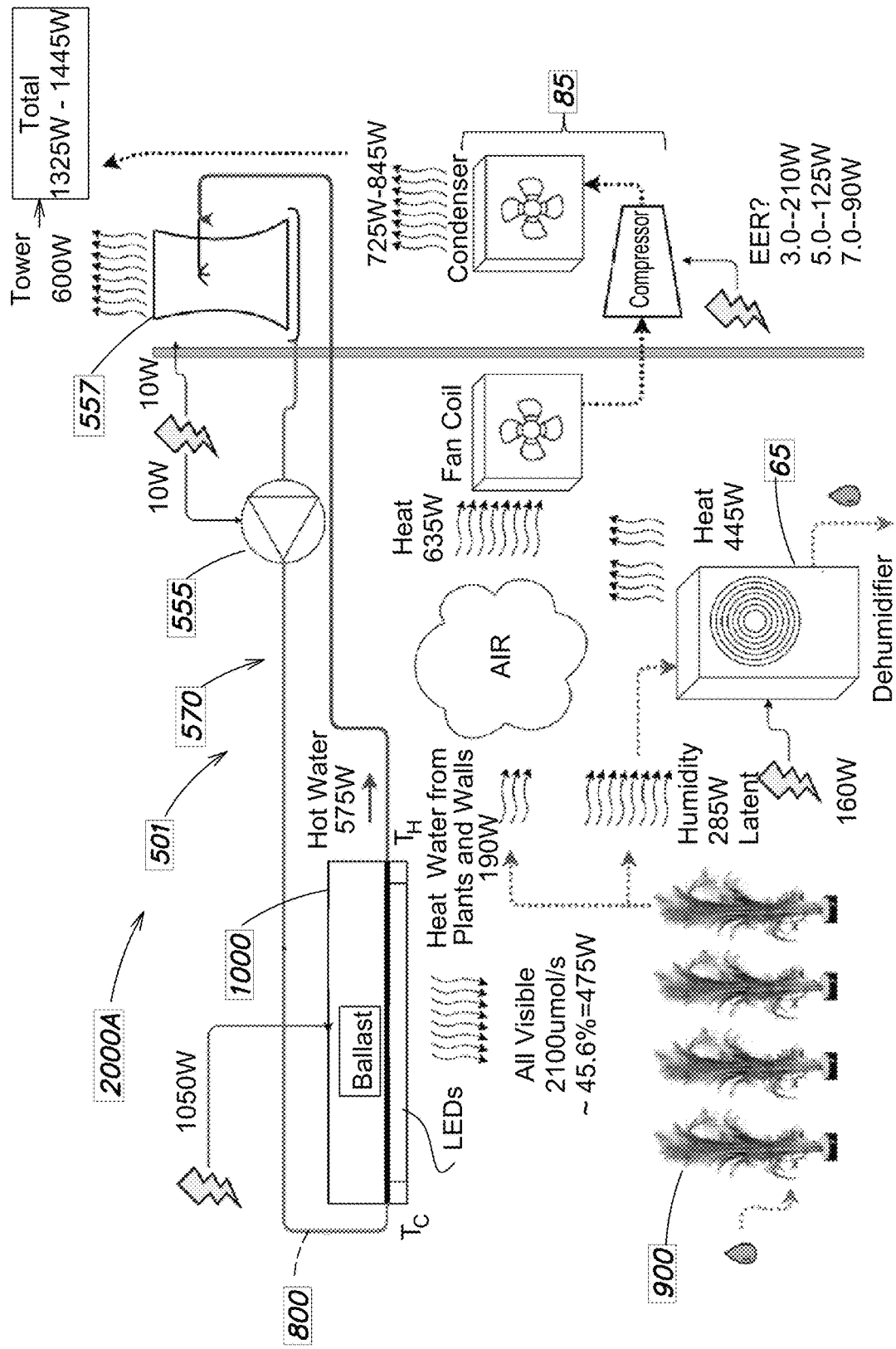
FIG. 1C shows an exemplary controlled agricultural environment where one or more fluid-cooled LED-based lighting fixtures are retrofit into a pre-existing environment, according to some implementations of the disclosure.

FIG. 1C shows an exemplary implementation of a controlled agricultural environment 2000A (also referred to herein as a CEH system 2000A) with a fluid-cooled LED-based lighting fixture 1000 retrofit into a pre-existing environment that includes a dehumidifier 65 and an air conditioner 85. While not shown explicitly in FIG. 1C, the environment may be constituted, at least in part, by a building structure to house a plurality of plants 900, one or more lighting fixtures 1000, and other equipment. The lighting fixture 1000 is cooled by a fluid coolant 800 that circulates through a fluid coolant circuit 570 of a hydronics system 501. Heat carried by the fluid coolant 800 is removed by a cooling tower 557 (i.e., the heat rejection device) located outside of the controlled agricultural environment 2000A. The coolant circuit 570 may include one or more pumps, regulators and/or valves 555 to control the flow of the fluid coolant 800 in the fluid coolant circuit 570.

As shown in FIG. 1C, the pumps, regulators, and/or valves 555 may generate a flow of fluid coolant 800 that enters the lighting fixture 1000 with a colder temperature Tc and exits the lighting fixture 1000a with a hotter temperature TH. The rise in temperature of the fluid coolant 800 is due, in part, to the convective heating of the fluid 800 as it passes through the lighting fixture 1000 where the heat is primarily generated by one or more LED modules in the lighting fixture 1000.

The fluid coolant 800 may thus capture and transport heat generated by the lighting fixture 1000, which substantially reduces the cooling load of the environment and, hence, the power inputs to the air conditioner 85 and/or the dehumidifier 65. As shown in FIG. 1C, the cooling load for the controlled agricultural environment 2000A is about 635 W, which is approximately 50% of the cooling load in the controlled agricultural environments 20a and 20b. For an EER ranging from 3 to 7, the input power for the air conditioner thus ranges from 210 W to 90 W, respectively. Based on the input power to the lighting fixture 1000 of 1009 W and the dehumidifier 65 of 160 W, the air conditioner 85 thus consumes about 7% and 15% of the total energy budget, corresponding to an EER of 7 and 3, respectively. Additionally, the heat dissipated to the environment may also be appreciable reduced, thus reducing large temperature gradients in the environment.

Although a cooling tower 557 is shown in FIG. 1C to provide evaporative cooling of the heated fluid coolant 800, it should be appreciated that other types of heat rejection devices may be used to remove heat from the fluid coolant 800. Some examples of heat rejection devices include, but are not limited to, various types of evaporative coolers, "free" coolers, chillers, dry coolers, air source coolers, ground source heat exchangers, water source heat exchangers, or any combinations of the foregoing.

Figure 1D:
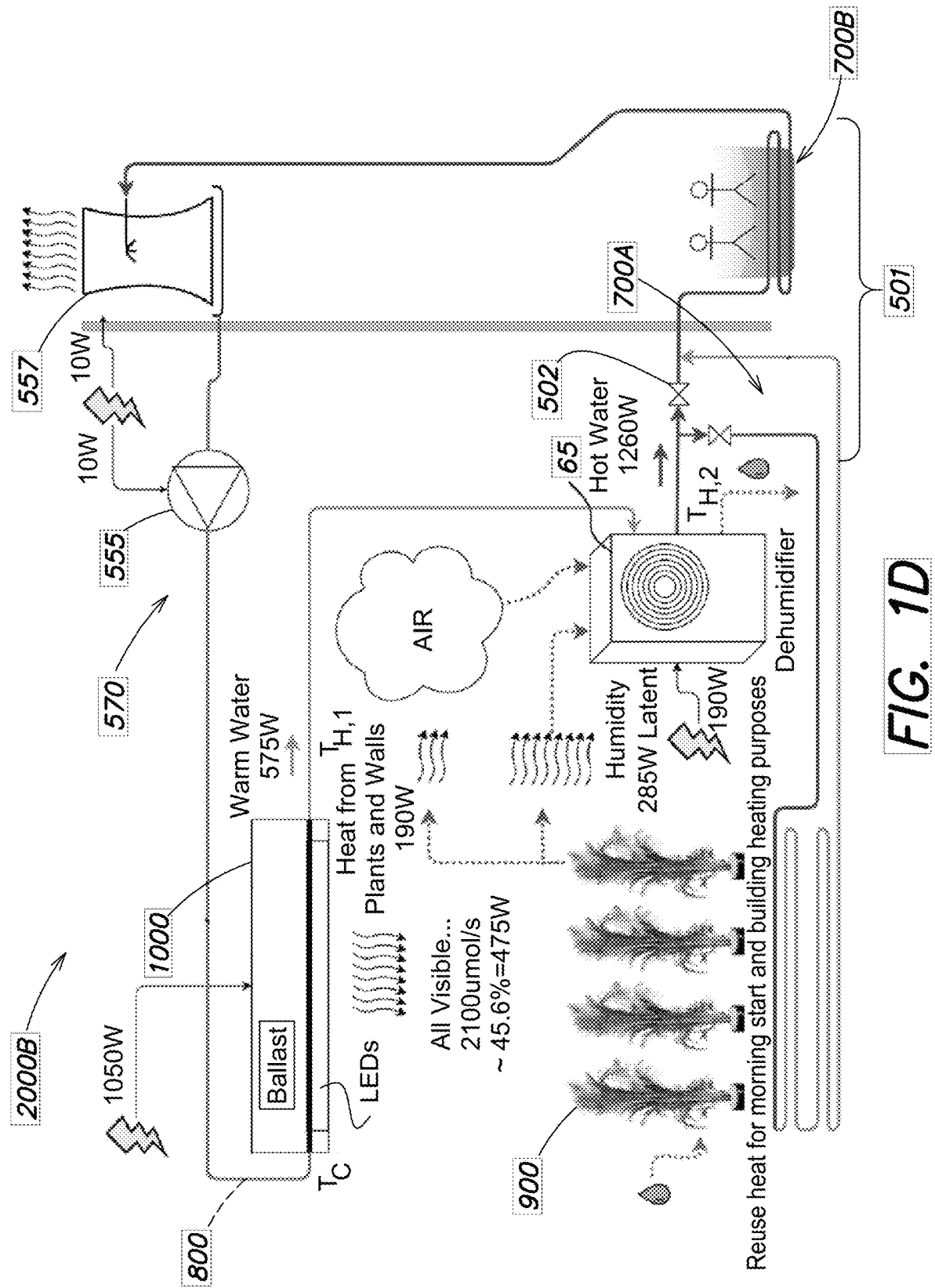
FIG. 1D shows an exemplary controlled agricultural environment where one or more fluid-cooled LED-based lighting fixtures are coupled to a hydronics system, according to some implementations of the disclosure.

In another example, FIG. 1D shows an exemplary controlled agricultural environment 2000B where a lighting fixture 1000 is coupled to a coolant circuit 570 of a hydronics system 501. The hydronics system 501 includes multiple fluid circuits 700A and 700B, which regulate and/or maintain the temperature of various portions of the controlled agricultural environment 2000B and/or space near the controlled agricultural environment 2000B (e.g., a hot pool, the growing area) by utilizing the waste heat generated by the lighting fixture 1000 as a heat source. The coolant circuit 570 may receive heat from the lighting fixture 1000 and other environment sources (e.g., a dehumidifier 65, the ambient air). This excess heat generated in the environment may be substantially removed to further improve the energy savings when operating the controlled agricultural environment 2000B. In some implementations, the cooling load may be sufficiently reduced so as to eliminate the air conditioning systems entirely (i.e., there is no air conditioner fan coil, compressor or condenser).

As shown in FIG. 1D the controlled agricultural environment 2000B may include a dehumidifier 65 to regulate the relative humidity of the environment. The coolant circuit 570 may direct fluid coolant 800 heated by the lighting fixture 1000 into the dehumidifier 65 to further remove heat generated by the dehumidifier 65 in a convective manner similar to the removal of heat from the lighting fixture 1000. The coolant circuit 570 may then direct the fluid coolant 800 to the fluid circuits 700A and 700B, which may be used to heat the plurality of plants 900 and a hot pool, respectively. The coolant circuit 570 may distribute and direct heated fluid coolant 800 in a controlled manner by one or valves 502 before the cooling tower 557 removes the remaining heat in the fluid coolant 800.

In some implementations, the hydronics system 501 may also be used to regulate the temperature of the ambient environment itself. For example, the hydronics system 501 may be used to heat the controlled agricultural environment 2000B convectively and/or radiatively as the fluid coolant 800 flows through the hydronics system 501 using a heat exchanger (not shown). Furthermore, it should be appreciated that in other implementations, the CEH systems may also eliminate the dehumidifier 65 as well. Thus, the coolant circuit 570 may only pass through the lighting fixture 1000 and the fluid circuits 700A and 700B.

A Fluid-Cooled Lighting Fixture for a Close Proximity Grow System

In some implementations, the controlled agricultural environment and/or the CEH system may include a close proximity grow system to provide high density cultivation of various crops using limited space. The close proximity system may be distinguished from other grow systems based on distance between the lighting fixture and the plants, which may range between about 6 inches and about 72 inches. The close proximity grow system may include, but is not limited to a racked CEH system (also referred to as a "stacked CEH system" or a "shelved CEH system"), a vertical CEH system (e.g., deployed in an urban environment such as the interior of a building), an underwater CEH system (e.g., plants grown in a tank of water, an ocean, or a fresh water source), and any combination of the foregoing (e.g., a vertical CEH system deployed underwater for algae or seaweed cultivation).

Figure 2A:
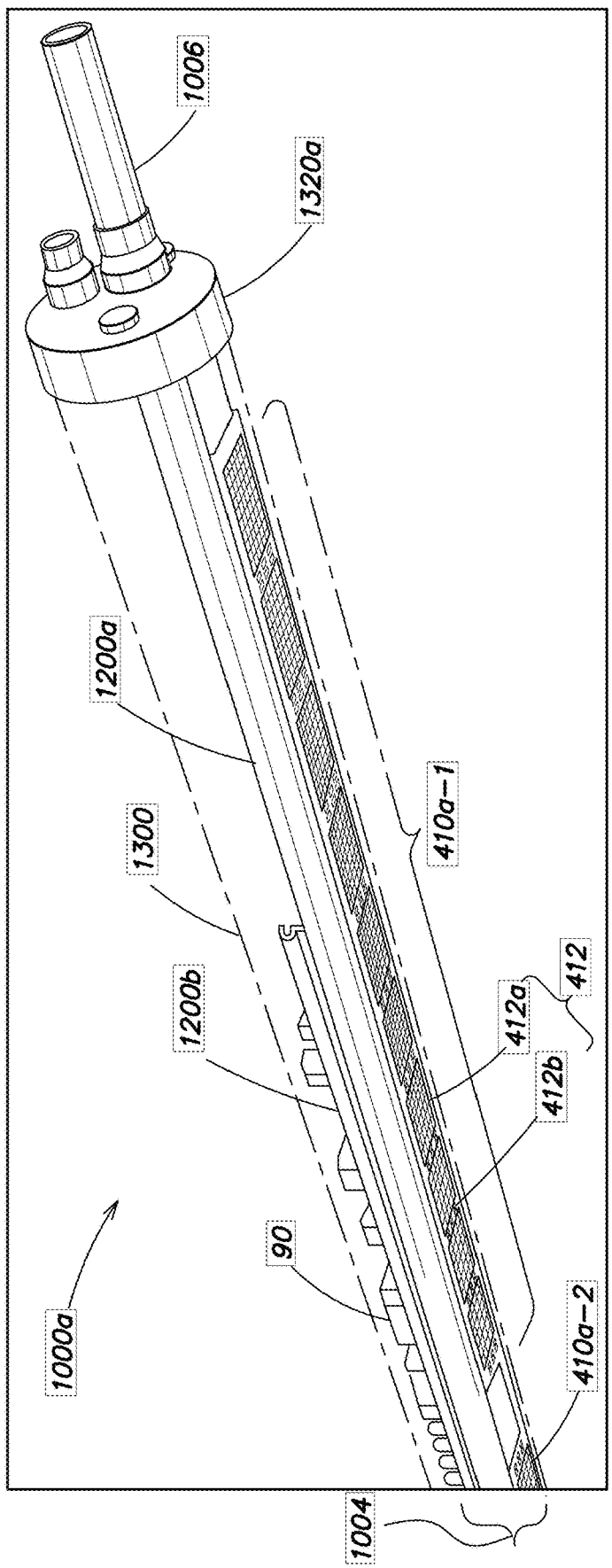
FIG. 2A shows a bottom perspective view of an exemplary fluid-cooled LED-based lighting fixture having a tube enclosure.
Figure 2D:
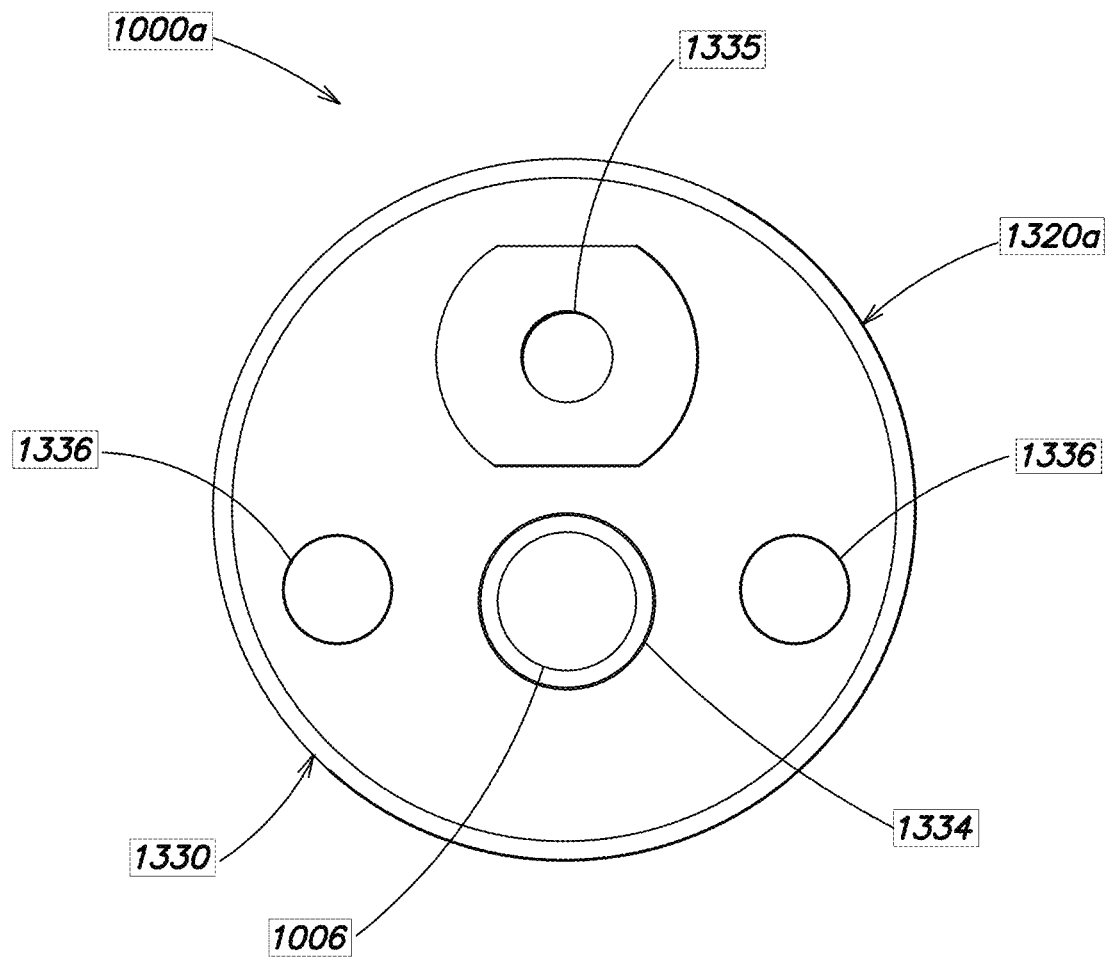
FIG. 2D shows a right-side view of the lighting fixture of FIG. 2A.
Figure 11A:
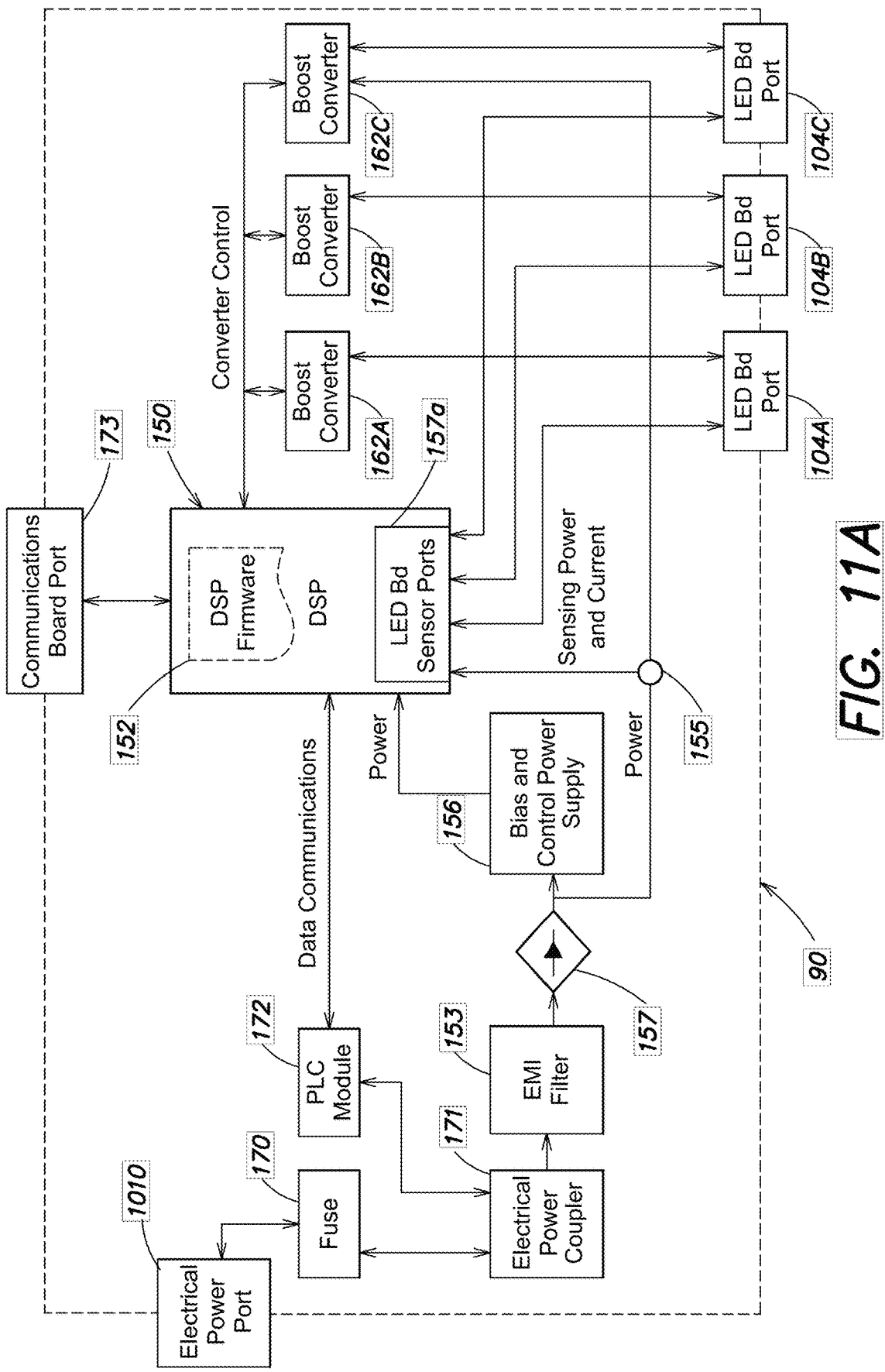
FIG. 11A shows a block diagram of the control circuitry of FIG. 9A.
Figures 1, 11B:
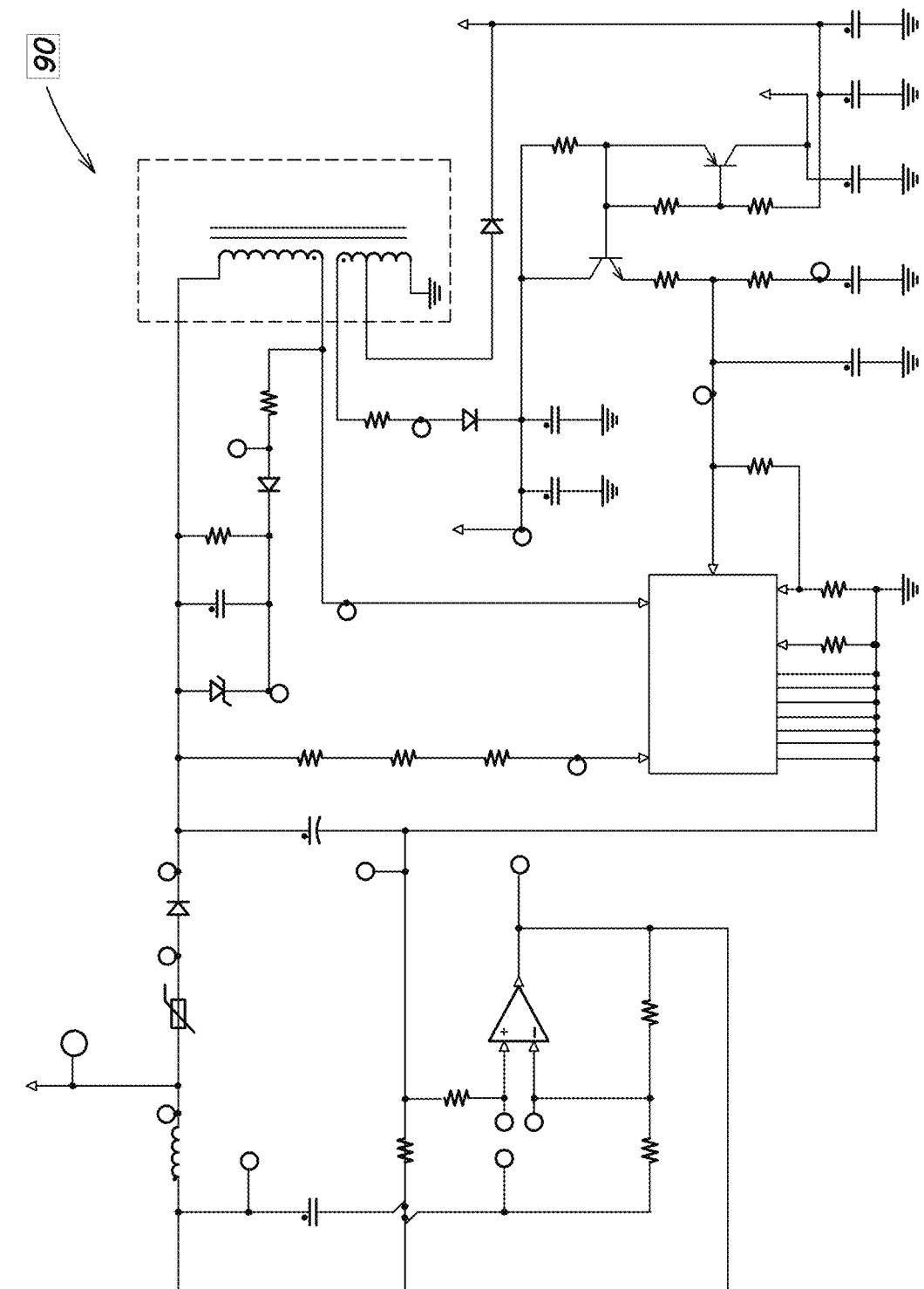
Figures 2, 11B:
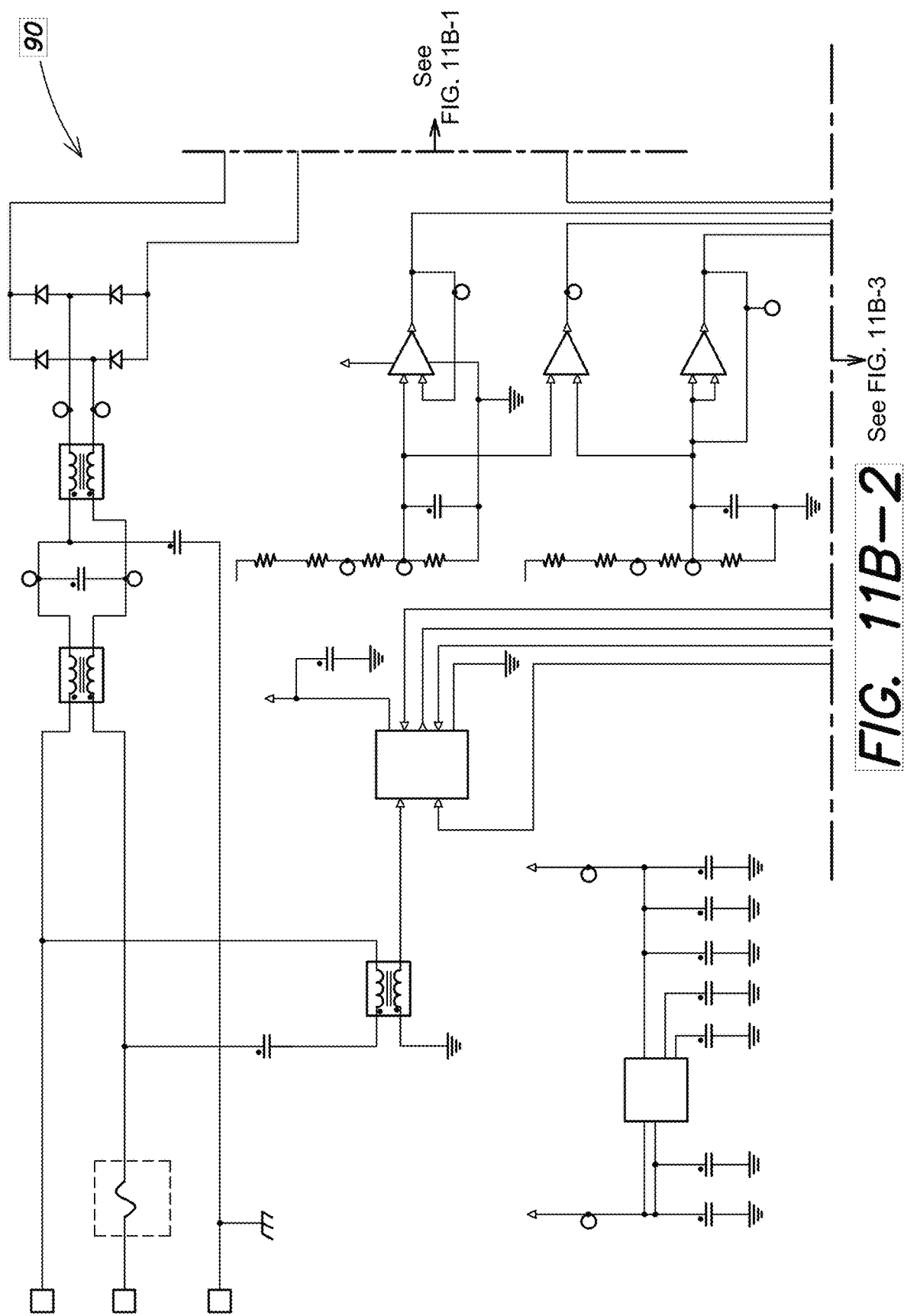
Figures 3, 11B:
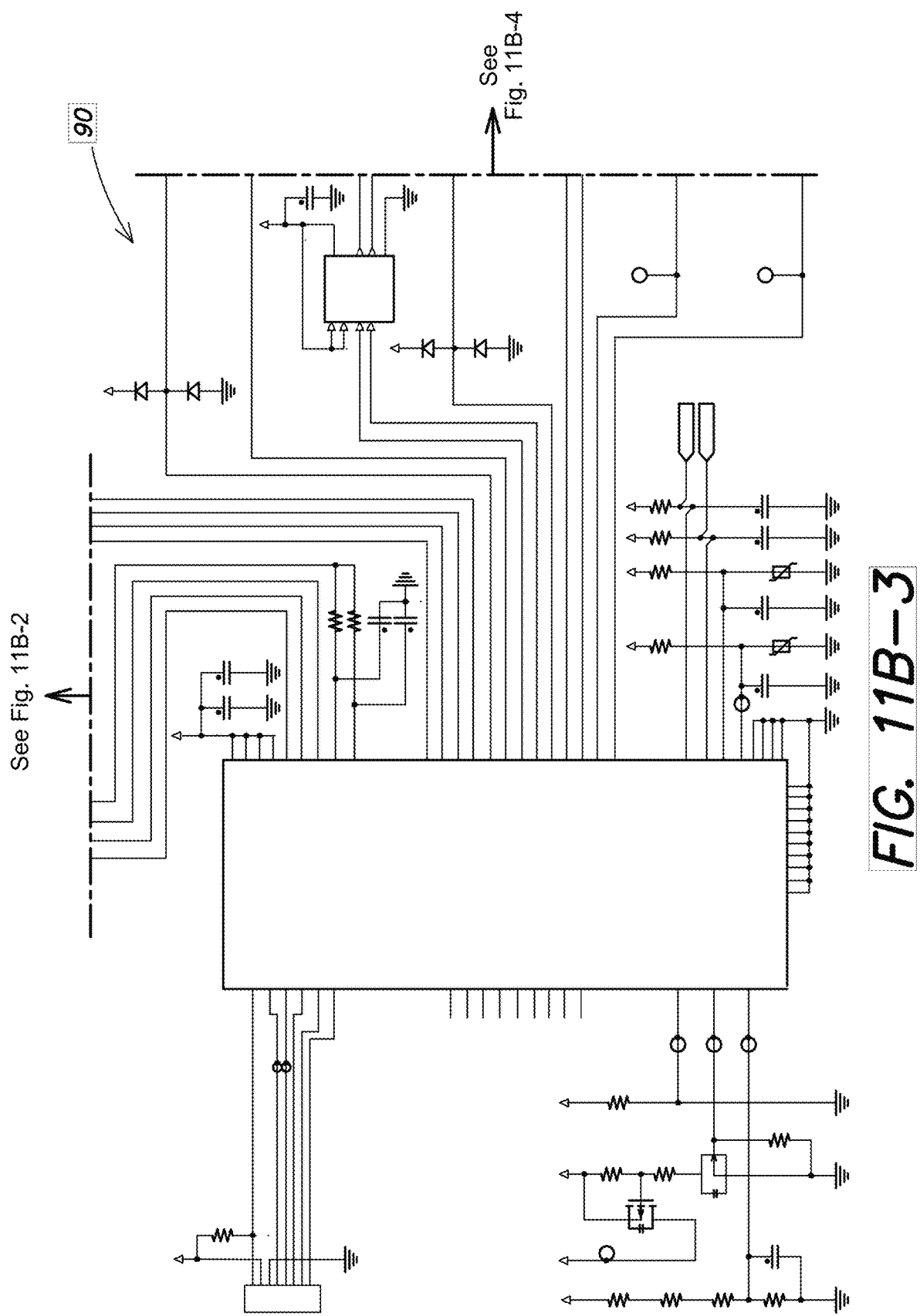

FIGS. 2A-2I show several views of an exemplary lighting fixture 1000*a* that is configured for a close proximity grow system. It should be appreciated, however, the lighting fixture 1000*a* may also be deployed in other types of grow systems. As shown, the lighting fixture 1000*a* may include a frame 1004 to provide mechanical support for various components of the lighting fixture 1000*a*. For instance, FIGS. 2C-1 and 2C-2 show the frame 1004 may support LED modules 410*a*-1, 410*a*-2, 410*a*-3, and 410*a*-4 (collectively referred to herein as LED modules 410*a*). Each of the LED modules 410*a* may emit radiation (e.g., PAR) to illuminate one or more plants in the CEH system. The frame 1004 may also support control circuitry 90 (also referred to as the "processor 90") to electrically power and control the LED modules 410*a*. The frame 1004 may include a coolant channel 1220 to support a coolant pipe 1006, which carries a flow of fluid coolant (e.g., fluid coolant 800) through the lighting fixture 1000*a* to dissipate the heat generated by the LED modules 410*a*.

FIGS. 2A-2C-2 further show the lighting fixture 1000*a* may include a tube 1300 defining a cavity 1302 to contain the frame 1004, the LED modules 410*a*, the control circuitry 90, and a portion of the coolant pipe 1006. The tube 1300 may be transparent to the radiation emitted by the LED modules 410*a*. The tube 1300 may further include a first open end 1304*a* and a second open end 1304*b*. A first end cap 1320*a* may be coupled to the tube 1300 and the frame 1004 to cover the first open end 1304*a*. Similarly, a second end cap 1320*b* may be coupled to the tube 1300 and the frame 1004 to cover the second open end 1304*b*. As shown in FIGS. 2B-1 and 2B-2, the coolant pipe 1006 may be routed and/or pass through the end caps 1320*a* and 1320*b* such that the respective ends of the coolant pipe 1006 protrude from the first and second end caps 1320*a* and 1320*b*. Additionally, one or more electrical cables providing electrical power and/or communication to the lighting fixture 1000*a* may be coupled to a communication port (not shown) disposed on one or both of the end caps 1320*a* and 1320*b* or routed through one or both of the end caps 1320*a* and 1320*b*.

The combination of the tube 1300 and the end caps 1320*a* and 1320*b* may generally enclose and separate the frame 1004, the LED modules 410*a*, the control circuitry 90, and a portion of the coolant pipe 1006 from the surrounding environment. As a result, the exterior dimensions of the lighting fixture 1000*a* may be defined primarily by the dimensions of the tube 1300. In some implementations, the cross-section of the tube 1300 may have an exterior width of about 2 inches. In some implementations, the length of the tube 1300 and, by extension, the lighting fixture 1000*a* may conform with standardized lengths of racks and/or rack support structures in a vertical grow rack system. Thus, the length of the tube 1300 may be about 48 inches or about 96 inches. However, it should be appreciated the length of the tube 1300 may generally range between about 48 inches and about 96 inches.

In some implementations, the tube 1300 may be dimensioned such that the sides and/or edges of the tube 1300 do not physically contact the frame 1004, the LED modules 410*a*, the control circuitry 90, and/or the portion of the coolant pipe 1006 (see, for example, FIG. 2I). The tube 1300 may be further filled with air or gas (e.g., argon, nitrogen), or may be evacuated. Thus, the air, gas, or vacuum disposed between the sides of the tube 1300 and the interior components of the lighting fixture 1000*a*, especially the LED modules 410*a*, may act as a thermally insulating barrier that reduces or, in some instances, eliminates heat dissipation to the surrounding environment through the tube 1300.

In some implementations, the length and/or the weight of the frame 1004 may be sufficiently large to cause the frame 1004 to sag downwards (e.g., at its center point). To prevent the frame 1004 from contacting the tube 1300, the lighting fixtures 1000*a* may include spacers (not shown) disposed at incremental distances along the length of the frame 1004 to position the frame 1004 to reduce or, in some instances, prevent physical contact between the frame 1004 and the tube 1300. The spacers may be shaped and/or dimensioned to fit around at least a portion of the frame 1004 and to physically contact the tube 1300. The spacer may be formed from a thermally insulating material including, but not limited to, polycarbonate and styrofoam to ensure the LED modules 410*a* remain thermally insulated from the immediate surroundings around the tube 1300.

Generally, the tube 1300 may have various cross-sectional shapes including, but not limited to, a circle, an ellipse, a semi-circle, a polygon, and any combination of the foregoing. In some implementations, the tube 1300 may preferably have a circular cross-sectional shape (i.e., the tube 1300 may have a cylindrical shape). The end caps 1320*a* and 1320*b* may also have a cylindrical geometry to conform with the tube 1300. The smooth exterior surface of a cylindrically shaped tube 1300 may make it easier to clean and/or maintain the lighting fixture 1000*a*.

Figure 10B:
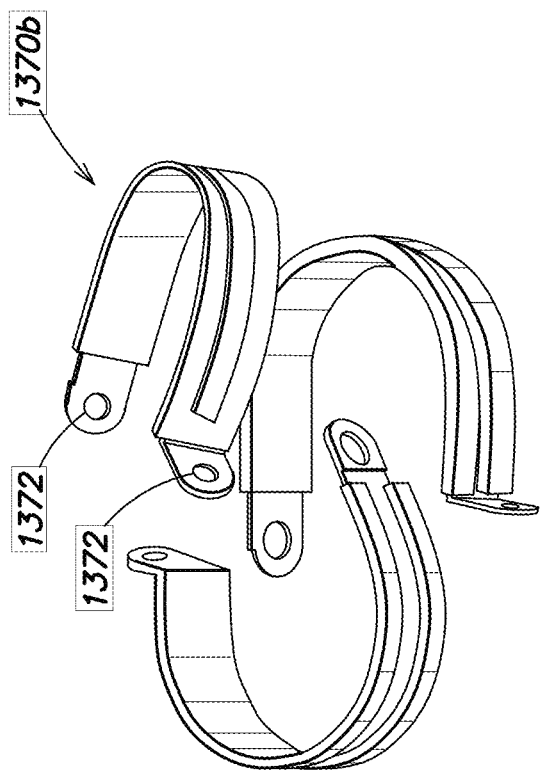
FIG. 10B shows another exemplary mounting clamp.
Figure 10C:
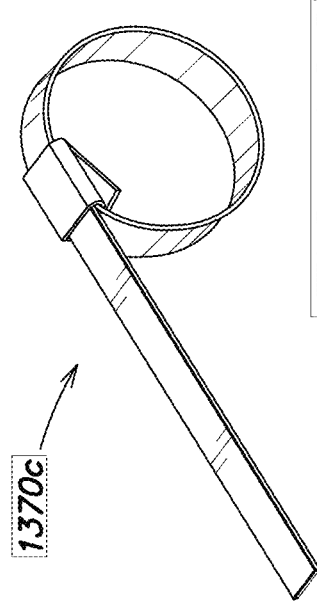
FIG. 10C shows an exemplary zip tie to couple the lighting fixture of FIG. 2A to a rack.
Figure 10A:
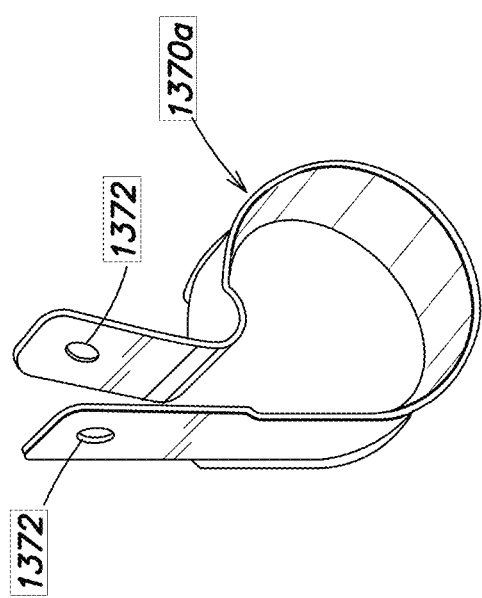
FIG. 10A shows an exemplary mounting clamp to couple the lighting fixture of FIG. 2A to a rack.

The cylindrical geometry of the tube 1300 may also allow the lighting fixture 1000*a* to be coupled to a support structure (e.g., a rack structure) using standard commodity clamps, such as the clamps 1370*a* and 1370*b* shown in FIGS. 10A and 10B. As shown, the clamps 1370*a* and 1370*b* may be shaped to wrap around the tube 1300 and/or the end caps 1320*a* and 1320*b* and coupled to a rack structure using a fastener inserted through the openings 1372 disposed on opposing ends of the clamps 1370*a* and 1370*b* (i.e., the openings 1372 align to an opening on a rack structure). Alternatively, the lighting fixture 1000*a* may be coupled to a support structure using a zip tie 1370*c* as shown in FIG. 10C. Similar to the clamps 1370*a* and 1370*b*, the zip tie 1370*c* may wrap around at least a portion of the tube 1300 and/or the end caps 1320*a* and 1320*b*, fed through an opening on rack, and subsequently tightened to secure the lighting fixture 1000*a* to the rack.

The cylindrical geometry of the tube 1300 may also make the lighting fixture 1000*a* more amenable to rotational and/or translational adjustments after installation. For example, the commodity clamps 1370*a* or 1370*b* may provide a small gap or clearance with the tube 1300 such that the lighting fixture 1000*a* is suspended above the plants while not being tightly constrained (see, for example, FIG. 4B). This, in turn, may allow the tube 1300 and, by extension, the LED modules 410*a* to be rotated, for example, about a longitudinal axis 1301 of the tube 1300 and/or slidably displaced along the longitudinal axis 1301 so long as the clamps 1370*a* or 1370*b* remain in contact with the tube 1300 and/or the end caps 1320*a* and 1320*b*.

More generally, the lighting fixture 1000*a* may be coupled to a support structure via different coupling mechanism that provide one or more degrees of freedom for adjustment including, but not limited to a pin joint (e.g., a swivel joint clamp), a slider joint (e.g., a rod or a pin mounted to the end caps 1320*a* and 1320*b* that is disposed within a support structure with a slotted opening), and any combinations of the foregoing. In some implementations, the position and/or orientation of the lighting fixture 1000*a* may be manually adjusted by a user or adjusted via a motor mechanically coupled to the coupling mechanism and electronically controlled.

Adjustments to the position and/or orientation of the lighting fixture 1000*a* may provide several benefits to the controlled agricultural environment.

First, the lighting fixture 1000*a* may illuminate different sides and/or different portions of the plants. For example, the position and/or orientation of the lighting fixture 1000*a* may be continuously changed to simulate illumination by the sun during a typical day cycle.

Second, the positional and/or rotational adjustment of the lighting fixture 1000*a* may provide a mechanism to adjust the amount or intensity of radiation illuminating the plants. For example, the lighting fixture 1000*a* may be rotated towards or away from the plants to increase or decrease, respectively, the intensity of the radiation incident on the plants. It should be appreciated the lighting fixture 1000*a* and, in particular, the control circuitry 90 may also include a dimmer to further adjust the intensity of the emitted radiation incident on the plants as will be described in more detail below.

Third, a CEH system may include an array of lighting fixtures 1000*a*. If each lighting fixture 1000*a* is rotatably and/or translationally adjustable, the lateral spacing and/or the relative orientations between the lighting fixtures 1000*a* may be adjusted after installation. This may allow the amount or the intensity of the radiation incident on a particular growing area to be changed and/or customized by combining the radiation emitted from multiple lighting fixtures 1000*a* without having to disassemble and reinstall the lighting fixtures 1000*a*. For example, it may be preferable to increase the lateral spacing between the lighting fixtures 1000*a* to reduce the intensity of the radiation when the plants are in a vegetative growth stage. When the plants are in the flowering growth stage, it may be preferable to decrease the lateral spacing in order to increase the intensity of the radiation incident on the plants. In another example, the growing area may include plants at different stages of growth where some plants may be a seedling and other plants may be fully matured and ready for harvesting. When a plant is harvested, a new seedling may be planted in its place. The position and/or orientation of the lighting fixtures 1000*a* may thus be periodically adjusted to change the amount or the intensity of the radiation incident on a particular portion of the growing area (e.g., more radiation for more mature plants, less radiation for less mature plants).

In some implementations, the tube 1300 may be formed and/or extruded along a straight axis (e.g., the tube 1300 is shaped as a right cylinder). In some implementations, the tube 1300 and/or the cavity 1302 may be curved such that the first open end 1304*a* and the second open end 1304*b* are not in parallel alignment. In some implementations, the tube 1300 may have more than two open ends (e.g., a Y-shaped tube, a X-shaped tube) and the frame 1004 and/or the LED modules 410*a* may be disposed within different sections of the tube 1300 accordingly.

As described above, the tube 1300 may be transparent to the radiation emitted by the LED modules 410*a* as well as radiation emitted by the plants or another object in the environment for detection by a sensor and/or a camera integrated into the lighting fixture 1000*a*. Generally, the tube 1300 may have a transmittance greater than or equal to about 80% and, more preferably, greater than or equal to 90% across various wavelength regimes including, but not limited to, ultraviolet, visible, near-infrared, mid-infrared, and long-infrared wavelength ranges. In some implementations, the tube 1300 may be formed from a material with sufficient mechanical strength to withstand a pressure difference between the cavity 1302 and the environment of at least 1 atm (e.g., if the tube 1300 is evacuated). The tube 1300 may be formed from various materials including, but not limited to, glass (e.g., quartz), polycarbonate, acrylic, and polymethylmethacrylate (PMMA).

Figure 2E:
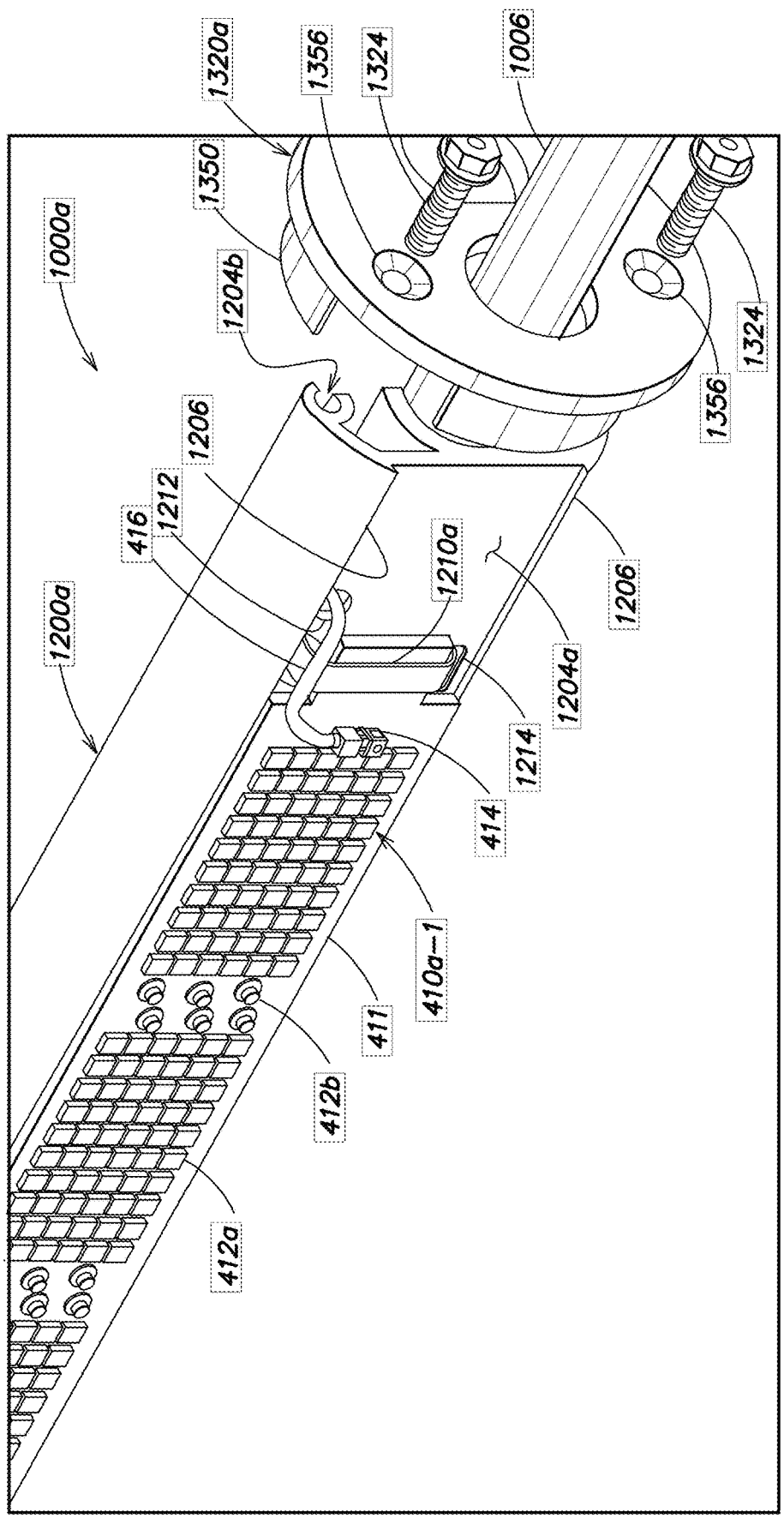
FIG. 2E shows an exploded bottom perspective view of the lighting fixture of FIG. 2A.
Figure 2F:
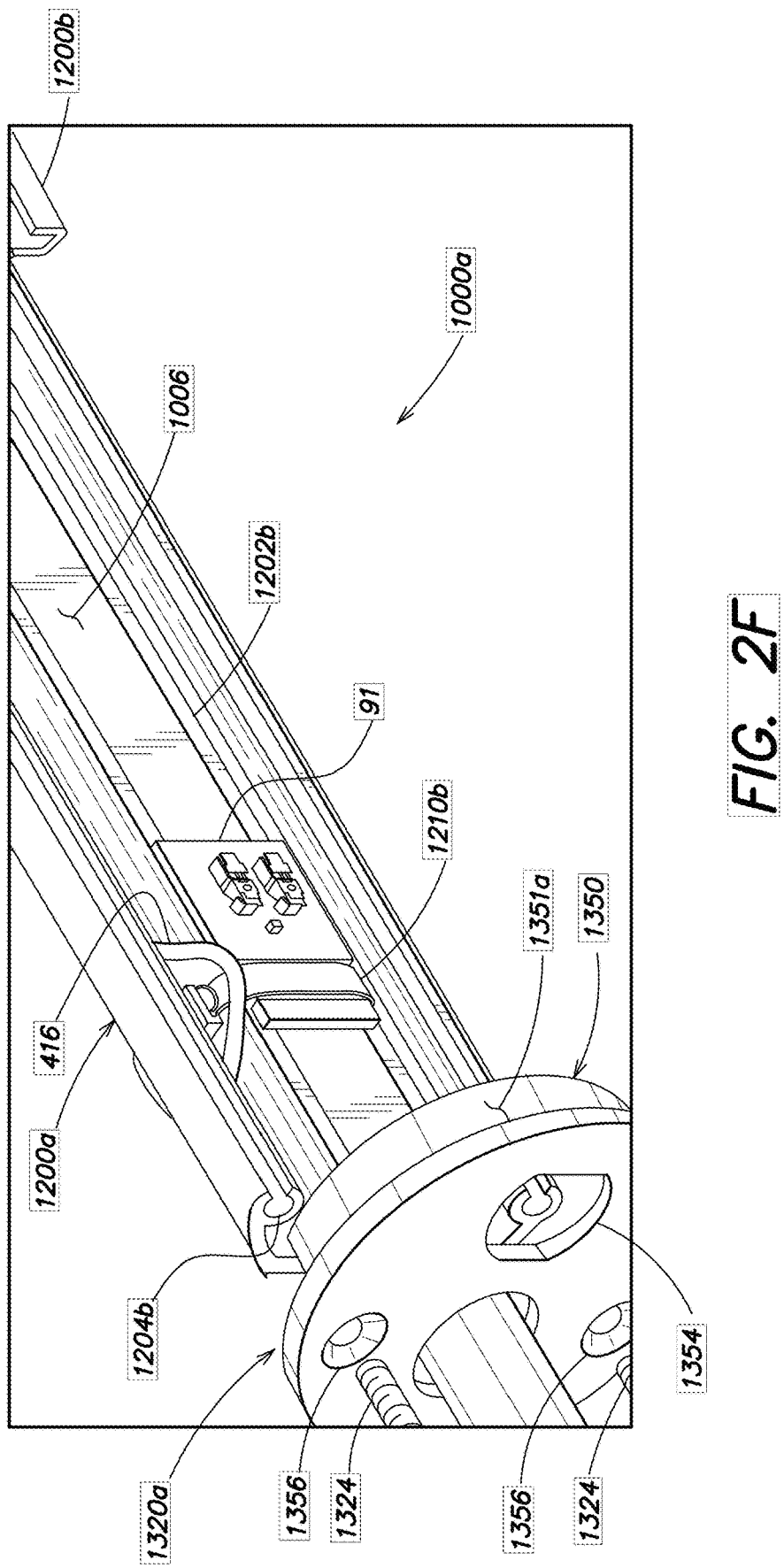
FIG. 2F shows an exploded top perspective view of the lighting fixture of FIG. 2A.
Figure 2G:
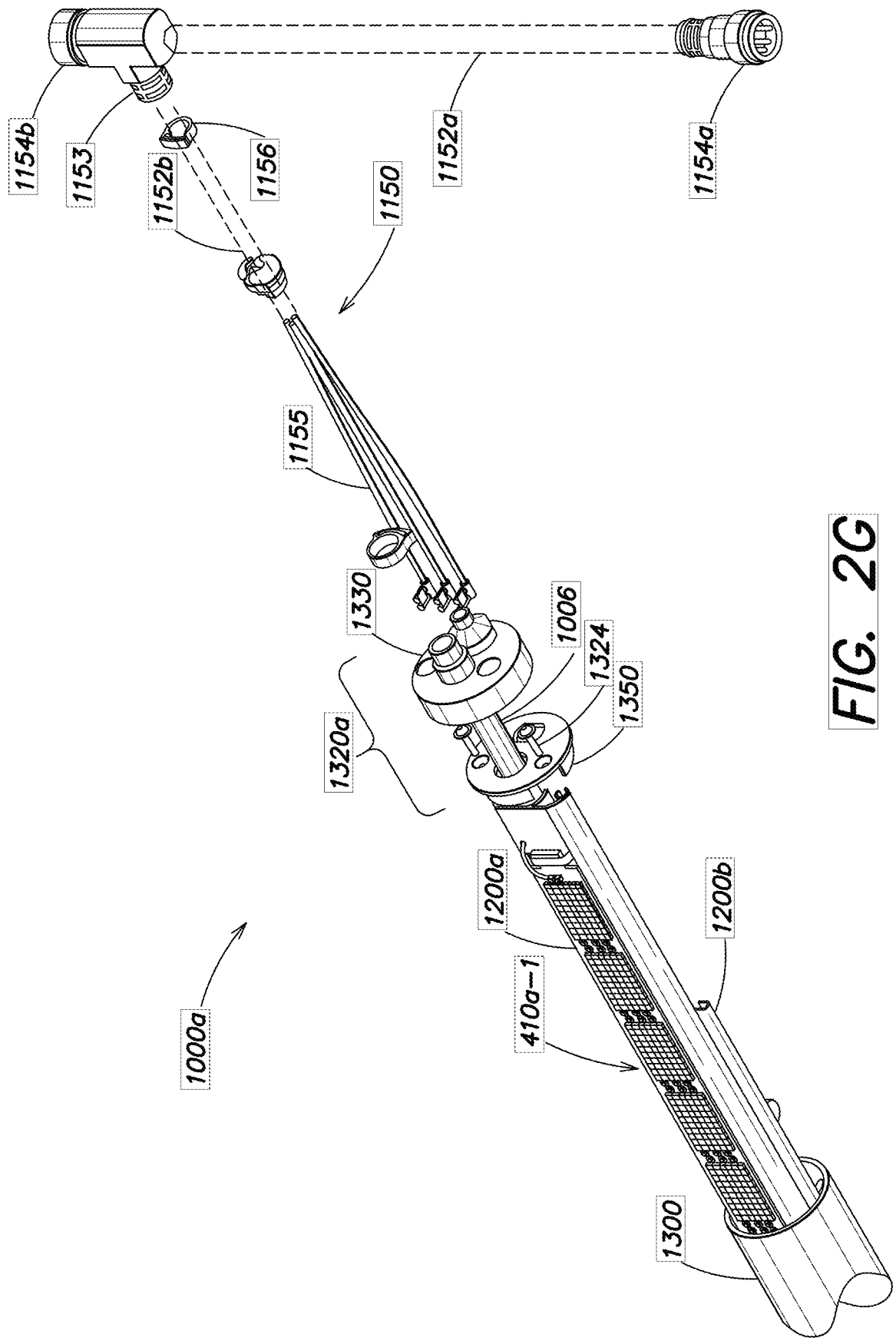
FIG. 2G shows another exploded bottom perspective view of the lighting fixture of FIG. 2A.
Figure 2H:
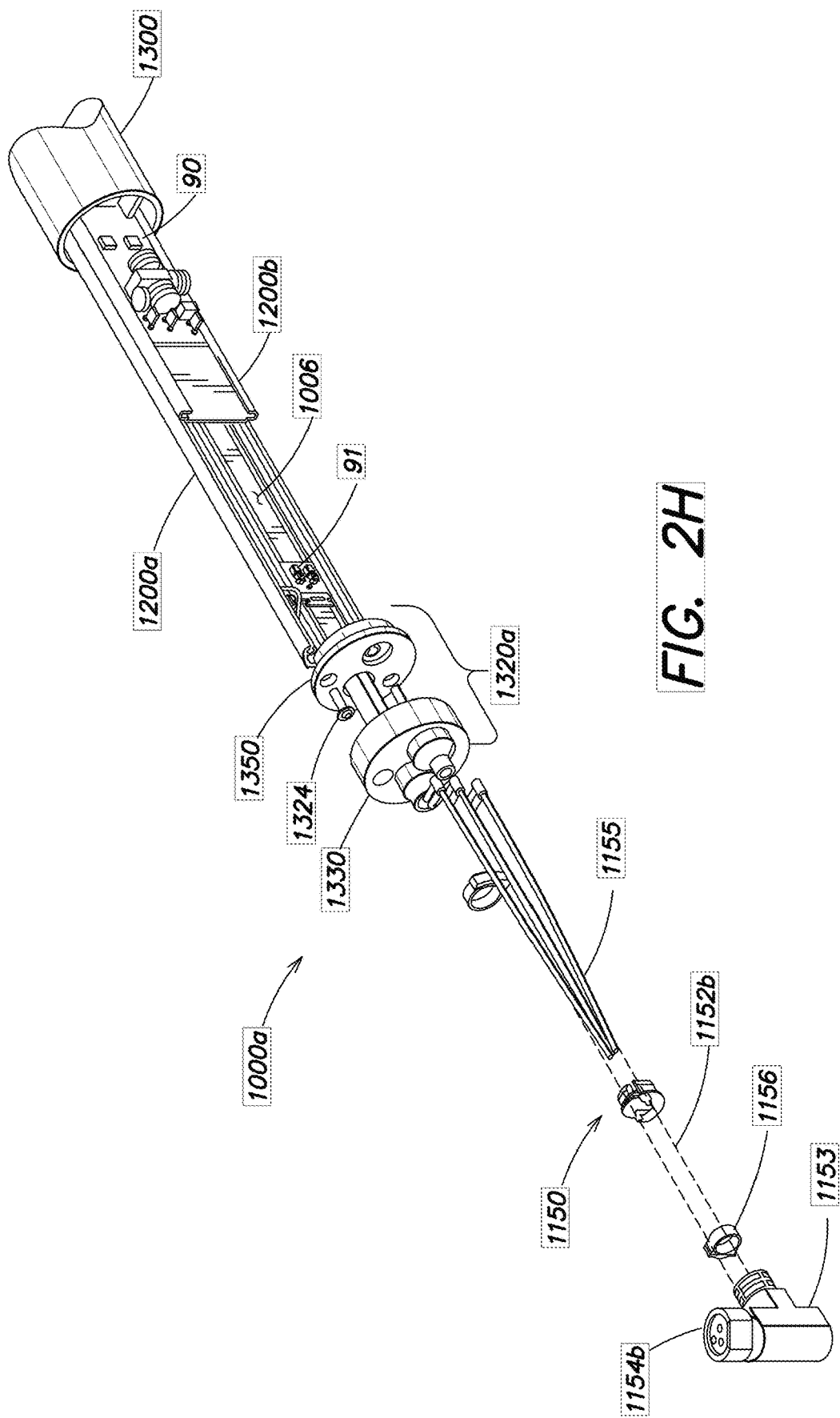
FIG. 2H shows another exploded top perspective view of the lighting fixture of FIG. 2A.
Figure 21:
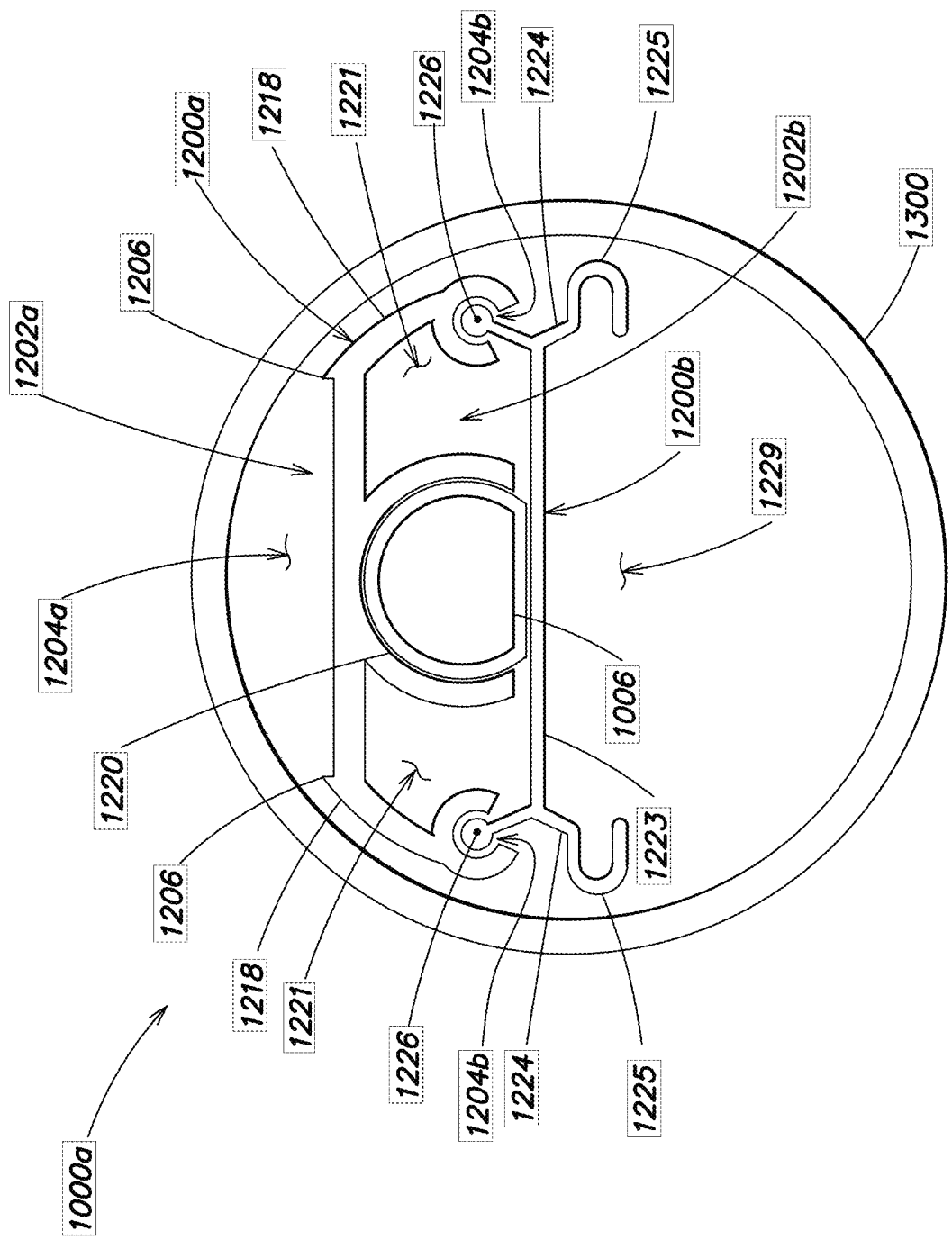

FIGS. 2G and 2H show the frame 1004 in the lighting fixture 1000*a* may be a two-part assembly. Specifically, the frame 1004 may include a first frame component 1200*a* to support the LED modules 410*a* and a second frame component 1200*b* to support the control circuitry 90. It should be appreciated that, in other implementations, the frame 1004 may be a single component that supports both the LED modules 410*a* and the control circuitry 90.

Generally, the first frame component 1200*a* may span the length of the tube 1300 and, hence, provide features to couple to the end caps 1320*a* and 1320*b*. Thus, the coolant pipe 1006 may be directly coupled to the first frame component 1200*a*. Therefore, in some implementations, the first frame component 1200*a* may function as a thermal conduit to conduct heat from the LED modules 410*a* to the coolant pipe 1006. The first frame component 1200*a* may be formed from various thermally conducting materials including, but not limited to, aluminum, copper, stainless steel, and carbon steel. In implementations where the LED modules 410*a* generates less heat (e.g., more efficient LED's, the LED's emit lower intensity radiation), the first frame component 1200*a* may be formed from other various ceramics, polymers, and/or composites including, but not limited to, polyethylene, acrylic, and porcelain.

The second frame component 1200*b* may be dimensioned and/or shaped based on the geometry of the control circuitry 90. In some implementations, the second frame component 1200*b* may be shorter than the first frame component 1200*a*, thus only occupying a portion of the cavity 1302 of the tube 1300. The second frame component 1200*b* may also electrically insulate, or, in some instances, electrically isolate the control circuitry 90 from other components of the lighting fixture 1000*a*, such as the first frame component 1200*a*. The second frame component 1200*b* may be formed from various electrically insulating materials including, but not limited to, plastic (e.g., polyethylene, polypropylene, polystyrene, PMMA).

Depending on the materials used to form the first frame component 1200a and the second frame component 1200b, various methods of manufacture may be utilized including, but not limited to forming, extrusion, sandcasting, milling, injection molding, and manual molding.

Figure 3:
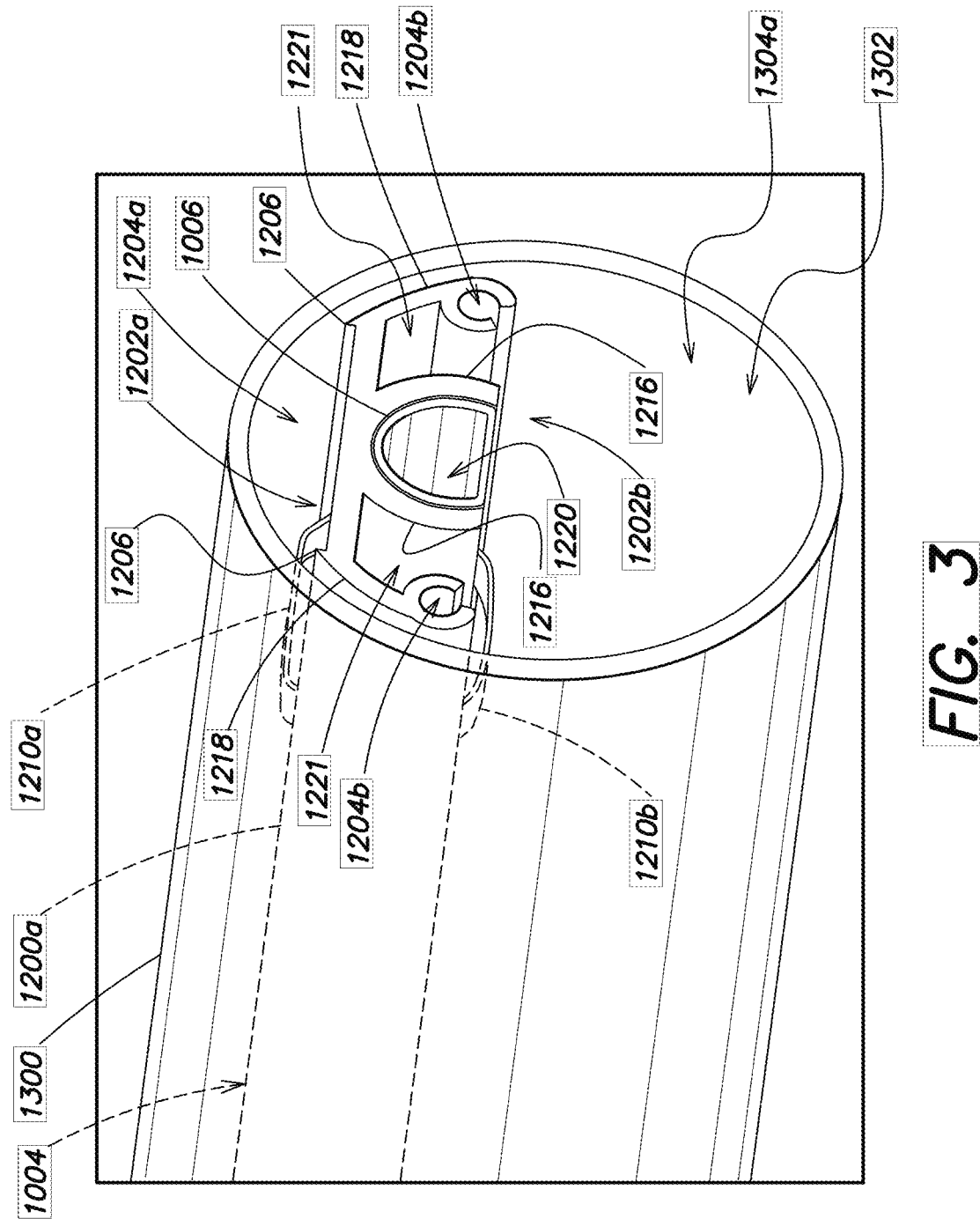
FIG. 3 shows a top perspective view of a frame and a tube in the lighting fixture of FIG. 2A.

FIG. 3 shows a magnified view of the first frame component 1200a. As shown, the first frame component 1200a may have a first side 1202a with a mounting channel 1204a to support the LED modules 410a. The mounting channel 1204a may be defined and/or flanked by ridges 1206 on the first side 1202a. During assembly, the LED modules 410a may be slidably positioned along the mounting channel 1204a and secured to the first frame component 1200a using, for example, one or more zip ties 1210a that wrap around opposing ends of each LED module 410a through openings 1214 formed in the first frame component 1200a. FIGS. 2C-1 and 2C-2 show the LED modules 410a-1 through 410a-4 may each be disposed within the mounting channel 1204a and evenly distributed along the length of the first frame component 1200a. As will be discussed in more detail below, the LED modules 410a may include a printed circuit board (PCB) 411 that may also be attached to the first frame component 1200a using, for example, thermal paste.

The first frame component 1200a may also have a second side 1202b opposite the first side 1202a. Specifically, the first frame component 1200a may include a pair of curved-shaped ribs 1216 that extend downwards from a portion of the first side 1202a near the mounting channel 1204a. The free ends of the ribs 1216 may define a portion of the second side 1202b. The first frame component 1200a may further include side ribs 1218 that extend downwards from the ridges 1206 to define another portion of the second side 1202b. As shown in FIGS. 2I and 3, the ends of the side ribs 1218 may each define a mounting channel 1204b to support and/or slidably couple to the second frame component 1200b.

The second frame component 1200b may be secured to the first frame component 1200a using one or more mechanical coupling mechanisms including, but not limited to, a zip tie, a screw fastener, a bolt fastener, a clip, and a clamp. Additionally, the mounting channels 1204b may provide openings that each receive a fastener 1324 to couple the end caps 1320a and 1320b to the first frame component 1200a. More generally, the end caps 1320a and 1320b may be coupled to the frame 1004 using various coupling mechanisms including, but not limited to, zip ties, screw fasteners, bolt fasteners, clips, and clamps.

It should be appreciated that other electrical circuitry associated with the control circuitry 90 may be coupled to the first frame component 1200a. For example, FIG. 2F shows a power board 91 directly mounted to the ribs 1216 via a zip tie 1210b. The power board 91 may electrically connect together a port and/or an electrical cable routed through the end caps 1320a or 1320b to the control circuitry 90. In some implementations, the second frame component 1200b may be positioned near one of the end caps 1320a or 1320b so that the control circuitry 90 may be directly connected to an electrical port, an electrical cable routed through the end caps 1320a or 1320b, or the power board 91.

In some implementations, the first frame component 1200a may also include an electrical feedthrough opening 1212 that extends from the first side 1202a to the second side 1202b to provide a pathway for electrical wiring to pass through the first frame component 1200a and electrically couple together the LED modules 410a and the control circuitry 90. For example, FIGS. 2E and 2F show the LED modules 410a and the control circuitry 90 may be electrically coupled via an electrical wire 416 passing through the electrical feedthrough opening 1212.

As shown in FIG. 3, the curved-shaped ribs 1216 may define a coolant channel 1220 to secure the coolant pipe 1006 to the first frame component 1200a. The coolant channel 1220 may be accessible from the second side 1202b. The coolant channel 1220 may have a cross-section that is shaped and/or dimensioned to conform with the coolant pipe 1006 in order to increase the thermal contact area between the coolant pipe 1006 and the first frame component 1200a.

The coolant pipe 1006 may be secured to the coolant channel 1220 of the first frame component 1200a using several approaches.

For example, the cross-sectional dimensions of the coolant channel 1220 may be equal to or smaller than the cross-sectional dimensions of the coolant pipe 1006 to facilitate a press-fit and/or a crush-fit where the coolant pipe 1006 is secured to the channel via friction. In some implementations, the coolant pipe 1006 may be deformed when press-fit and/or crush-fit to the coolant channel 1220 such that the coolant pipe 1006 does not protrude outwards from the coolant channel 1220. For instance, FIG. 3 shows the coolant pipe 1006 may have a flat side to provide clearance for the second frame component 1200b.

In another example, the coolant pipe 1006 may be clamped to the channel 1220 of the first frame component 1200a using, for example, one or more clamps with zip ties and/or a worm drive fastener. The clamps may be removable to allow replacement of the coolant pipes 1006. The surface of the ribs 1216 forming the coolant channel 1220 may also be polished to improve thermal contact with the coolant pipe 1006, thus enabling greater heat dissipation to the fluid coolant 800. Additionally, the coolant pipe 1006 may be adhered or bonded to the first frame component 1200a using various methods including, but not limited to, adhesive bonding, welding, and brazing. Thermal interface material may also be disposed between the coolant channel 1220 and the coolant pipe 1006 to improve thermal contact.

The side ribs 1218 and the curved-shaped ribs 1216 may also define side channels 1221 disposed on opposing sides of the coolant channel 1220. The side channels 1221 may reduce the weight of the first frame component 1200a and/or the amount of material used for manufacture. Additionally, the side channels 1221 may also provide a thermal barrier to reduce, or in some instances, prevent heat from the LED modules 410a from being transferred to the second frame component 1200b and, hence, the control circuitry 90. For example, the side channels 1221 may contain air, gas, or a vacuum, which may increase the thermal resistance between the first side 1202a and the second side 1202b.

Thus, the first frame component 1200a may be shaped such that the heat generated by the LED modules 410a is transferred primarily towards the coolant channel 1220 and the coolant pipe 1006. In some implementations, the coolant channel 1220 and the coolant pipe 1006 may be disposed between the LED modules 410a and the control circuitry 90 to further reduce or, in some instances, prevent the transfer of the heat generated by the LED modules 410a to the second frame component 1200b and the control circuitry 90.

In some implementations, the first frame component 1200a may be formed via an extrusion process. Thus, the various structural features of the first frame component 1200a (e.g., the ridges 1206, the ribs 1218, 1216) may span the length of the first frame component 1200a as shown in FIG. 3 to facilitate extrusion. However, it should be appreciated the first frame component 1200a may be formed using other manufacturing processes including, but not limited to, casting, forging, and machining. When these other manufacturing processes are used, these structural features may be formed and/or span only a portion of the overall length of the first frame component 1200a.

FIG. 2I shows the second frame component 1200b may include a base 1223 that abuts the second side 1202b of the first frame component 1200a. The second frame component 1200b may further include rails 1226 that extend from the base 1223, which are shaped and/or dimensioned to fit into the mounting channels 1204b of the first frame component 1200a. For example, the rails 1226 may have a thin stem section and a circular rod section disposed within the mounting channel 1204b. Thus, the mounting channel 1204b may constrain the rail 1226 to only slide along mounting channel 1204b.

The second frame component 1200b may further include sides 1224 extending from the base 1223 and away from the first frame component 1200a with curved-shaped ridges 1225. The combination of the ridges 1225, the sides 1224, the base 1223 may define a mounting channel 1229 to support the control circuitry 90. As shown the control circuitry 90 may include a PCB that may be inserted into the mounting channel 1229 and constrained by the ridges 1225 clasping the edges of the PCB. Thus, the control circuitry 90 may be inserted into the mounting channel 1229 and positioned as desired along second frame component 1200b.

In some implementations, the control circuitry 90 may be securely coupled to the second frame component 1200b using, for example, one or more zip ties. In some implementations, the ridges 1225 may be shaped and/or dimensioned to impart a clamping force to prevent the control circuitry 90 from moving relative to the second frame component 1200b. For example, the clamping force may be sufficiently large to prevent movement of the control circuitry 90 when the frame 1004 is tilted. However, the clamping force, may be sufficiently small so that the user may still readily adjust the position of the control circuitry 90 without having to apply an appreciably large force.

The second frame component 1200b may also be formed by an extrusion process; hence, the base 1223, sides 1224, and ridges 1225 may span the length of the second frame component 1200b. Alternatively, the second frame component 1200b may be formed by an injection molding process to produce the same or similar structural features.

Figure 4A:
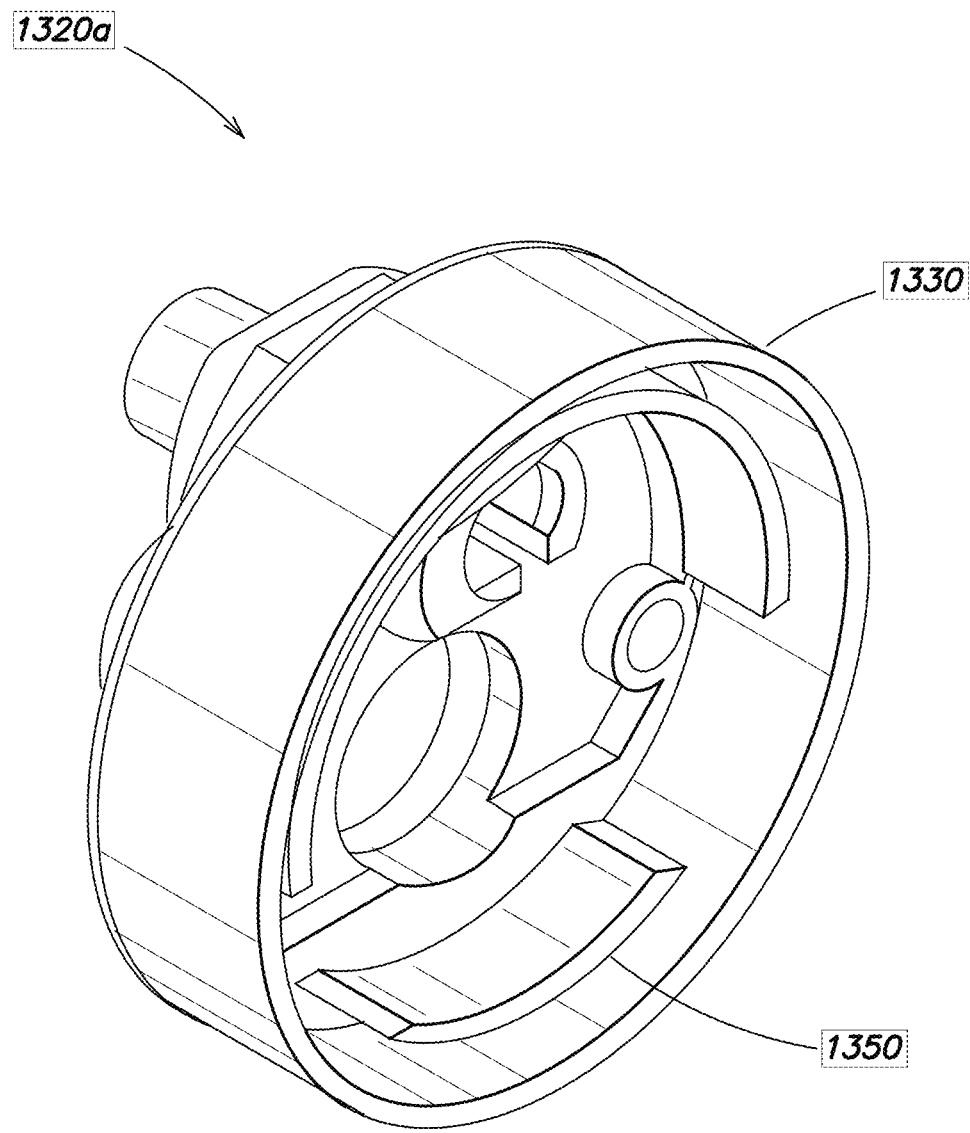
FIG. 4A shows a top perspective view of an end cap in the lighting fixture of FIG. 2A.
Figure 4B:
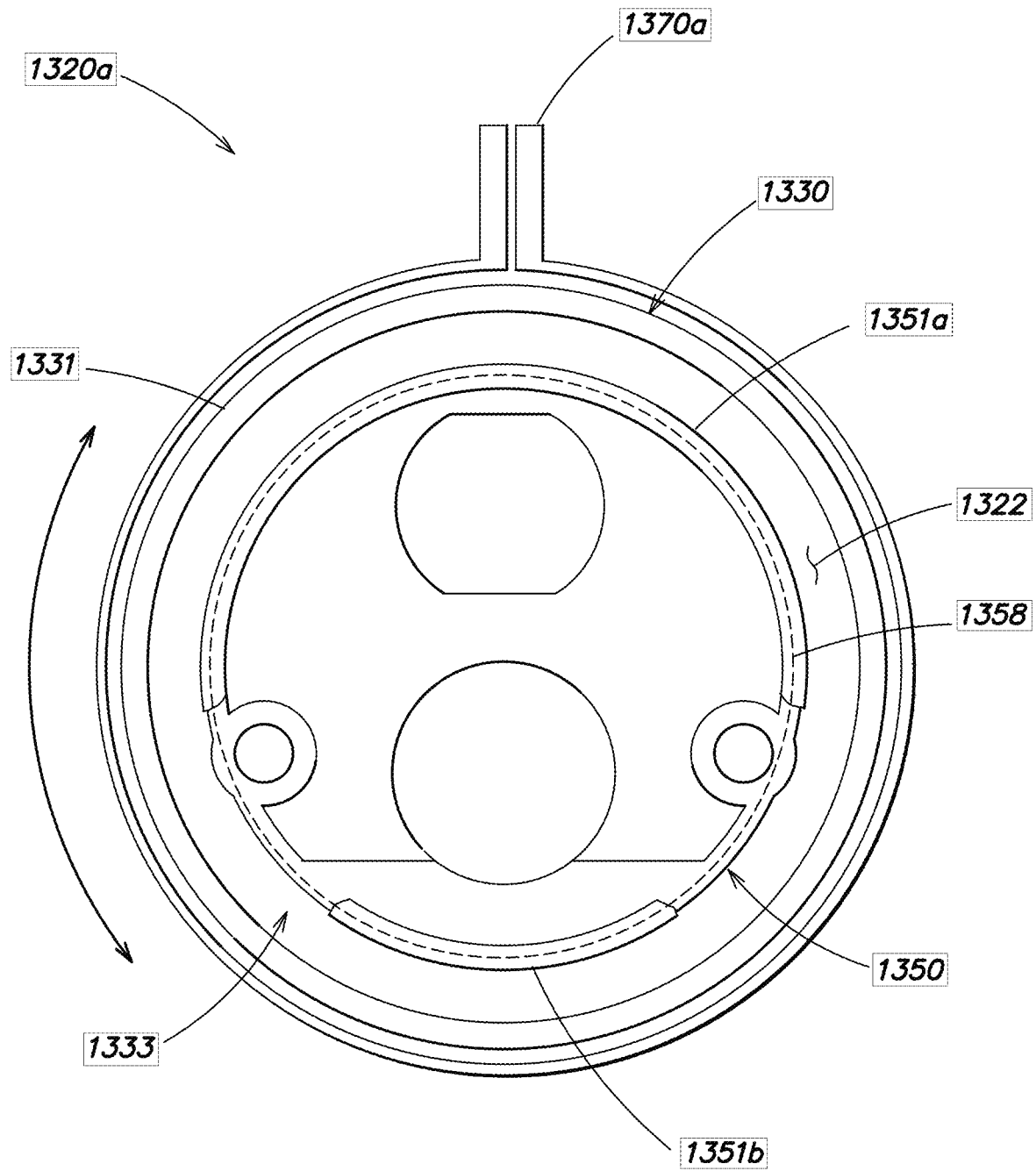
FIG. 4B shows a left-side view of the end cap of FIG. 4A with a commodity clamp.

FIGS. 4A and 4B show the end cap 1320a (or the end cap 1320b) may be a two-part assembly that includes an end cap support 1350 to couple the end cap 1320a to the frame 1004 and an end cap cover 1330 to cover the first open end 1304a of the tube 1300. The end cap 1320b may similarly have an end cap support 1350 to couple to the frame 1004 and an end cap cover 1330 to cover the second open end 1304b of the tube 1300.

The end cap cover 1330 and the end cap support 1350 may generally be formed from a thermally insulating material to reduce or, in some instances, prevent the heat generated by the LED modules 410a and transferred to the frame 1004 from dissipating into surrounding environment through the end caps 1320a and 1320b of the lighting fixture 1000a. The end cap support 1350 and the end cap cover 1330 may also be non-corrosive and/or radio-wave transparent (e.g., for wireless communication). In some implementations, the end cap support 1350 may be formed from various rigid plastics or polymers including, but not limited to, polycarbonate and glass-filled polycarbonate. In some implementations, the end cap cover 1330 may be formed from various compliant plastics or polymers including, but not limited to, urethane, rubber, and silicone. Depending on the materials used to form the end cap support 1350 and the end cap cover 1330, various methods of manufacture may be utilized including, but not limited to, extrusion, injection molding, blow molding and manual molding.

Figure 5A:
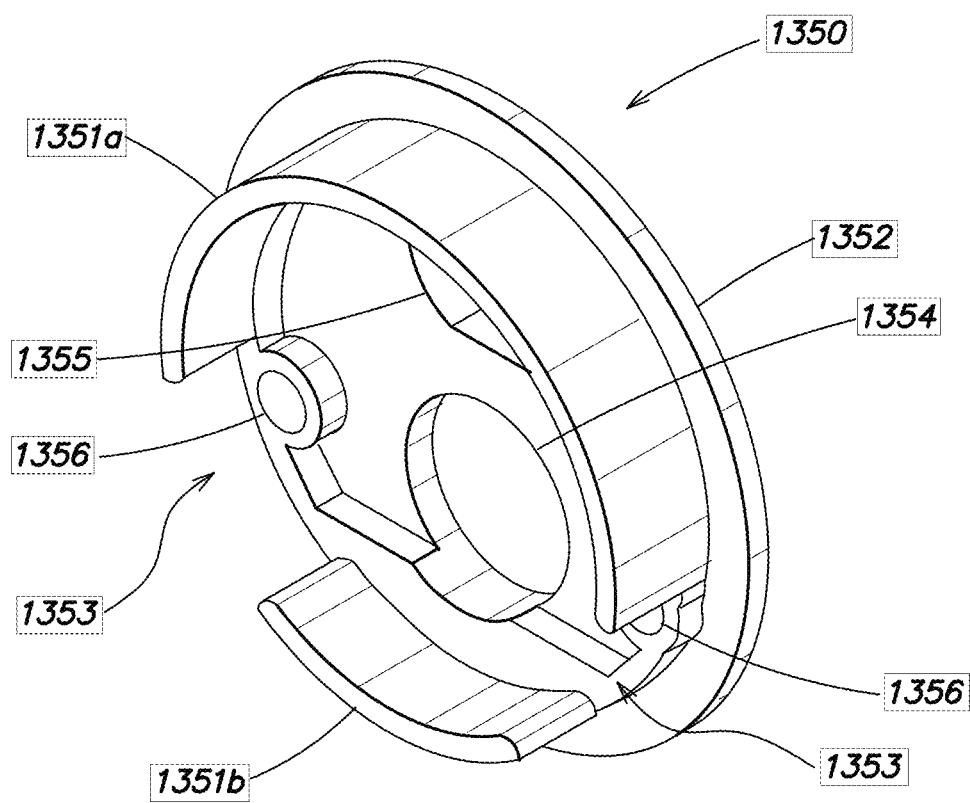
FIG. 5A shows a top perspective view of an end cap support in the end cap of FIG. 4A.
Figure 5B:
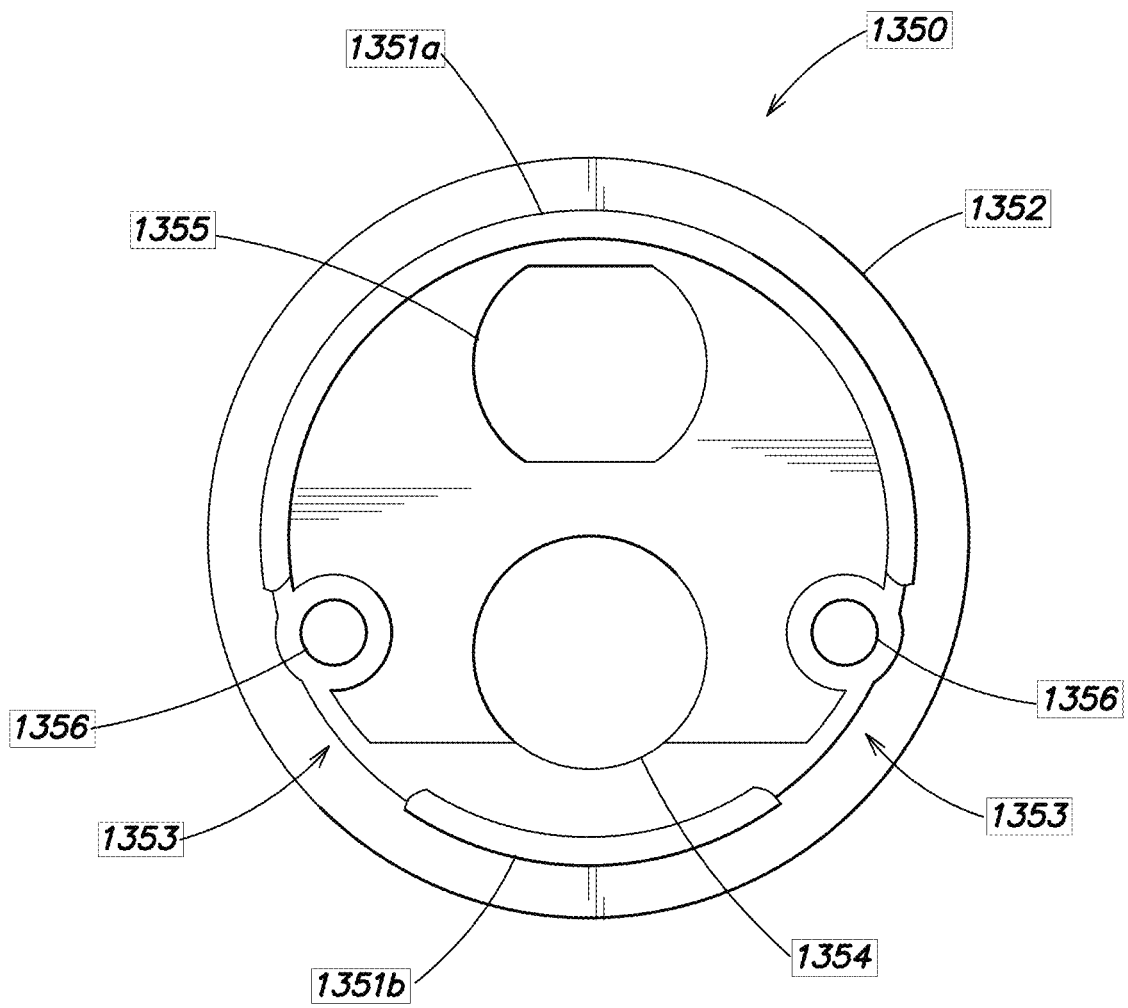
FIG. 5B shows a left-side view of the end cap support of FIG. 5A.
Figure 5C:
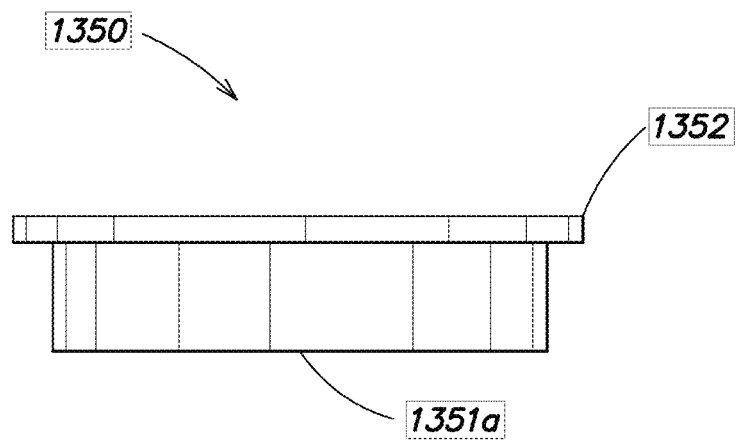
FIG. 5C shows a top view of the end cap support of FIG. 5A.
Figure 5D:
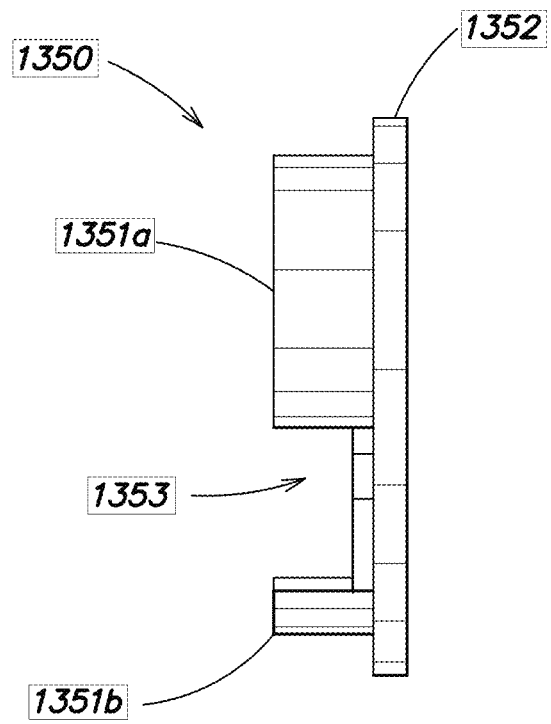
FIG. 5D shows a front view of the end cap support of FIG. 5A.

FIGS. 5A-5D show several views of the end cap support 1350. As shown, the end cap support 1350 may include a base 1352 and sidewalls 1351a and 1351b that protrude from the base 1352. The base 1352 and the sidewalls 1351a and 1351b may generally be shaped and/or dimensioned to conform with the geometry of the tube 1300. For example, the base 1352 may have a circular shape to conform with a cylindrically shaped tube 1300. As shown in FIG. 5B, the sidewalls 1351a and 1351b may have cross-sectional shapes (i.e., the cross-section defined normal to the longitudinal axis 1301) that trace different portions of a circular path 1358. For example, the sidewall 1351a may trace out a top half portion of the circular path 1358 and the sidewall 1351b may trace out a bottom portion of the circular path 1358. The portions of the circular path 1358 that are not covered by the sidewalls 1351a or 1351b may correspond to notches 1353 formed between the sidewalls 1351a and 1351b. Said in another way, the sidewalls 1351a and 1351b form different sections of a cylindrically shaped, discontinuous sidewall separated by notches 1353.

When the end cap support 1350 is coupled to the frame 1004, the first frame component 1200a may be inserted between the sidewalls 1351a and 1351b such that the side ribs 1218 may be partially disposed in the notches 1353 and the end of the first frame component 1200a physically contacts the base 1352 (e.g., the mounting channels 1204a and 1204b contact the base 1352). In this manner, the side ribs 1218 of the first frame component 1200a may trace out the remaining portions of the circle 1358 corresponding to the notches 1353.

The base 1352 may further include openings 1356 that align with the channels 1204b of the first frame component 1200a as shown in FIG. 5B. Thus, fasteners 1324 may be inserted through the openings 1356 of the end cap support 1350 and coupled to the channels 1204b of the first frame component 1200a as shown in FIGS. 2E and 2F. Additionally, the base 1352 may include a fluidic feedthrough opening 1354 that aligns with the coolant channel 1220 so that the coolant pipe 1006 may pass through the end cap support 1350. The base 1352 may further include an electrical feedthrough opening 1355 for an electrical cable to pass through the end cap support 1350 and electrically couple to the control circuitry 90 and/or the power board 91. As shown in FIG. 5B, the electrical feedthrough opening 1355 may be disposed along a top portion of the base 1352 so that the electrical cable is positioned on the second 1202b of the first frame component 1200a where the control circuitry 90 and the power board 91 are located.

When the end cap support 1350 is coupled to the tube 1300, the curved exterior surfaces of the sidewalls 1351a and 1351b may contact the interior curved surface of the tube 1300 and the first open end 1304a of the tube 1300 may contact the base 1352 of the end cap support 1350. Said in another way, the tube 1300 may be supported by the exterior surfaces of the sidewalls 1351a and 1351b. Thus, the end cap support 1350 may couple to both the frame 1004 and the tube 1300. Furthermore, the end cap support 1350 may position and align the tube 1300 relative to the frame 1004. In some implementations, the exterior surfaces of the first frame component 1200a and, in particular, the side ribs 1218 may not extend past the exterior surfaces of the sidewalls 1351*a* and 1351*b*. Thus, the end cap support 1350 may position the tube 1300 such that the tube 1300 does not physically contact the frame 1004 and any components coupled to the frame 1004 (e.g., the LED modules 410*a*, the control circuitry 90, the coolant pipe 1006).

FIGS. 6A-6E show several views of the end cap cover 1330. As shown, the end cap cover 1330 may include a sidewall 1331 and a base 1332 that surround and partially enclose a cavity 1333. Similar to the end cap support 1350, the sidewall 1331 and the base 1332 of the end cap cover 1330 may be shaped and/or dimensioned to conform with the geometry of the tube 1300 (i.e., the cavity 1333 may be cylindrical in shape). The sidewall 1331 may generally have an interior width that is approximately equal to the exterior width of the tube 1300. In some implementations, the sidewall 1331 may have tolerances that ensure the interior width of the sidewall 1331 is smaller than the exterior width of the tube 1300. In this manner, the end cap cover 1330 may be stretched to fit onto the exterior surface of the tube 1300 to form a tight seal with the first open end 1304*a* of the tube 1300 and provide a clamping force that clamps the tube 1300 between a recess 1322 formed between the sidewall 1331 of the end cap cover 1330 and the sidewalls 1351*a* and 1351*b* of the end cap support 1350 as shown in FIG. 4B.

In some implementations, the end cap cover 1330 may be clamped to the tube 1300 via a separate clamp (e.g., the commodity clamp 1370*a*). The clamp 1370*a*, for example, may be tightened to provide a sufficient clamping force to clamp and seal the end cap cover 1330 to the tube 1300.

In some implementations, the end cap cover 1330 may be formed from a heat-shrinkable material. Thus, when the end cap cover 1330 is fitted onto the tube 1300 and/or the end cap support 1350, the end cap cover 1330 may be exposed to a heat source (e.g., a heat gun) to shrink and, hence, seal the cavity 1302 of the tube 1300 as well as the various electrical and fluidic connections through the end caps 1320*a* and 1320*b*.

In some implementations, the end cap cover 1330 may form a sufficiently tight seal with the tube 1300 to prevent foreign substances (e.g., moisture, dust) in the environment from infiltrating the cavity 1302. For example, the controlled agricultural environment may operate at a relative humidity where moisture may condense onto various surfaces of the lighting fixture 1000*a*. The accumulation of moisture may lead to damage of exposed electrical devices, such as exposed electronic circuitry. The combination of the tube 1300 and the end caps 1320*a* and 1320*b* may thus provide an enclosure that substantially reduces or, in some instances, prevents the infiltration of moisture and other foreign substances into the cavity 1302.

In some implementations, the end cap cover 1330 may form a water-resistant seal with the tube 1300 where water does not infiltrate the cavity 1302 when the lighting fixture 1000*a* is washed with water. In some implementations, the water-resistant seal may also prevent water from infiltrating the cavity 1302 when the lighting fixture 1000*a* is fully submerged underwater. In some implementations, the end cap cover 1330 may form an airtight seal with the tube 1300 (e.g., air from the environment does not infiltrate the cavity 1302).

Figure 6A:
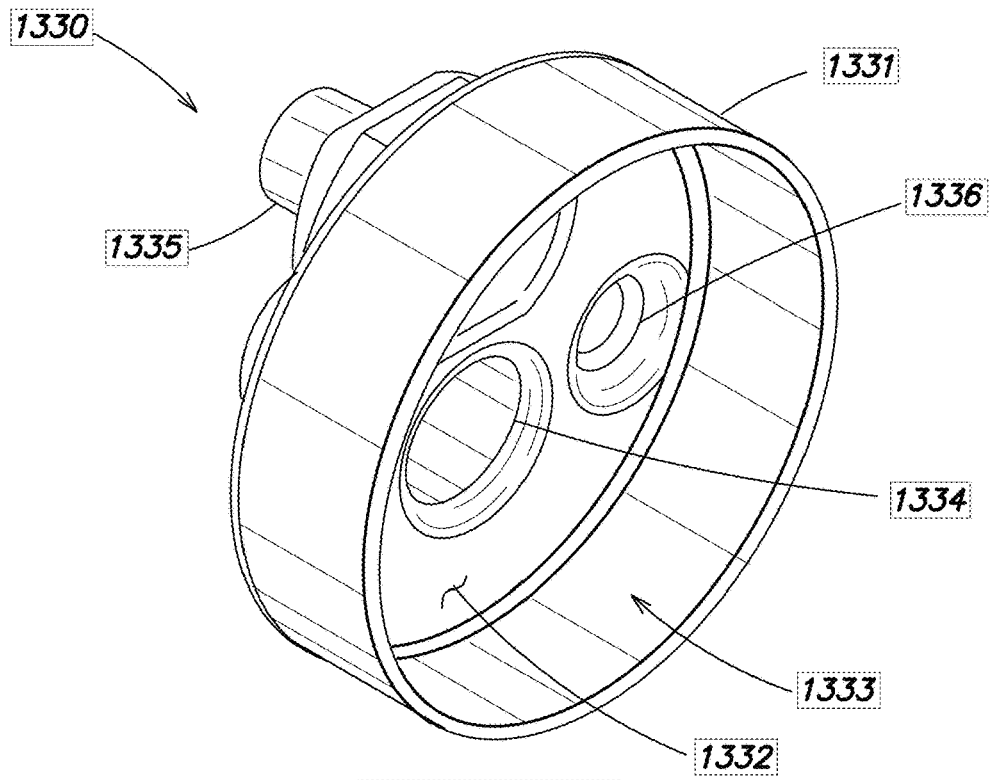
FIG. 6A shows a top perspective view of an end cap cover in the end cap of FIG. 4A.
Figure 6B:
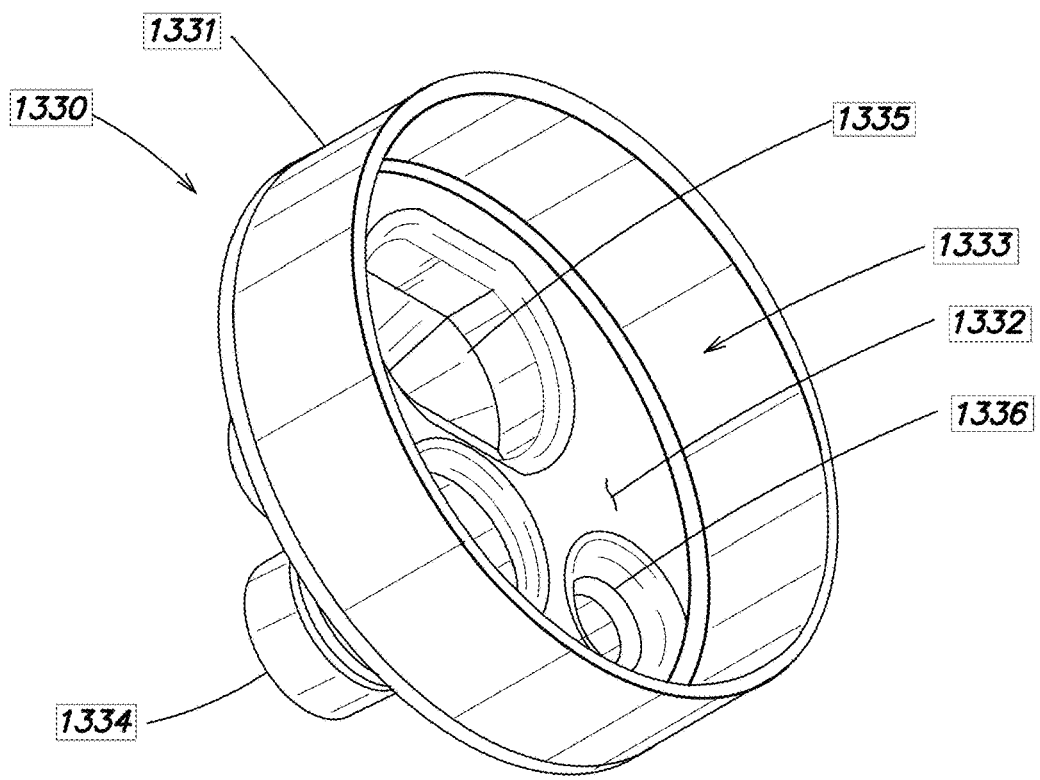
FIG. 6B shows a bottom perspective view of the end cap cover of FIG. 6A.
Figure 6C:
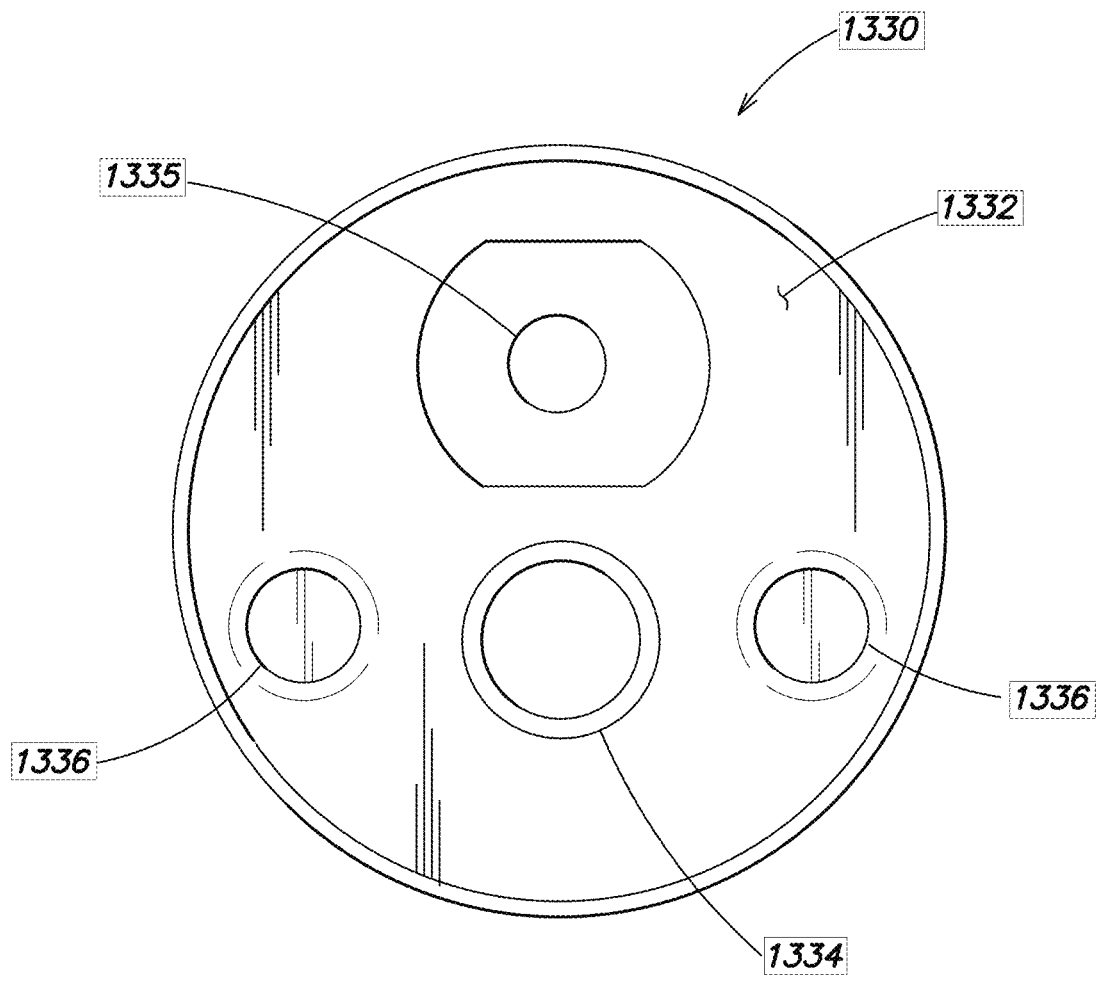
FIG. 6C shows a right-side view of the end cap cover of FIG. 6A.
Figure 6D:
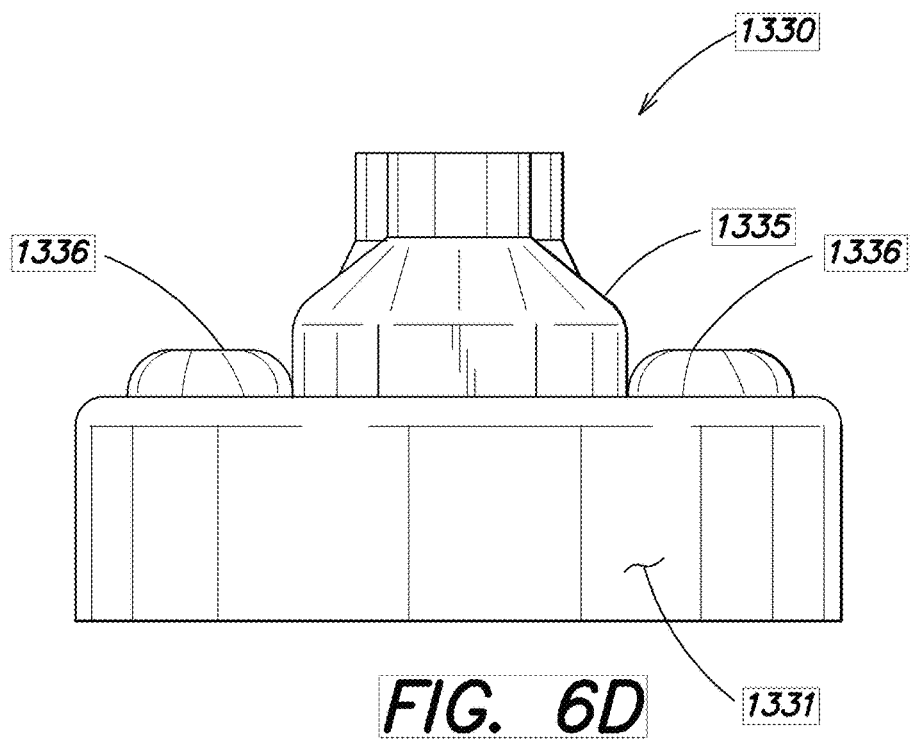
FIG. 6D shows a top view of the end cap cover of FIG. 6A.
Figure 6E:
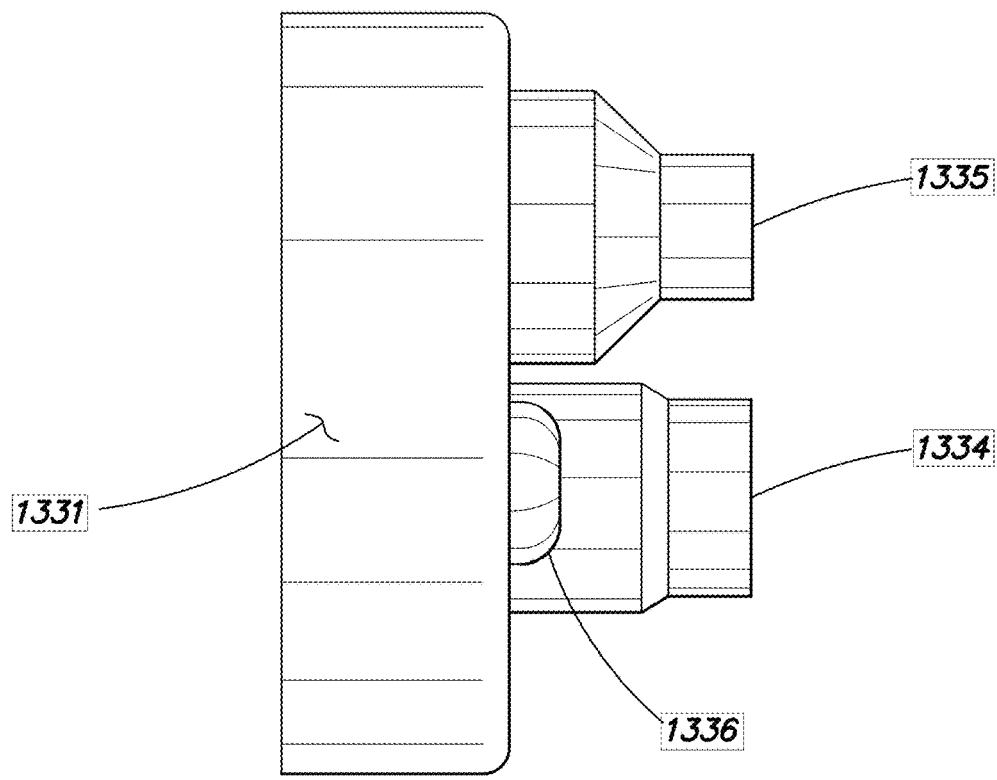
FIG. 6E shows a front view of the end cap cover of FIG. 6A.

The end cap cover 1330 may additionally have several features to facilitate electrical and fluidic connections to the lighting fixture 1000*a*. For example, the base 1332 may include an electrical feedthrough 1335 that defines an opening for an electrical cable to pass through the end cap cover 1330 and into the cavity 1302 of the tube 1300 for connection with the control circuitry 90 and/or the power board 91. As shown in FIG. 6C, the electrical feedthrough 1335 may be aligned with the electrical feedthrough opening 1355 of the end cap support 1350. The electrical feedthrough 1335 may include a sleeve that protrudes outwards from the base 1332 and away from the end cap support 1350. The sleeve may define a portion of the opening to receive the electrical cable.

In some implementations, the sleeve may have an interior width smaller than the exterior width of the electrical cable so that when the electrical cable is inserted through the end cap cover 1330, the sleeve may stretch, thus forming a tight seal with the electrical cable. In some implementations, the sleeve may form a water-resistant seal with the electrical cable. In some implementations, the portion of the sleeve joined to the electrical cable may be sealed using a sealant.

In another example, the base 1332 may include a fluidic feedthrough 1334 that defines an opening for the coolant pipe 1006 to pass through the end cap cover 1330. The fluidic feedthrough 1334 may be aligned with the fluidic feedthrough opening 1354 of the end cap support 1350. Similar to the electrical feedthrough 1335, the fluidic feedthrough 1334 may include a sleeve that protrudes outwards from the base 1332 and away from the end cap support 1350. The sleeve may also define a portion of the opening to receive the coolant pipe 1006.

In some implementations, the sleeve of the fluidic feedthrough 1334 may have an interior width smaller than the exterior width of the coolant pipe 1006 so that when the coolant pipe 1006 is inserted through the end cap cover 1330, the sleeve may stretch, thus forming a tight seal with the coolant pipe 1006. In some implementations, the sleeve may form a water-resistant seal with the coolant pipe 1006. In some implementations, the portion of the sleeve joined to the coolant pipe 1006 may be sealed using a sealant.

The end cap cover 1330 may further include one or more fastener cover sections 1336 disposed on the base 1332. The fastener cover sections 1336 may be recessed portions of the base 1332 when facing towards the end cap support 1350 (or protruding portions of the 1332 when facing away from the end cap support 1350). The fastener cover sections 1336 may provide space to cover the fasteners 1324 that couple the end cap support 1350 to the first frame component 1200*a*, particularly if the heads of the fasteners 1324 protrude from the base 1352 of the end cap support 1350.

In some implementations, the end cap cover 1330 may not be directly coupled to the end cap support 1350. Instead, the end cap cover 1330 may be stretched and placed over the tube 1300 and the base 1352 of the end cap support 1350 to enclose the first open end 1304*a* of the tube 1300 as described above. In some implementations, the end cap cover 1330 may remain coupled to the tube 1300 and/or the end cap support 1350 via the frictional force that arises between the end cap cover 1330 and the tube 1300. In some implementations, a zip tie or another clamping mechanism may be disposed around the end cap cover 1330 to securely couple the end cap cover 1330 to the tube 1300.

Mechanically decoupling the end cap cover 1330 from the end cap support 1350 in this manner may have several benefits.

First, the end cap cover 1330 may be coupled to the tube 1300 and/or the end cap support 1350 without any additional components (e.g., fasteners), thus simplifying assembly and reducing the number of parts in the lighting fixture 1000*a*.

Second, the compliance of the end cap cover 1330 may allow the tube 1300 and the frame 1004 to move relative to each other while maintaining a tight seal with the tube 1300 and, hence, keeping the cavity 1302 of the tube 1300 enclosed.

Figure 4C:
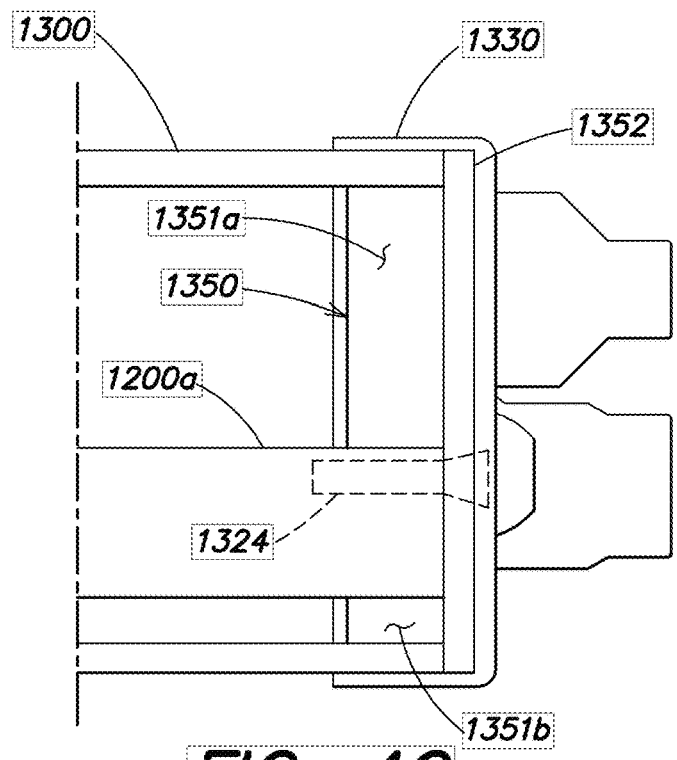
FIG. 4C shows a side view of the end cap coupled to the frame and the tube in the lighting fixture of FIG. 2A at a first temperature.

For example, the frame 1004 and, in particular, the first frame component 1200a may thermally expand due to the heat generated by the LED modules 410a during operation of the lighting fixture 1000a. FIG. 4C shows an end portion of the lighting fixture 1000a where the first frame component 1200a is at a first temperature (e.g., room temperature) before the LED modules 410a are turned on. As shown, the tube 1300 may initially abut the base 1352 of the end cap support 1350 when the first frame component 1200a. Additionally, the end cap support 1350 may be rigidly coupled to the first frame component 1200a via the fastener 1324 and the end cap cover 1330 may cover the exterior portions of the end cap support 1350 and a portion of the tube 1300.

Figure 4D:
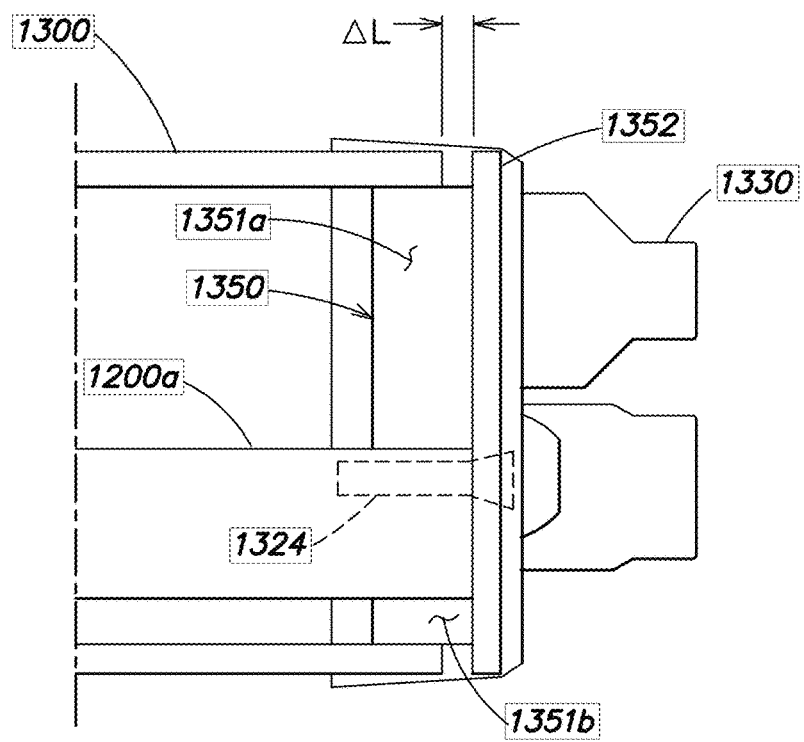
FIG. 4D shows a side view of the end cap coupled to the frame and the tube in the lighting fixture of FIG. 4C at a second temperature greater than the first temperature where the frame undergoes thermal expansion.

FIG. 4D shows the end portion of the lighting fixture 1000a where the first frame component 1200a is heated to a second temperature greater than the first temperature after the LED modules 410a are turned on. As shown, the overall length of the first frame component 1200a may increase due to thermal expansion, which causes the end of the first frame component 1200a and the end cap support 1350 to be displaced by a distance ΔL. However, rather than subjecting the tube 1300 to a tensile force (i.e., if the tube 1300 is rigidly coupled to the end cap support 1350), the curved interior surface of the tube 1300 may instead slide along the curved exterior surfaces of the sidewalls 1351a and 1351b of the end cap support 1350 as the end cap support 1350 is displaced. In this manner, the displacement of the first frame component 1200a and the end cap support 1350 reduces or, in some instances, mitigates any undesirable forces applied to the tube 1300. Furthermore, the end cap cover 1330 may be deformed to accommodate the displacement of the end cap support 1350 while remaining coupled to the tube 1300, thus keeping the cavity 1302 enclosed.

As described above, the coolant pipe 1006 may carry a flow of fluid coolant 800 to capture the heat generated by the LED modules 410a. The coolant pipe 1006 may generally have a length longer than the frame 1004 so that respective end portions of the coolant pipe 1006 extend beyond the frame 1004 and through the end caps 1320a and 1320b as shown in FIGS. 2B-1 and 2B-2. In this manner, the coolant pipe 1006 may be fluidically coupled to other piping systems in a CEH system (e.g., another coolant pipe 1006 of another lighting fixture 1000a, the pipes of a fluid coolant circuit in a hydronics system) using, for example, an intermediate pipe or a compliant hose.

The coolant pipe 1006 may generally be coupled to another pipe or hose using various coupling mechanisms including, but not limited to, threaded fittings (e.g., the ends of the coolant pipe 1006 have corresponding threads), bolt fasteners (e.g., the end of the coolant pipe 1006 has a flange that mates to a corresponding flange on another pipe), and push-to-connect plumbing fittings (e.g., the ends of the coolant pipe 1006 are left bare). Push-to-connect plumbing fittings may be preferable since the piping connections do not include internal seals and/or O-rings, thus simplifying the design and installation of the lighting fixture 1000a.

The coolant pipe 1006 may generally be formed from various materials including, but not limited to, copper, aluminum, and stainless steel. In some implementations, the coolant pipes 1006 may be preferably formed from copper to reduce algae growth, fouling, and/or corrosion. In some implementations, the various pipes in the CEH system may be formed from copper and/or the interior surfaces of the hoses may be coated with copper. In some implementations, the coolant pipe 1006 may be coated or plated with nickel. When push-to-connect plumbing fittings are used, the fluid coolant 800 may thus pass through a fluid coolant circuit made only of copper. In other words, the fluid coolant 800 does not contact other materials in the lighting fixture 1000a (e.g., the frame 1004).

The cross-sectional dimensions of the coolant pipe 1006 may vary depending on several factors including, but not limited to, a desired flow rate, fluid coolant properties (e.g., dynamic viscosity, density), and a desired type of flow. For example, it may be desirable for the fluid coolant to be in a turbulent flow regime, which may yield a higher heat transfer coefficient, thus dissipating more heat from the lighting fixture 1000a. In some implementations, the cross-sectional dimensions of the coolant pipe 1006 may be chosen such that the Reynold's number (Re) is greater than a desired threshold (e.g., Re>4000 for turbulent flow) for a given pump power and coolant circuit layout. In some implementations, the coolant pipe 1006 may have an exterior width of about 0.5 inches.

In some implementations, the interior surface of the coolant pipe 1006 may also be roughened to increase the surface area and, hence, the convective heat transfer coefficient to further increase the cooling rate. The effective depth and pitch of the interior surface roughness may be chosen to reduce or, in some instances, prevent large increases to the pumping power (e.g., due to a larger pressure drop) and maintain wettability of the interior surface of the coolant pipe 1006 to the fluid coolant 800 (e.g., remains hydrophilic, oleophilic).

The fluid coolant 800 used to capture and carry heat from the lighting fixture 1000a may be chosen based on several factors. First, the fluid coolant 800 may have a high thermal conductivity and a high specific heat to increase the rate at which heat generated by the LED modules 410a is transferred and stored in the fluid coolant 800. Second, the fluid coolant 800 should preferably remain in a liquid phase within the operating temperature and pressure range of the controlled agricultural environment. For example, the fluid coolant 800 should not freeze or boil as it passes through the lighting fixture 1000a and/or any other components disposed along the fluid coolant circuit of the hydronics system (e.g., the heat rejection device, the pumps). Third, the fluid coolant 800 may be chosen based on the materials used in the construction of the fluid coolant circuit and, in particular, the coolant pipe 1006 of the lighting fixture 100a. For example, the fluid coolant 800 should preferably avoid corroding the coolant pipe 1006. In some implementations, the fluid coolant 800 may thus be various fluids including, but not limited to, water, mineral oil, glycol, and mixtures of any of the foregoing.

The LED modules 410a may each include one or more LED light sources (also referred to herein as LED elements) arranged into an array. Each LED light source may emit light or, more generally, radiation with a narrow wavelength band (e.g., a LED emits radiation based on the band gap of a semiconductor, such as blue, green, or red light) or a broad wavelength band (e.g., a LED includes a phosphor to emit a broad spectrum of radiation, such as white light). Thus, an array that includes multiple, different LED light sources may provide radiation that covers a broad spectrum (e.g., from ultraviolet (UV) wavelengths to infrared wavelengths) and a spectral intensity distribution (i.e., the intensity of radiation at different wavelengths or wavelength bands) that may be dynamically tuned based on user preferences (e.g., changing the proportion of red light or blue light incident on the plants).

Generally, the radiation emitted by the LED light sources may be used in several ways in the controlled agricultural environment including, but not limited to, providing photosynthetic active radiation (PAR) to increase photosynthetic activity in the plants, using radiation at different wavelengths to modify the growth of plants (e.g., using radiation to modulate the day-night cycle of plants), UV sterilization (e.g., to repel pests), and sensing (e.g., illuminating the plants using radiation at different wavelengths for the purposes of acquiring spectral or hyperspectral imagery).

The LED light sources may emit radiation in various wavelength regimes including, but not limited to, UV, visible, near-infrared (NIR), and short wavelength infrared (SWIR). In some implementations, one or more of the LED light sources may be essentially monochromatic LED elements that emit radiation at various wavelengths including, but not limited to, 275 nm, 365 nm, 440 nm, 450 nm, 475 nm, 500 nm, 530 nm, 620 nm, 630 nm, 660 nm, 696 nm, 730 nm, 760 nm, 850 nm, 860 nm, 940 nm, 950 nm, 1450 nm, 1610 nm, and 2060 nm. In some implementations, one or more of the LED light sources may be broadband LED elements that emit radiation across one or more wavelength regimes including, but not limited to, UV, visible, NIR, SWIR, and any combinations of the foregoing.

In one example, FIG. 2A shows the LED modules 410a may each include a printed circuit board (PCB) 411 supporting multiple LED light sources. Specifically, FIGS. 2A and 2E show the LED module 410a may include a LED light source 412a that provides white light (e.g., radiation at an equivalent black body temperature of 5000K) and a LED light source 412b that provides red light (e.g., 660 nm). The LED light sources 412a and 412b may be collectively referred to herein as the LED light sources 412. The LED module 410a may further include one or more electrical connectors 414 to electrically couple the LED module 410a to the control circuitry 90. For example, the electrical wire 416 may couple to the electrical connector 414 of the LED module 410a.

In general, the number of LED light sources 412 may vary based, in part, on the desired radiation output and/or intensity at one or more wavelength bands. For example, the LED module 410a may include a relatively larger number of LED light sources 412a to provide more full-spectrum PAR and a relatively smaller number of LED light sources 412b sufficient to induce desired photochemical and/or photosynthetic activity in the plants (e.g., making the plants feel as if it is being directly illuminated with sunlight).

In some implementations, the LED light sources 412 may be distributed across the lighting fixture 1000a to provide substantially uniform or uniform illumination at the respective wavelengths or wavelength bands of radiation emitted by the different types of LED light sources 412. However, it should be appreciated that, in other implementations, the LED light sources 412 may be non-uniformly distributed in the lighting fixture 1000a (e.g., LED light sources 412a may be disposed at one end of the lighting fixture 1000a and LED light sources 412b may be disposed at an opposite end of the lighting fixture 1000a). For example, each type of LED light source may be grouped together to provide a higher intensity of radiation at a particular wavelength or wavelength band. Additionally, the position and/or orientation of the lighting fixture 1000a may be dynamically adjusted during operation so that the plants may uniformly receive the higher intensity radiation.

In some implementations, one or multiple LED light sources 412 in each LED module 410a may be separately controlled. For example, the control circuitry 90 may control the amount of electrical power delivered to each individual LED light source 412 so that radiation output from each LED light source 412 is tunable. In another example, the control circuitry 90 may control LED light sources 412 of the same type (e.g., turning on or off the white LED light sources 412a separately from the red LED light sources 412b). In some implementations, the control circuitry 90 may control each LED module 410a separately from other LED modules 410a (e.g., turning on or off the LED module 410a-1 while adjusting the radiation output of the LED module 410a-2).

In some implementations, the PCB 411 may be a metal core printed circuit board (MCPCB) to dissipate the heat generated by the LED light sources 412 more effectively (e.g., the heat is more readily spread across the PCB 411). The LED module 410a may be coupled to the first frame component 1200a such that the backside of the PCB is in contact with the bottom surface of the mounting channel 1204a. As described above, the LED module 410a may be coupled to the first frame component 1200a using a zip tie 1210a. Additionally, the LED modules 410a may be coupled to the first frame component 1200a using an adhesive and/or a thermal interface material (e.g., thermal paste) to provide greater thermal contact with the first frame component 1200a (e.g., placing the thermal paste between the PCB 411 and the first frame component 1200a).

More generally, the LED modules 410a may be coupled to the first frame component 1200a using various coupling mechanisms including, but not limited to, screw fasteners, bolt fasteners, clips, adhesives, and clamps. In some implementations, the coupling mechanism may provide an adjustable clamping force applied to the LED modules 410a to increase, for example, the thermal contact between the LED modules 410a and the first frame component 1200a.

Figure 7A:
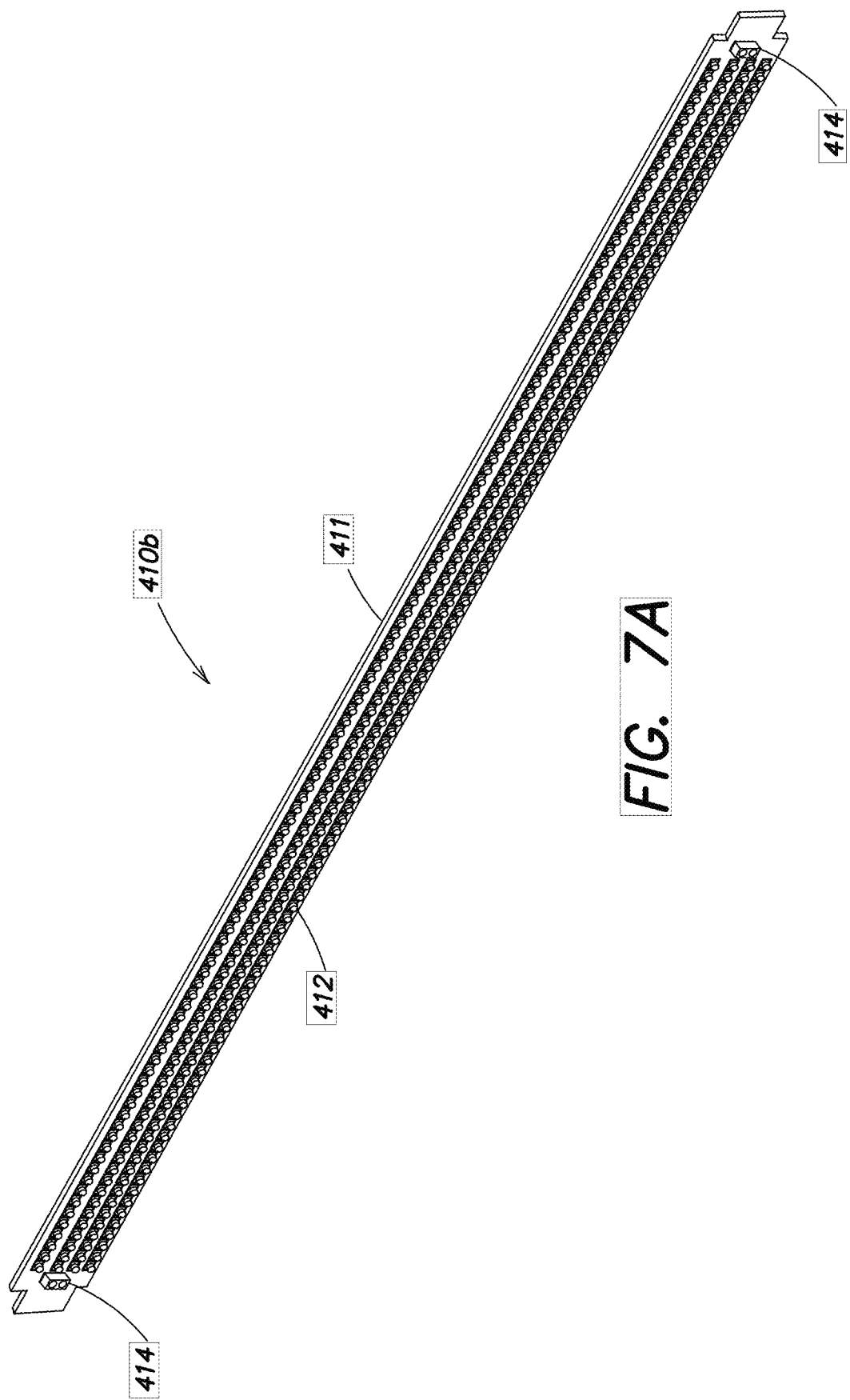
FIG. 7A shows a bottom perspective view of an exemplary LED module having four rows of LED light sources.
Figure 7D:
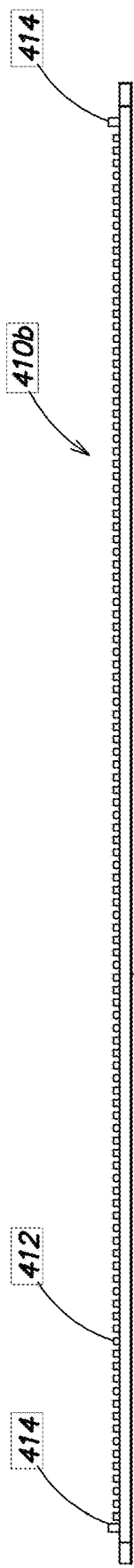
FIG. 7D shows a rear view of the LED module of FIG. 7A.
Figure 7E:
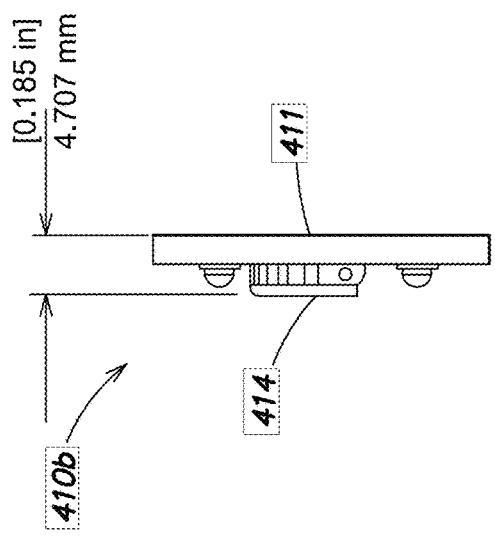
FIG. 7E shows a right-side view of the LED module of FIG. 7A.

FIGS. 7A-7E show several views of another exemplary LED module 410b with four rows of LED light sources 412. Similar to the LED module 410a, the LED module 410b may include a PCB 411 to support the array of LED light sources 412. Electrical connectors 414 may also be disposed at opposing ends of the PCB 411 for connection with the control circuitry 90 via one or more wires 416. As shown, the LED light sources 412 may be uniformly distributed across the PCB 411 to provide uniform illumination of the plants. As shown in FIG. 7B, the LED module 410b may have a length of about 19.5 inches and a width of about 1.063 inches.

Figure 8A:
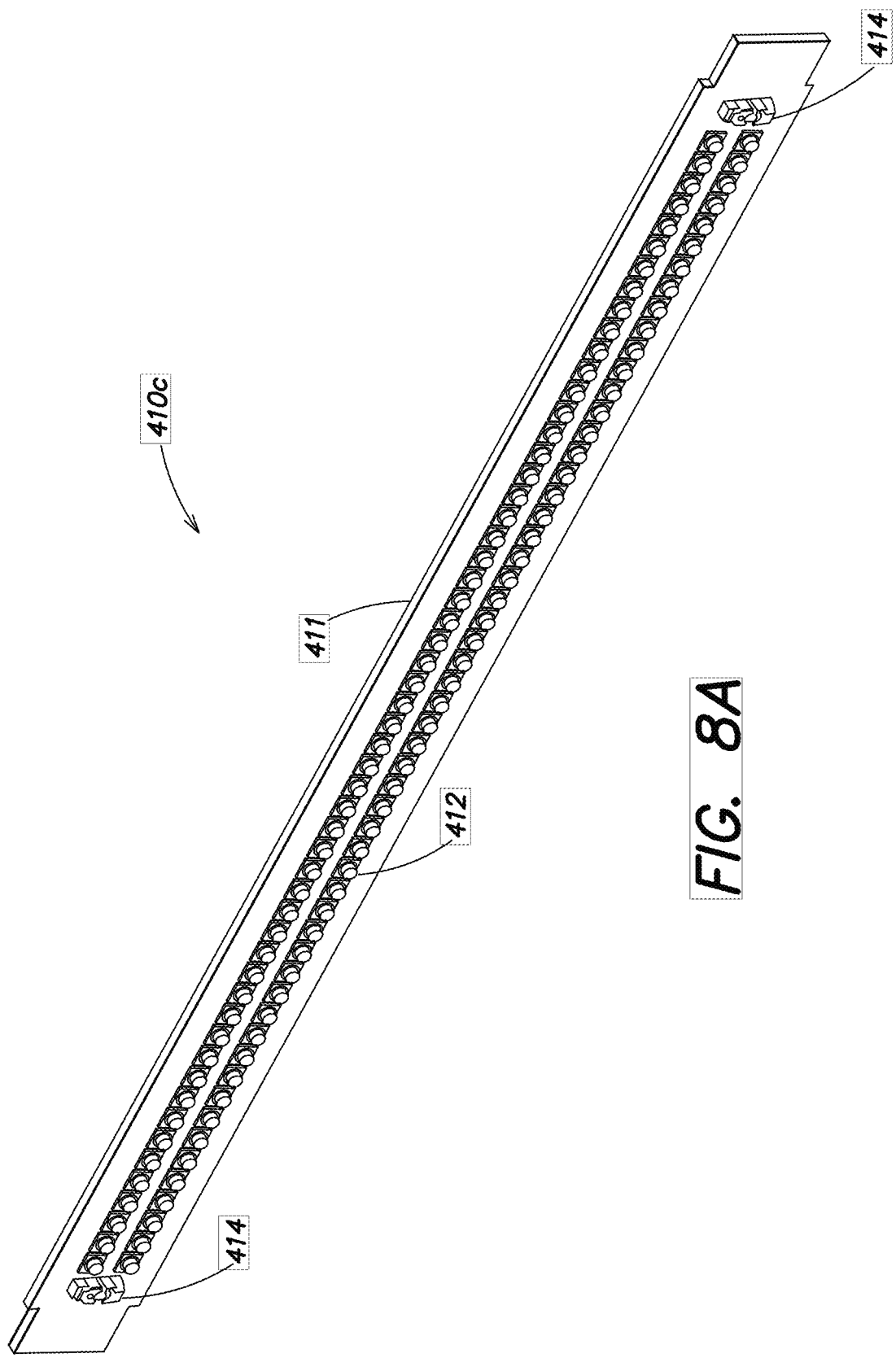
FIG. 8A shows a bottom perspective view of an exemplary LED module having two rows of LED light sources.
Figure 8D:
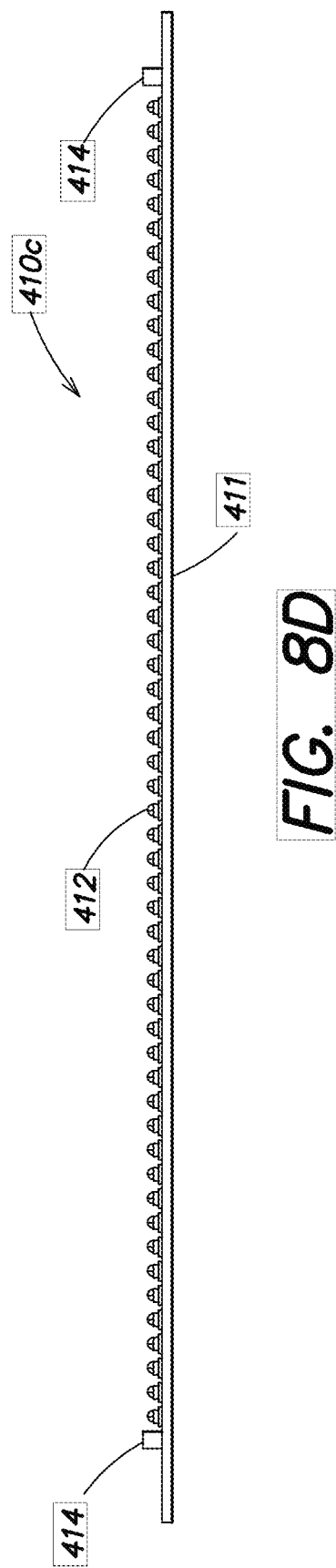
FIG. 8D shows a rear view of the LED module of FIG. 8A.
Figure 8E:
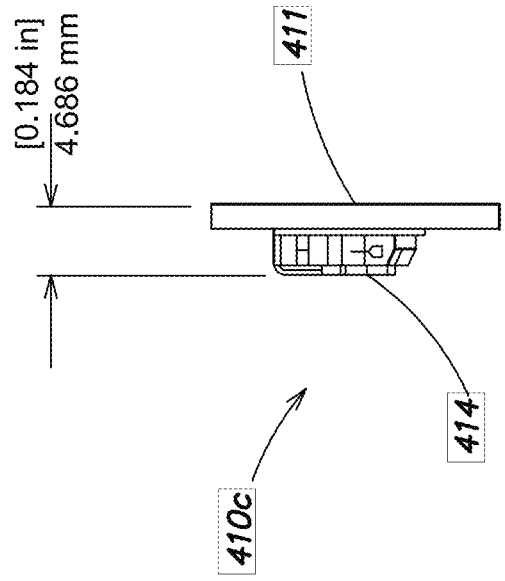
FIG. 8E shows a right-side view of the LED module of FIG. 8A.

FIGS. 8A-8E show several views of another exemplary LED module 410c that is smaller than the LED module 410b. As shown, the LED module 410c may include two rows of LED light sources 412 supported by a PCB 411 with electrical connectors 414 disposed at opposing ends of the PCB 411 for connection with the control circuitry 90 via one or more wires 416. FIG. 8B shows the LED module 410b may have a length of about 9.5 inches and a width of about 0.63 inches.

The number of LED modules included in the lighting fixture 1000a may depend, in part, on the dimensions of each LED module. For example, the lighting fixture 1000a may include a larger number of LED modules 410c than the LED modules 410b. This may allow for lighting fixtures 1000a to have different LED modules with different distributions and/or types of LED light sources to customize the spectral content and intensity of the radiation provided by the lighting fixture 1000a. It should be appreciated that so long as the LED modules fit within the mounting channel 1204a, the LED module may still be installed on the first frame component 1200a even if the LED module is smaller in size than the mounting channel 1204a. For example, the LED module 410c may still be coupled to the first frame component 1200a using a combination of zip ties 1210a and/or thermal paste/adhesive.

In some implementations, the lighting fixture 1000a may also include an optic (not shown) disposed on the tube 1300 or within the cavity 1302. In some implementations, one or more optics may be mounted directly onto the LED modules 410a. The optic may be used to modify the direction and/or the angular distribution of the light emitted by the LED modules 410a. For example, a portion of the optic may have a convex surface to focus light emitted from the LED module 410a onto plants located directly below the lighting fixture 1000a. The optic may be coupled to the frame 1004 and, in particular, the first frame component 1200a, using various coupling mechanisms including, but not limited to screw fasteners, bolt fasteners, clips, and clamps.

In some implementations, the lighting fixture 1000a may include one or more alert indicators. The alert indicator may generally be a visual and/or audio alert. For example, FIG. 2C-2 shows the lighting fixture 1000a may include a visual alert indicator 1240 disposed on the first frame component 1200a near the end cap 1320a. The alert indicator may generally provide a user an alert notification regarding the operating status of the lighting fixture 1000a. For example, if the lighting fixture 1000a is operating normally, the alert indicator 1240 may emit green light. If the lighting fixture 1000a is overheating, the alert indicator 1240 may emit red light. If the operation of the lighting fixture 1000a is interrupted or not functioning properly, the alert indicator 1240 may emit yellow light. Generally, the alert indicator 1240 may be activated for various conditions including, but not limited to, the lighting fixture 1000a overheating, the control circuitry 90 no longer functioning properly (e.g., the control circuitry 90 has stopped), the LED modules 410a do not emit radiation when the lighting fixture 1000a receives power and is commanded to emit radiation, the lighting fixture 1000a is at too low of an operating temperature, and the lighting fixture 1000a is receiving power, but is not operating as desired.

The control circuitry 90 may generally provide several functions to facilitate the operation of the lighting fixture 1000a including, but not limited to, power conversion (e.g., conversion of AC power to DC power for the LED modules 410a), network connectivity (e.g., communication with other sensor(s) or control system(s) in the controlled agricultural environment), data processing (e.g., receiving sensory data from sensors coupled to the lighting fixture 1000a and adjusting an operational parameter of the lighting fixture 1000a without receipt of instructions from another system), control of the LED modules 410a (e.g., adjusting the radiation intensity), and control of auxiliary devices coupled to the lighting fixture 1000a (e.g., sensors, cameras). In some implementations, the control circuitry 90 may additionally include a dimmer or dimming functionality that controllably reduces the radiation output of the LED modules 410a or each LED light source 412. For example, each LED light source 412 may emit radiation at a nominal intensity (with the dimmer deactivated), which may be decreased to 1% of the nominal intensity via the dimmer.

Various sensors and/or cameras may be integrated into the lighting fixture and/or communicatively coupled to the lighting fixture including, but not limited to, a light temperature sensor to monitor the temperature of the LED module(s), a cold-side fluid coolant temperature sensor to measure the temperature of the fluid coolant entering the coolant pipe of the lighting fixture, a hot-side fluid coolant temperature sensor to measure the temperature of the fluid coolant exiting the coolant pipe of the lighting fixture, an ambient air temperature sensor, a relative humidity sensor, a carbon dioxide sensor, an air speed sensor, a light sensor (visible, UV, near-infrared, short wavelength-infrared, long wavelength-infrared), LiDAR, and a camera (visible, UV, near-infrared, short wavelength-infrared, long wavelength-infrared).

The control circuitry 90 may be electrically coupled to an electrical cable or cable assembly that provides electrical power and/or communication to the lighting fixture 1000a. In some implementations, the control circuitry 90 may be configured to receive AC power greater than or equal to about 175 W (e.g., 350 W). The power density, which is defined as the ratio of the electrical power input to the exterior length of the lighting fixture, the volume of the lighting fixture, and/or the volume of the grow space. If the tube 1300 is cylindrical in shape with a diameter of 2 inches and a length of 96 inches, the power density per unit length of the lighting fixture may be about 1.8 W per inch. The power density per unit volume of the lighting fixture may be about 0.6 W per cubic inches (e.g., 175 W divided by $\pi(2 \text{ inches})^2/4 \cdot (96 \text{ inches})$). If the grow space is assumed to be a cube with 3.27 foot (i.e., 1 m) long sides, the power density per unit volume of the grow space may be about 5 W per cubic feet. More generally, the lighting fixture 1000a may have a power density per unit length of the lighting fixture greater than or equal to about 1.5 W per inch, a power density per unit volume of the lighting fixture greater than or equal to about 0.5 W per cubic inches, and/or a power density per unit volume of the grow space greater than or equal to about 5 W per cubic feet.

Figure 9A:
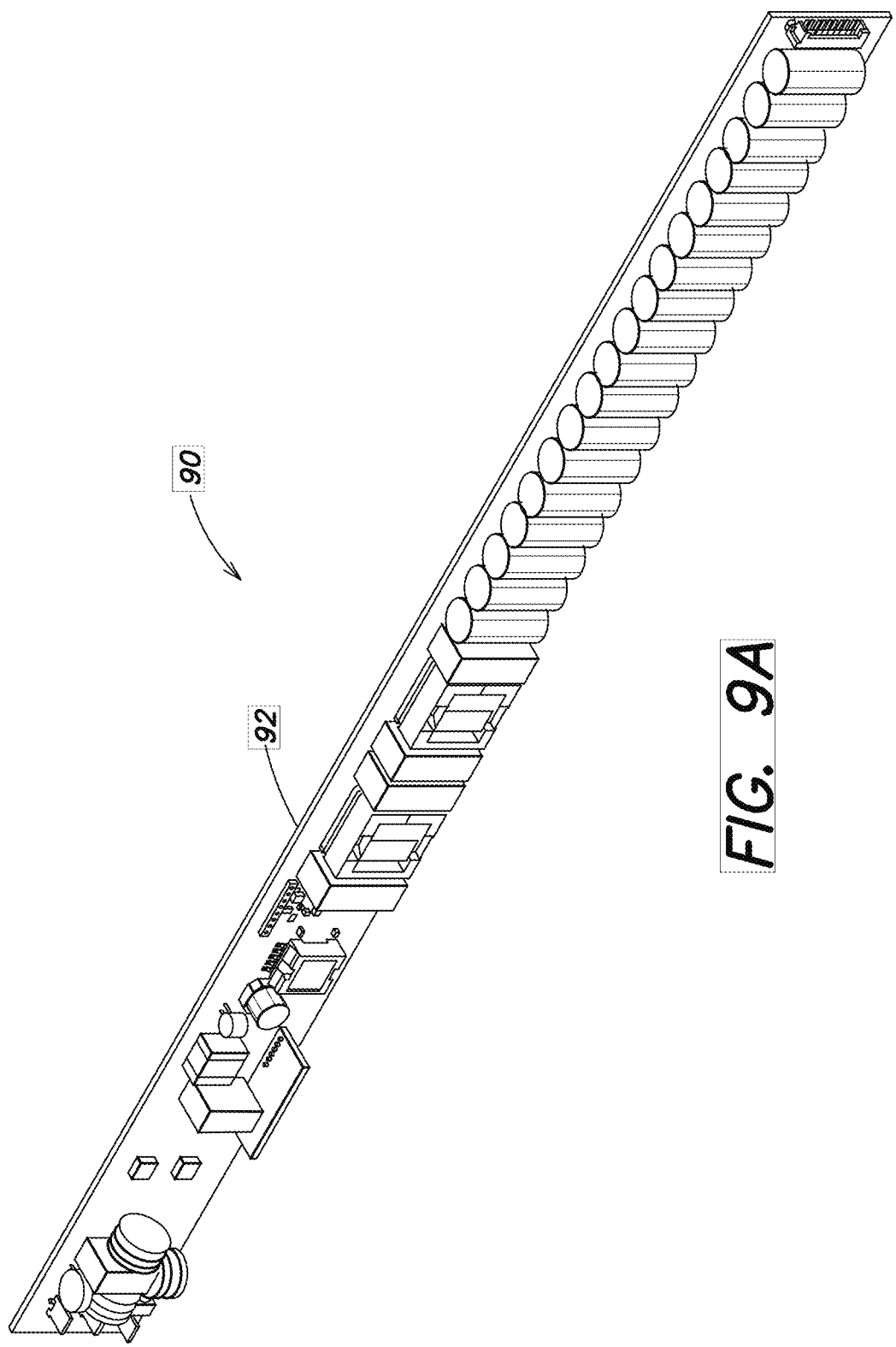
FIG. 9A shows a top perspective view of control circuitry in the lighting fixture of FIG. 2A.
Figure 9B:
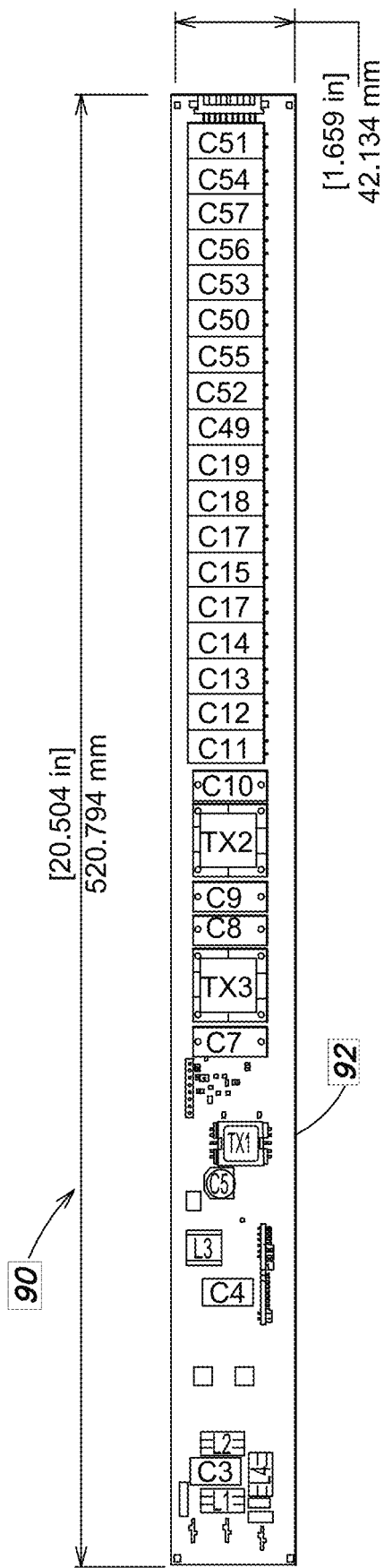
FIG. 9B shows a top view of the control circuitry of FIG. 9A.
Figure 9C:
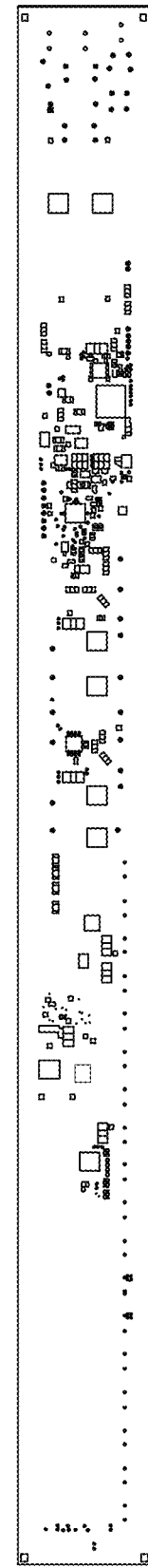
FIG. 9C shows a bottom view of the control circuitry of FIG. 9A.
Figure 9D:
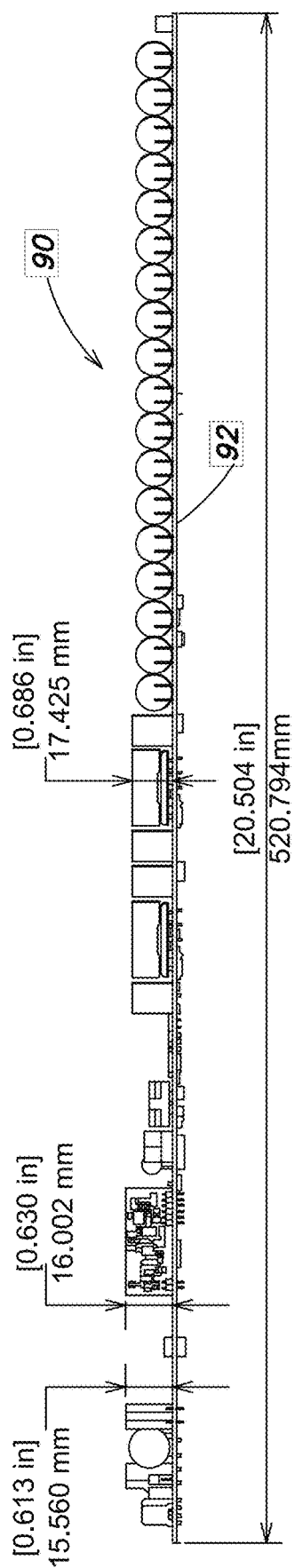
FIG. 9D shows a front view of the control circuitry of FIG. 9A.
Figure 9E:
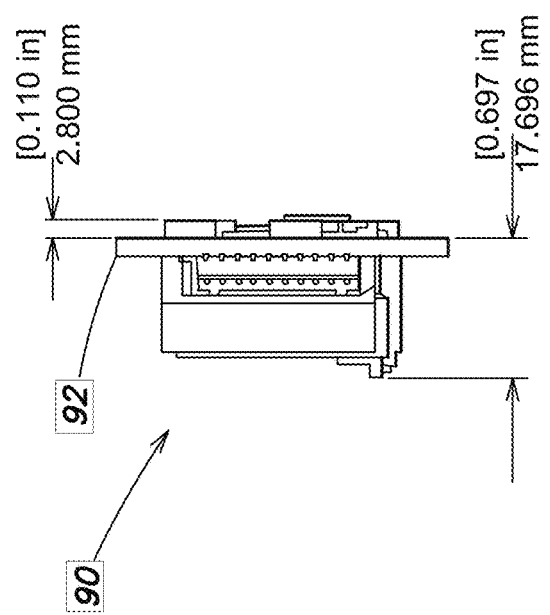
FIG. 9E shows a right-side view of the control circuitry of FIG. 9A.

In some implementations, the control circuitry 90 may be comprised of discrete electronics assemblies that are electrically coupled together and disposed on one or more PCB's. For example, FIGS. 9A-9E show several views of the control circuitry 90 in the lighting fixture 1000a. As shown, the control circuitry 90 may include numerous electronic elements disposed on a single PCB 92. In general, the PCB 92 may be shaped and/or dimensioned based on the geometry of the tube 1300 and/or the frame 1004. For example, the PCB 92 may be rectangular in shape to conform with the geometry of the second frame component 1200b. FIG. 9B further shows the PCB 92, in some implementations, may have a length of about 20.5 inches and a width of about 1.65 inches. The various electronic elements disposed on the PCB 92 may also be arranged and/or dimensioned based on the spatial constraints imposed by the tube 1300. For example, FIG. 9E shows the electronic elements may not extend beyond about 0.7 inches from the PCB 92.

The various electronics assemblies may provide one or more distinct functions to the control circuitry 90. For example, FIG. 11A shows a block diagram of the various electronic components and circuitry in the control circuitry 90 and their functions. FIGS. 11B-1 through 11B-4 show four portions of a circuit diagram corresponding to the block diagram of the control circuitry 90 in FIG. 11a. As shown, the control circuitry 90 may regulate and distribute electrical power to other components of the lighting fixture 1000a. In terms of the inputs and/or outputs of the control circuitry 90, FIG. 11A shows the control circuitry 90 may receive AC power through an electrical power port 1010, which may be converted to DC power. The control circuitry 90 may then supply the DC power and other control signals to other electronics in the lighting fixture 1000a (e.g., the LED modules 410a, auxiliary devices communicatively coupled to the lighting fixture 1000a, sensors integrated into the lighting fixture 1000a). For example, the control circuitry 90 may be directly coupled to multiple LED modules 410a via corresponding ports/connectors in the control circuitry 90 (e.g., the LED board ports 104A, 104B, and 104C if the lighting fixture 1000a has only three LED modules 410a).

The control circuitry 90 may also be electrically and communicatively coupled to a separate communications board (not shown) via a communications board port 173, which provides power and data communication to the communications board. In some implementations, the communications board may manage data communication between various devices coupled to the lighting fixture 1000a including, but not limited to, other lighting fixtures 1000a, one or more auxiliary sensors coupled to the lighting fixture 1000a, and one or more external communications devices (WiFi, Bluetooth, RS-485). In some implementations, the communications board port may be used to supply electrical power at different voltages, e.g., 48 V and 5 V, to the communications board.

FIG. 11A further shows the control circuitry 90 may include a fuse 170 as a safety feature to protect the various electronics of the control circuitry 90 from overcurrent. In some implementations, the control circuitry 90 may be configured to work with a power line carrier (PLC) in which electrical power and data communication are carried on the same conductor. The control circuitry 90 may include an electrical power coupler 171 to separate the communication signals from the electrical power received by the PLC.

For power conversion, the control circuitry 90 may include an electromagnetic interference (EMI) filter 153 to reduce noise input and a rectifier 157 to convert AC power to DC power. An AC line sensor 155 may be electrically coupled to the output of the rectifier 157 to monitor the voltage and current of the DC power. The DC power may be transmitted to a bias and control power supply 156, which may distribute DC power to other components of the lighting fixture 1000a including the communications board and a digital signal processor (DSP) 150. A DC-DC converter (not shown) may also be included to supply different voltage inputs to other electrical circuits coupled to the control circuitry 90 (e.g., a communications board). For data communication, the control circuitry 90 may include a PLC module 172 to extract and interpret communication signals carried on the PLC.

As shown, the PLC module 172 and the bias and control power supply 156 may be connected to the DSP 150 to provide communication signals (e.g., commands, data) and power, respectively. The DSP 150 may also receive a voltage and current measurement from the AC line sensor 155, and LED board sensor inputs via the sensor ports 157a, which may be used, but not limited to, monitoring the temperature of the LED modules 410a. The DSP 150 may provide control signals by executing firmware 152 to various components including the communications board. The control circuitry 90 may include onboard memory, in which control and digital signal processing (DSP) firmware 152 is stored to facilitate generation of control signals. The DSP 150 may also provide control signals to one or more boost converters (e.g., boost converters 162A, 162B, and 162C if three LED modules 410a are included in the lighting fixture 1000a), which may be used to regulate electricity supplied to the LED modules via the LED board ports. The boost converters may also receive DC power directly from the rectifier 157 as well.

In some implementations, the control circuitry 90 may manage the voltage and current supplied to various components of the lighting fixture 1000a (e.g., the LED modules 410a) in order to reduce the likelihood of damage under different operating conditions. For example, the lighting fixture 1000a may operate under low voltage conditions where at least about 175 W may be supplied to the LED modules 410a and at least about 25 W for any auxiliary sensors and/or other devices coupled to the lighting fixture 1000a. In some implementations, the electrical cable coupled to the lighting fixture 1000a to supply power from an external source, e.g., a building electrical supply system or electrical mains, may be rated to sustain a current up to 30 A.

The control circuitry 90 may limit the current through the lighting fixture 1000a to a lower current (e.g., 5 A (or 10 A) for three LED modules 410a) such that the lighting fixture 1000a may be powered by a single electrical cable. If the current draw of the lighting fixture 1000a approaches 5 A (or 10 A), the control circuitry 90 may reduce the power draw of the lighting fixture 1000a. In this manner, the three LED modules 410a may collectively avoid a total current draw that exceeds 15 A (or 30 A), thus reducing the likelihood of damaging the electrical cable.

In some implementations, the control circuitry 90 may enforce a current draw limit using an active feedback control loop. For example, the DSP 150 of the control circuitry 90 may actively measure the voltage and/or current supplied to the lighting fixture 1000a via the AC line sensor 155. Depending on the magnitude and/or rate of change of the measured voltage and current, the DSP 150 may adjust the voltage and current supplied to each of the LED modules 410a such that the current drawn by the lighting fixture 1000a is maintained below the current draw limit.

This process may be conducted in an iterative manner where measurements of the voltage and current supplied to the lighting fixture 1000a and subsequent adjustments to the voltage and current supplied to the LED modules 410a repeatedly occur at a preset timescale. In some implementations, the timescale may vary from about 1 ms to about 60 s. The amount the voltage and current are varied during each increment may also vary according to the rate of change of the voltage and current supplied to the lighting fixture 1000a. In some implementations, the stability of the active feedback control loop may be controlled by incorporating a proportional integral differential (PID) controller into the control circuitry 90.

Figure 12A:
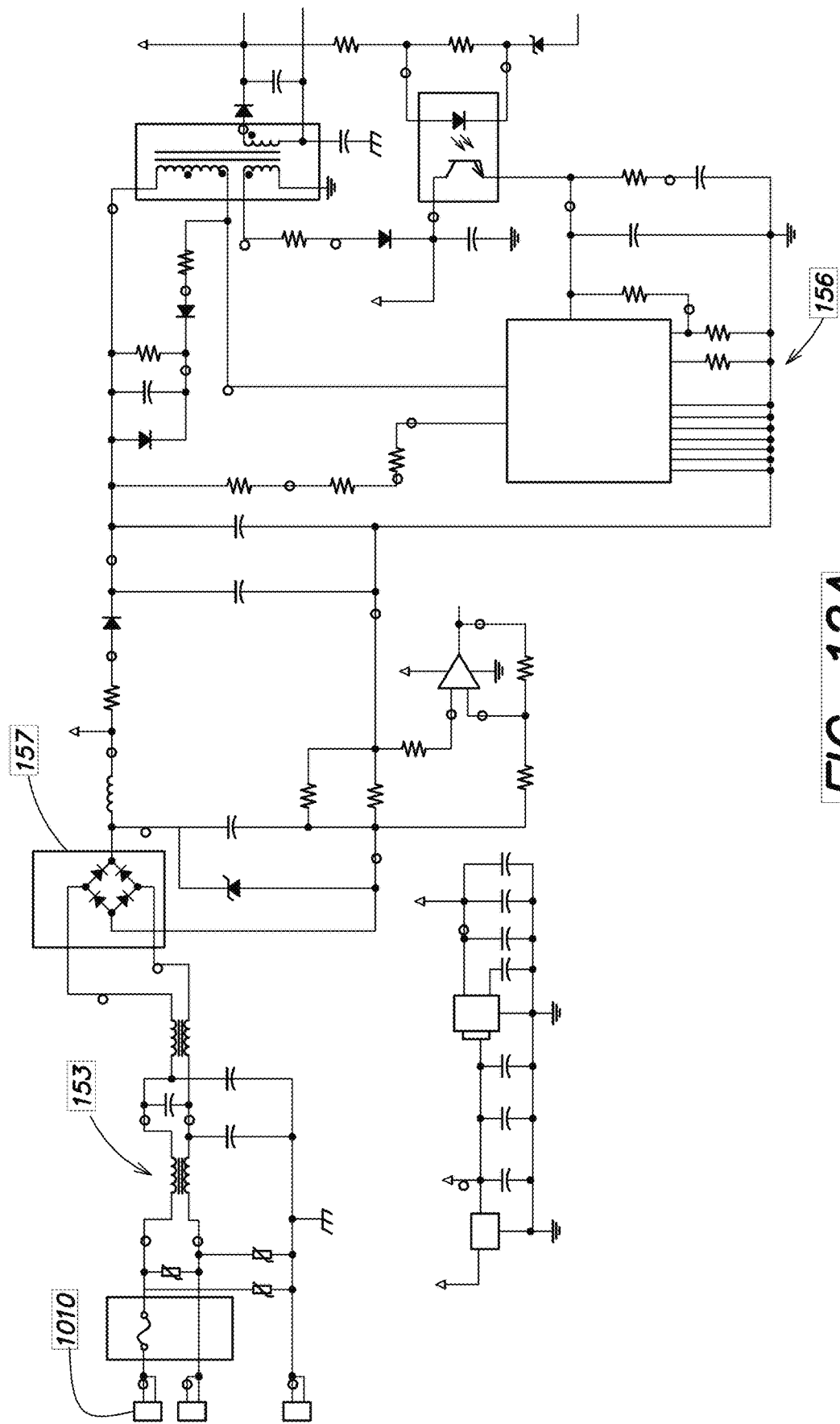
FIG. 12A shows a circuit diagram of various electrical components in the control circuitry of FIG. 9A, according to some implementations of the disclosure.
Figure 12B:
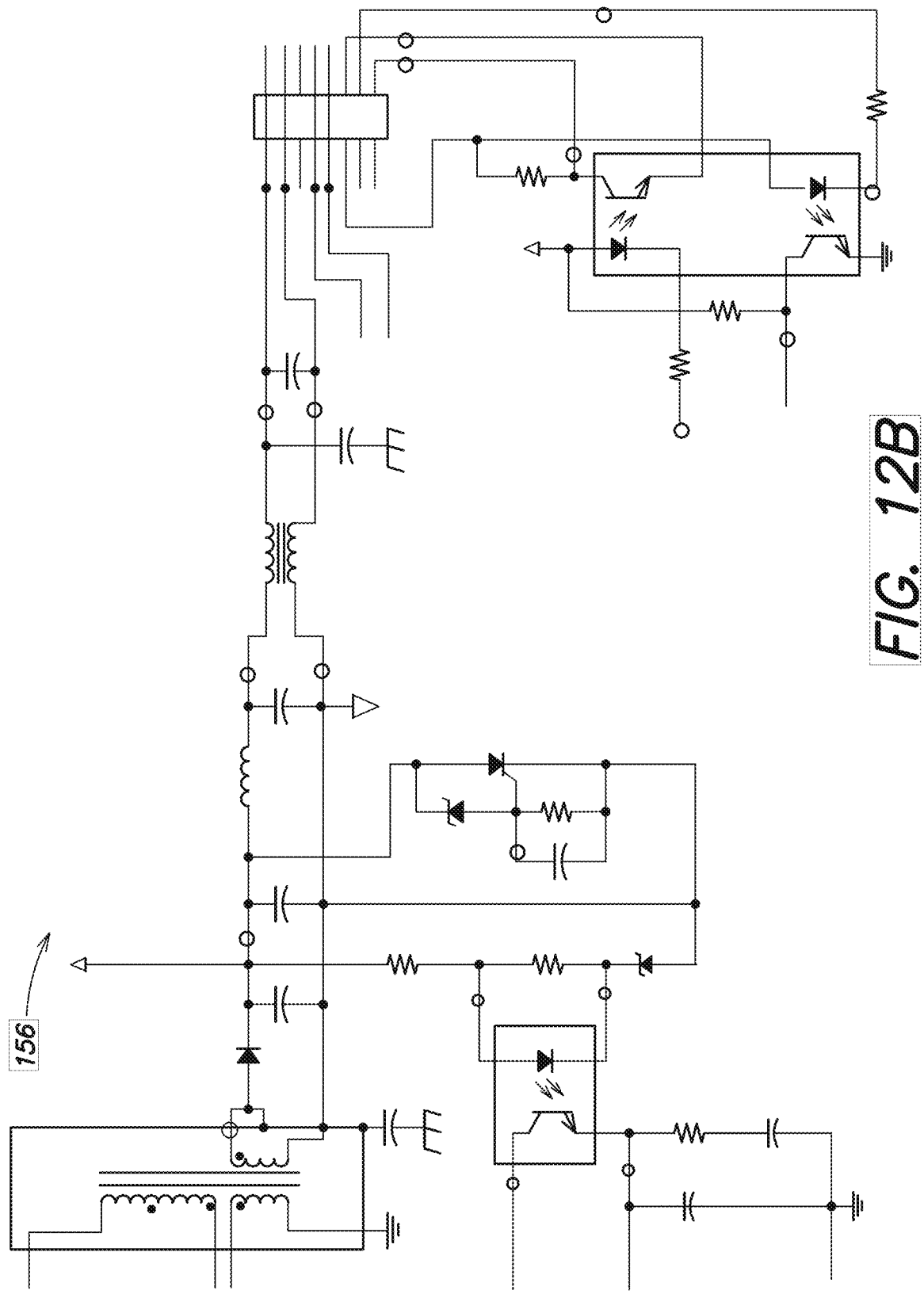
FIG. 12B shows a circuit diagram of the bias and control power supply in the control circuitry of FIG. 12A.
Figure 12C:
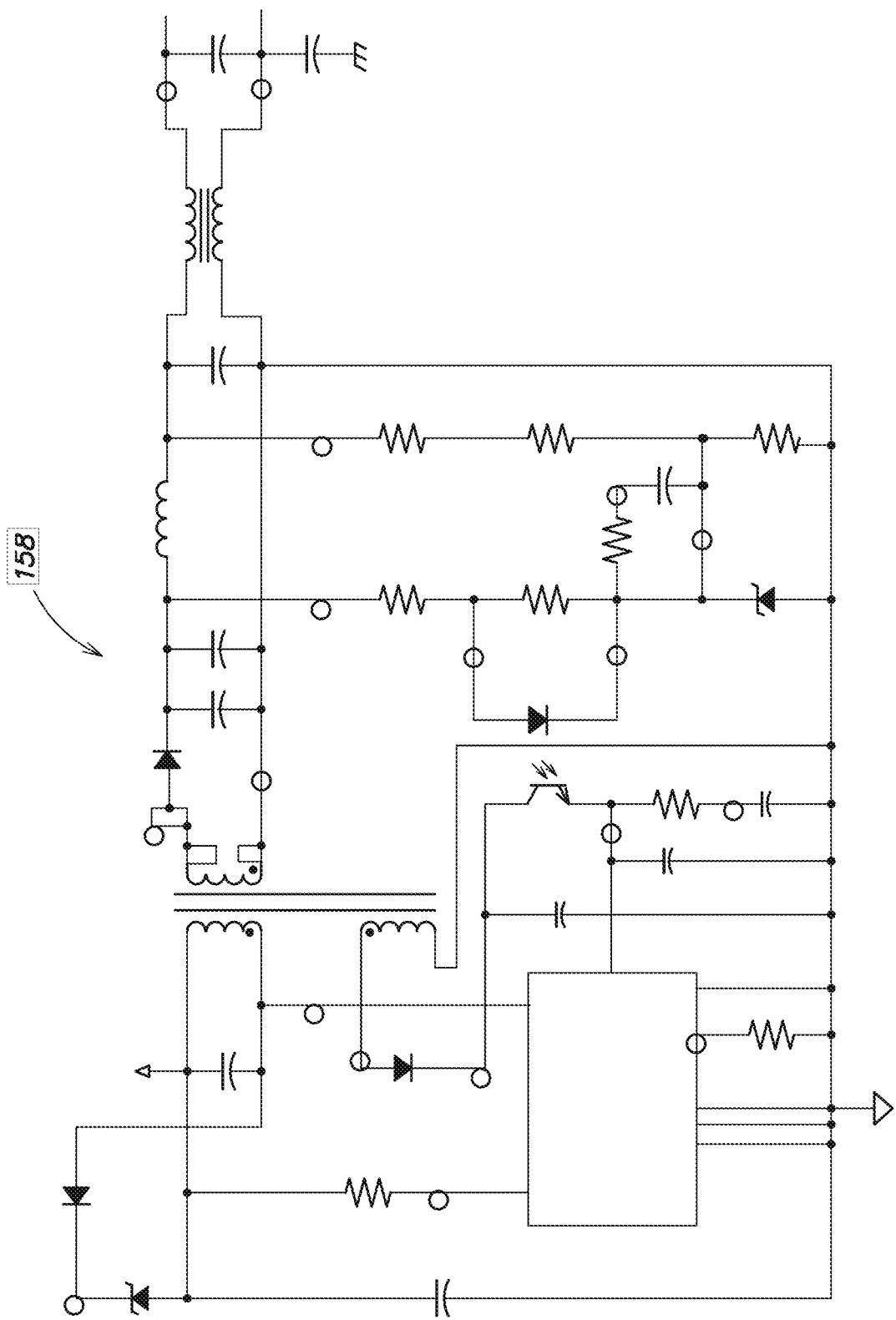
FIG. 12C shows a circuit diagram of an optional DC-DC converter.
Figure 12D:
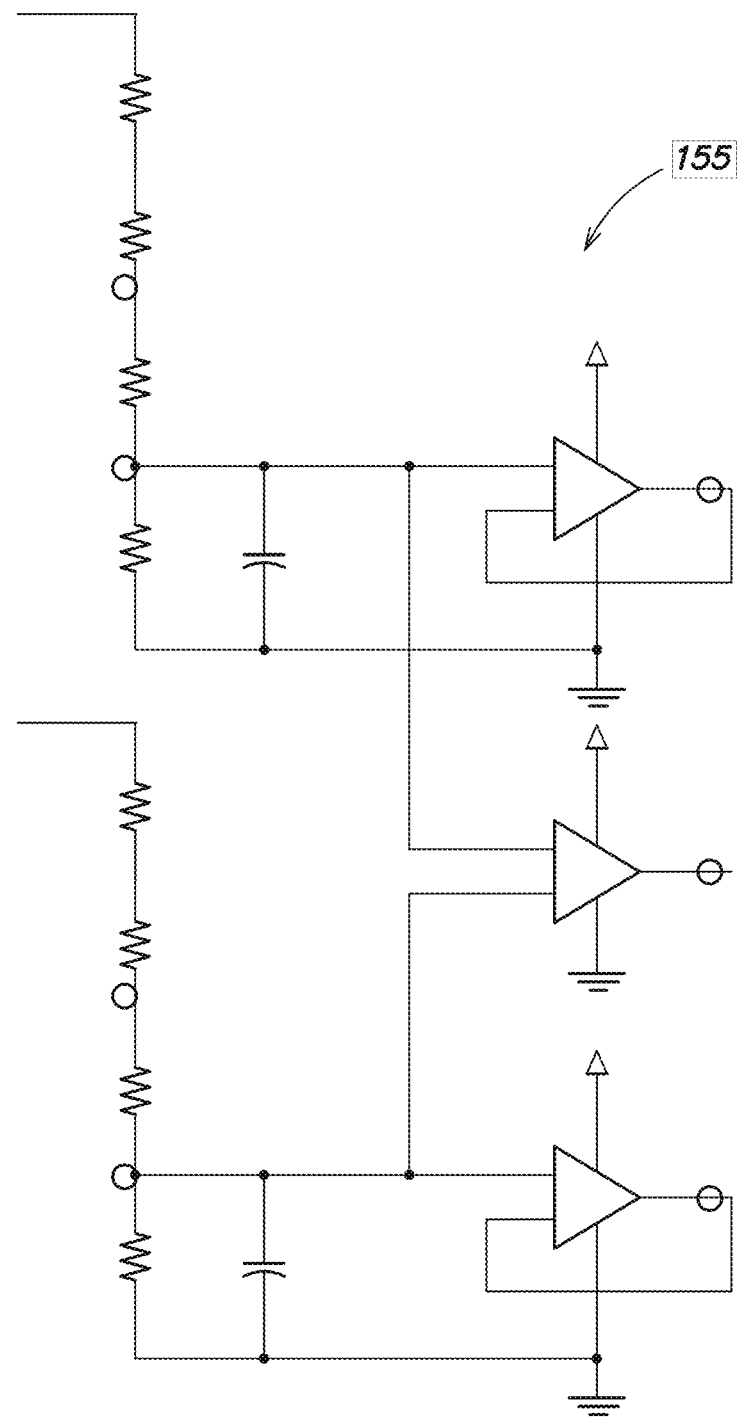
FIG. 12D shows a circuit diagram of the AC line sensor in the control circuitry of FIG. 12A.
Figure 12E:
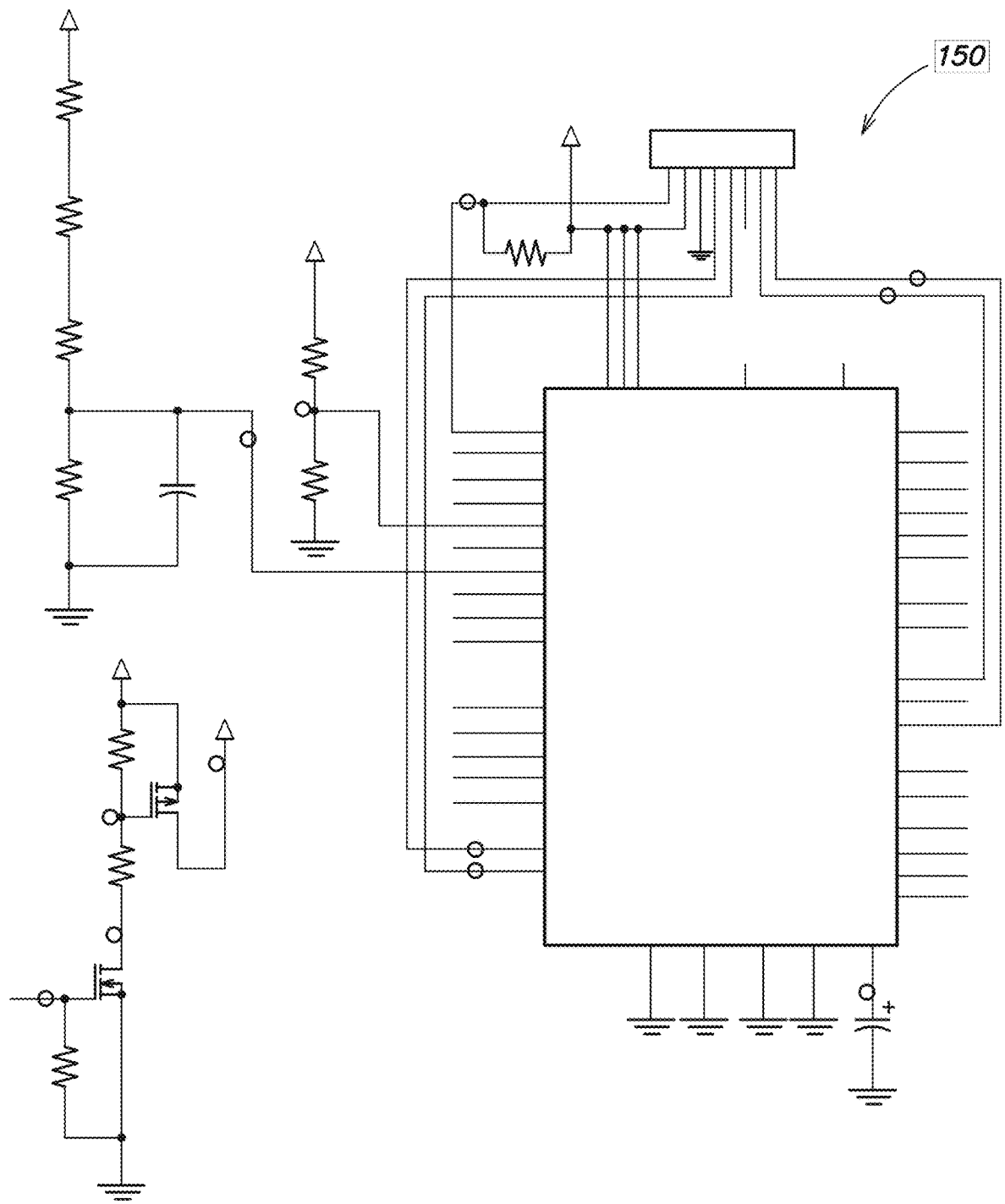
FIG. 12E shows a circuit diagram of the digital signal processor (DSP) in the control circuitry of FIG. 12A.
Figure 12F:
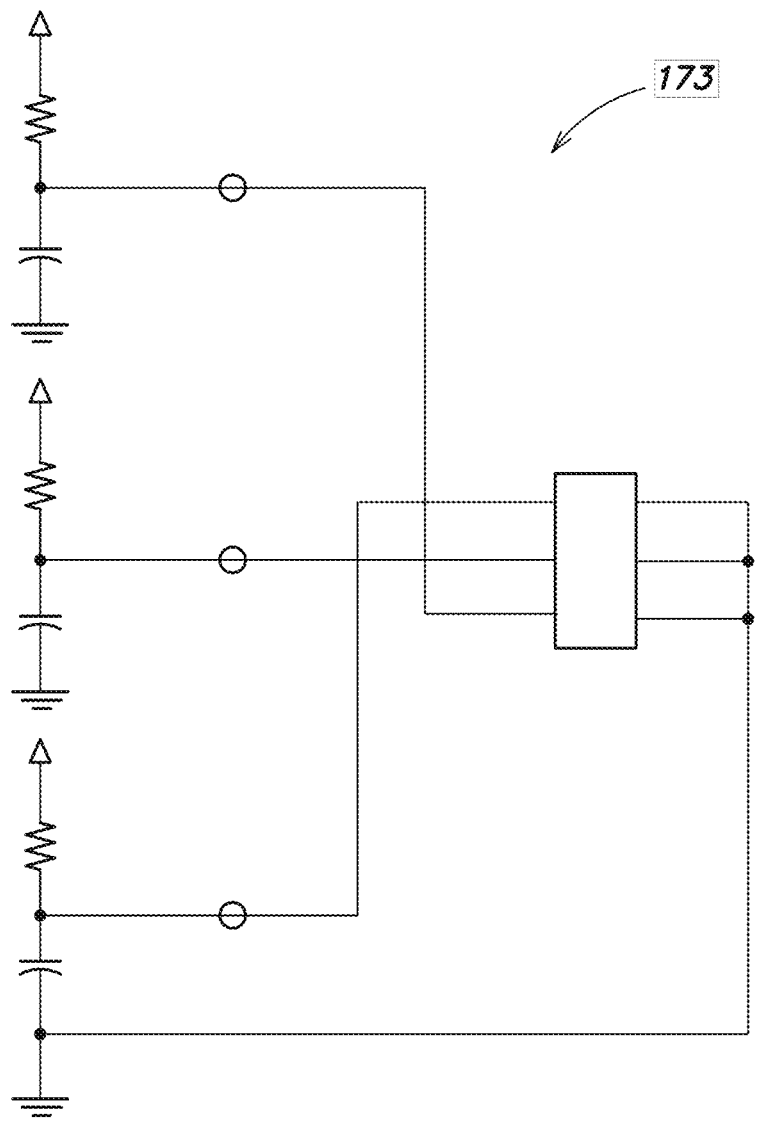
FIG. 12F shows a circuit diagram of the temperature sensor circuitry in the control circuitry of FIG. 12A.
Figure 12G:
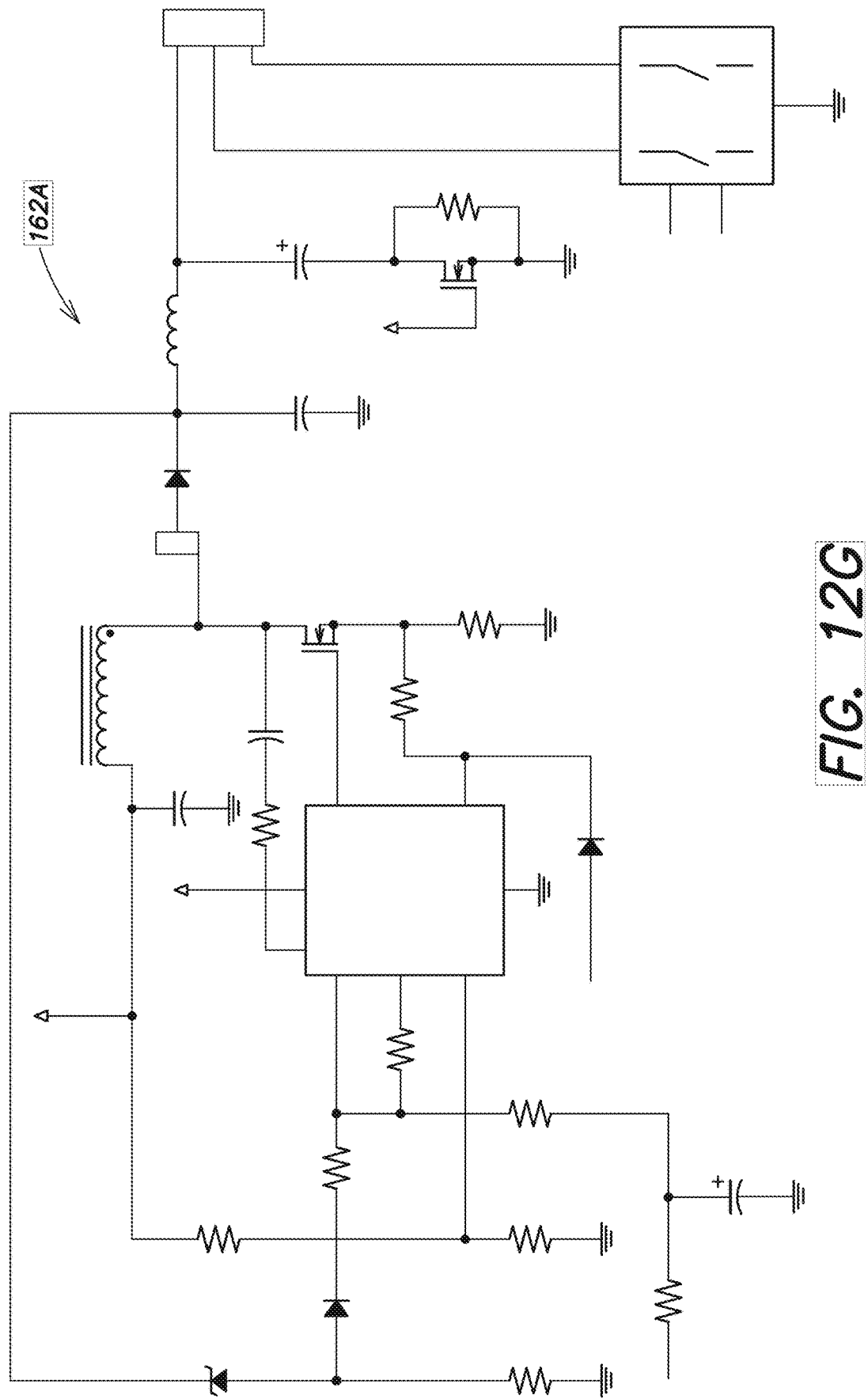
FIG. 12G shows a circuit diagram of the boost circuit in the control circuitry of FIG. 12A.
Figure 12H:
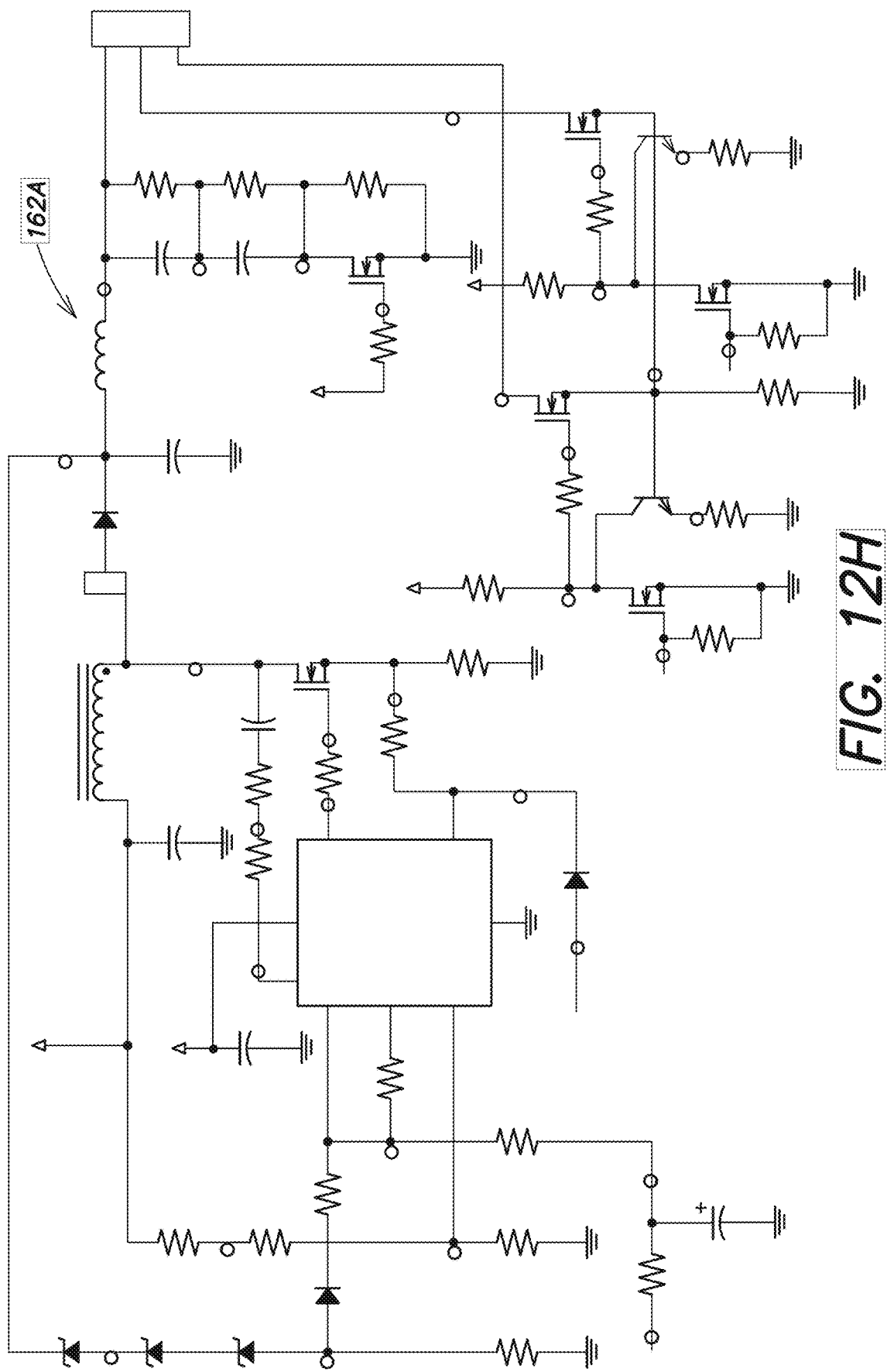
FIG. 12H shows a circuit diagram of another boost circuit in the control circuitry FIG. 12A.
Figure 12I:
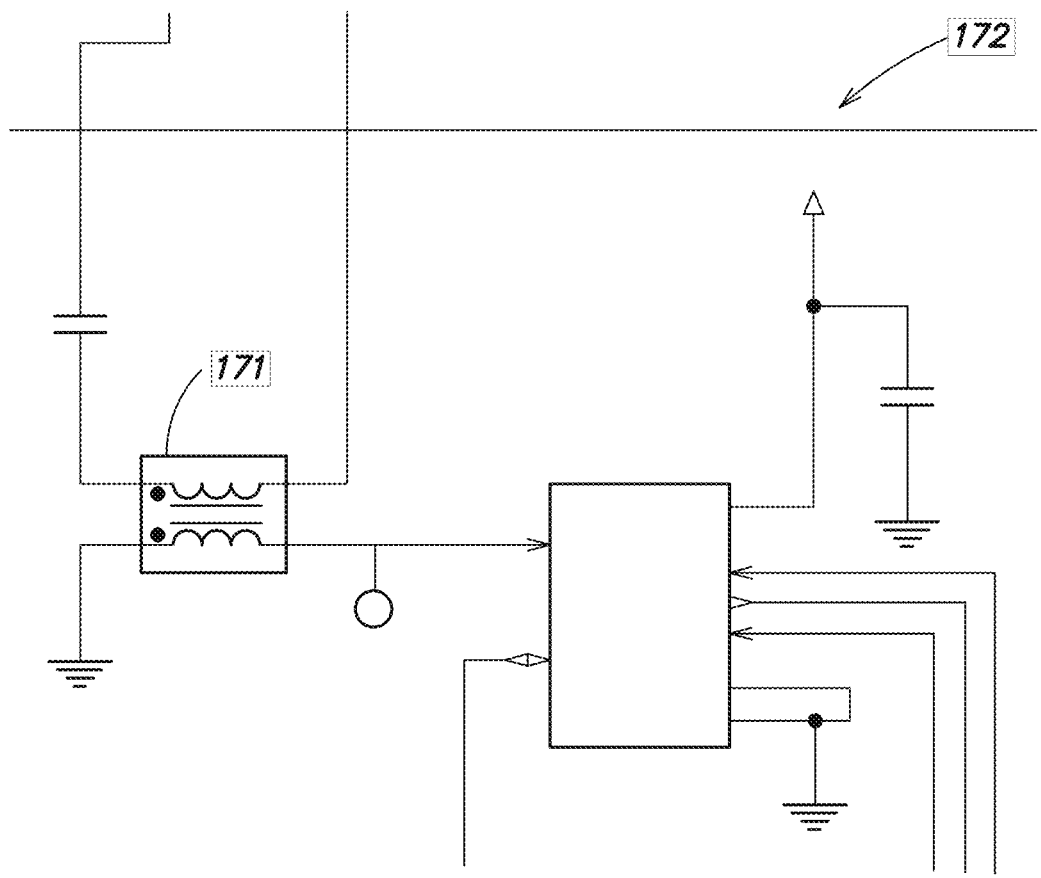
FIG. 12I shows a circuit diagram of an electrical power coupler and a PLC module in the control circuitry of FIG. 12A.

FIGS. 12A-12I show exemplary circuit diagrams corresponding to the various electrical components of the control circuitry 90. FIG. 12A shows circuit diagrams for the electrical power port 1010, fuse/EMI filter 153, a rectifier 154, and a first portion of a bias and control power supply 156. FIG. 12B shows a second portion of the bias and control power supply 156 shown in FIG. 12A. FIGS. 12C-12F show an optional DC-DC converter 158, an AC line sensor 155, a DSP 150, and a temperature sensor 173. FIGS. 12G and 12H show circuit diagrams of an exemplary boost circuit 162A in the control circuitry 90. FIG. 12I shows circuit diagrams for the electrical power coupler 171 and the PLC module 172.

Figure 15A:
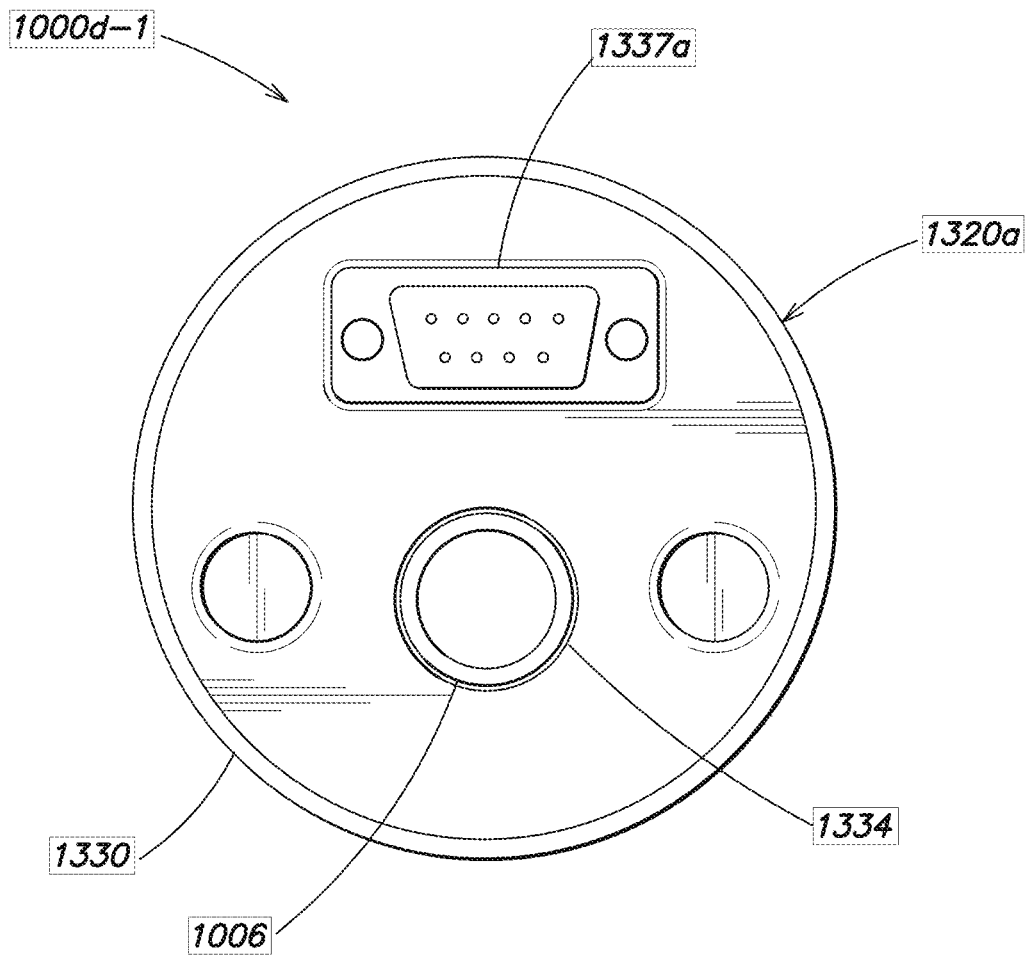
FIG. 15A shows a right-side view of an exemplary lighting fixture with a RS-485 port.
Figure 15B:
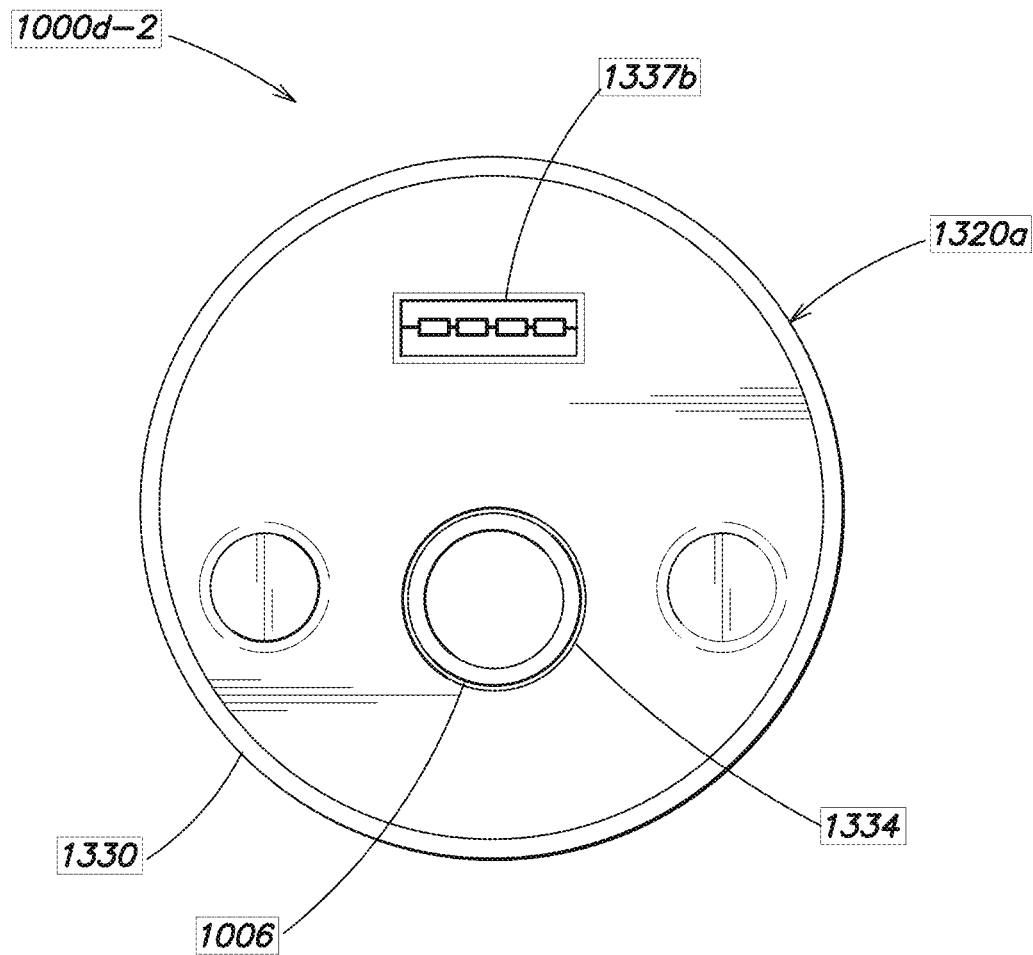
FIG. 15B shows a right-side view of an exemplary lighting fixture with a Universal Serial Bus (USB) port.
Figure 15C:
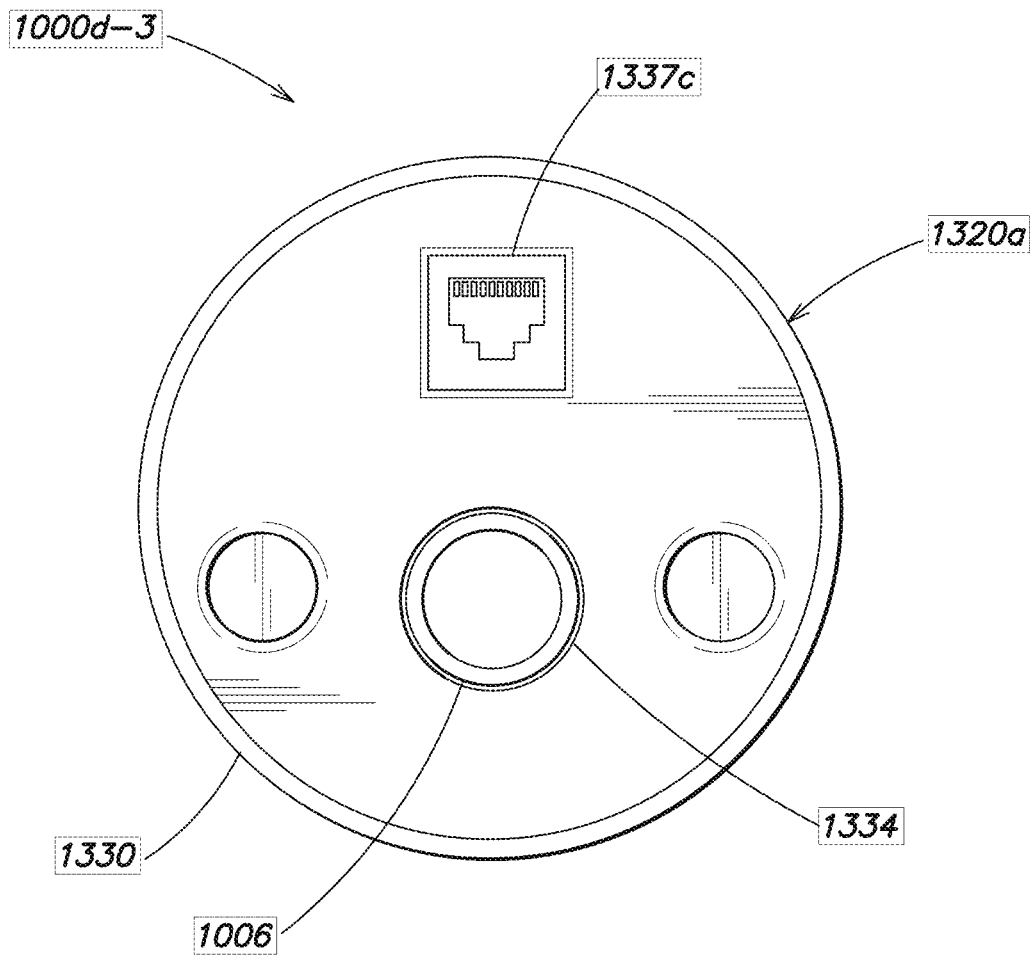
FIG. 15C shows a right-side view of an exemplary lighting fixture with a Power over Ethernet (PoE) port.

As described above, one or both of the end caps 1320a and 1320b may include an electrical feedthrough (e.g., electrical feedthrough 1335, electrical feedthrough opening 1355) to route an electrical cable into the cavity 1302 of the tube 1300 for electrical connection with the control circuitry 90 and/or the power board 91. In some implementations, the lighting fixture 1000a may instead have one or more power/communication ports disposed on one or both of the end caps 1320a and 1320b to receive and/or transmit power and/or data communication. The power/communication ports may be various types of ports including, but not limited to, a Power Line Carrier (PLC), RS-485, Power over Ethernet (PoE), Universal Serial Bus (USB), WiFi, and Bluetooth ports. FIGS. 15A-15C show several examples of a lighting fixture 1000a with different communication ports (a RS-485 port 1337a, a USB port 1337b, a PoE port 1337c) disposed on the end cap 1320a.

For example, the lighting fixture 1000a may include a power port to supply auxiliary DC power to one or more auxiliary devices coupled to the lighting fixture 1000a, such as a sensor or camera, or another lighting fixture 1000a. In another example, the lighting fixture 1000a may include a communications port to transmit various signals (e.g., commands, data) to and/or from the auxiliary devices (e.g., the sensor or camera, another lighting fixture 1000a). In another example, the lighting fixture 1000a may include a combined power and communications port to receive electrical power and/or transmit various signals (e.g., a PLC port).

The lighting fixture 1000a may receive various signals and the control circuitry 90 may adjust various operating parameters based on the signals including, but not limited to, adjustments to electrical power (e.g., high voltage and low voltage modes), adjustments to the total or spectral intensity of radiation emitted by the LED modules 410a, turning on or off the LED modules 410a, adjusting the rate at which the intensity of radiation changes in the LED modules 410a, adjustments to the spectral content of the emitted radiation (e.g., directing more power to blue or red LED elements), requests for lighting fixture conditions, and commands to operate auxiliary sensor devices (e.g., frequency of data recording). The lighting fixture 1000a may also send or transmit various status and monitoring including, but not limited to, operating status or mode, electrical power consumption, temperature, and data measured by internal or auxiliary sensor devices.

Figure 13B:
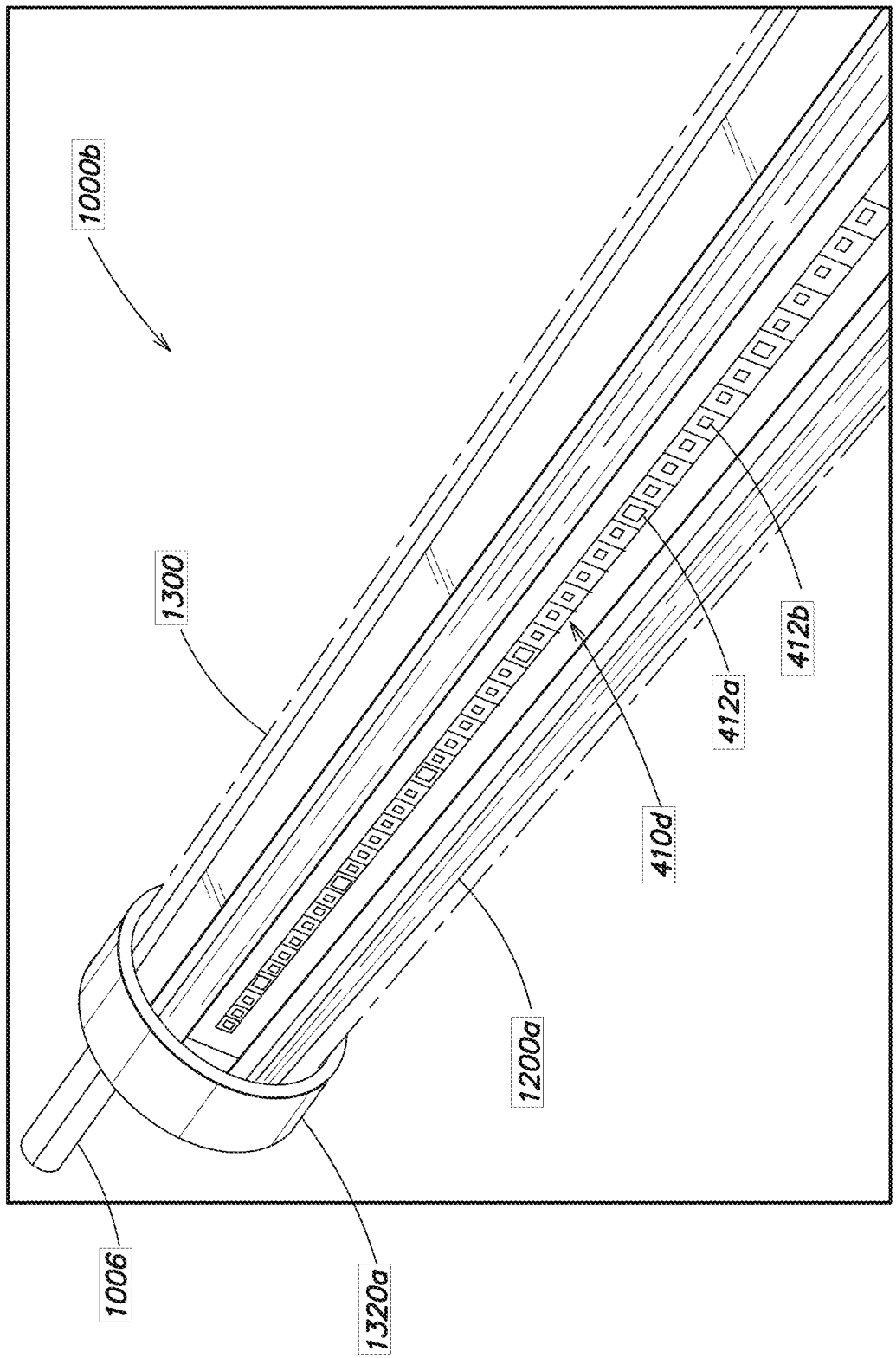
FIG. 13B shows a bottom perspective view of a LED module mounted to a frame disposed within a tube in the lighting fixture of FIGS. 13A-1 and 13A-2.
Figure 13C:
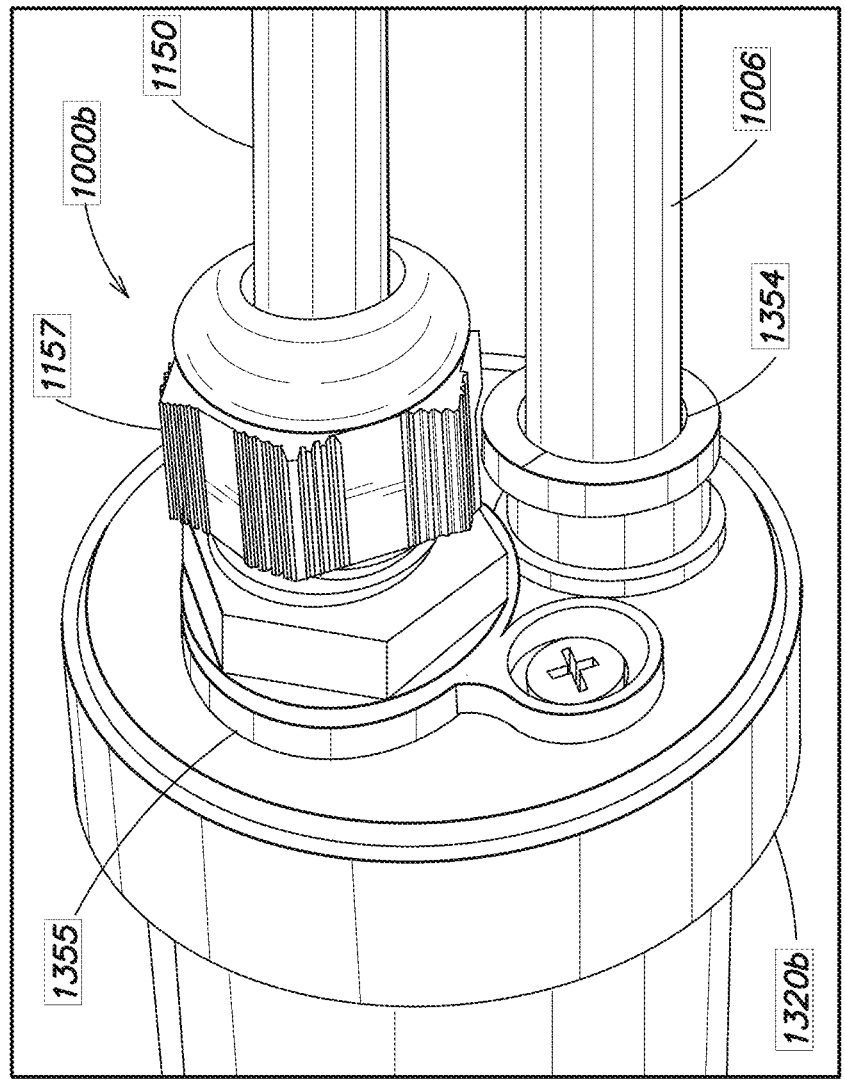
FIG. 13C shows a top perspective view of a second end cap mounted to a tube and a pipe in the lighting fixture of FIGS. 13A-1 and 13A-2.
Figure 13D:
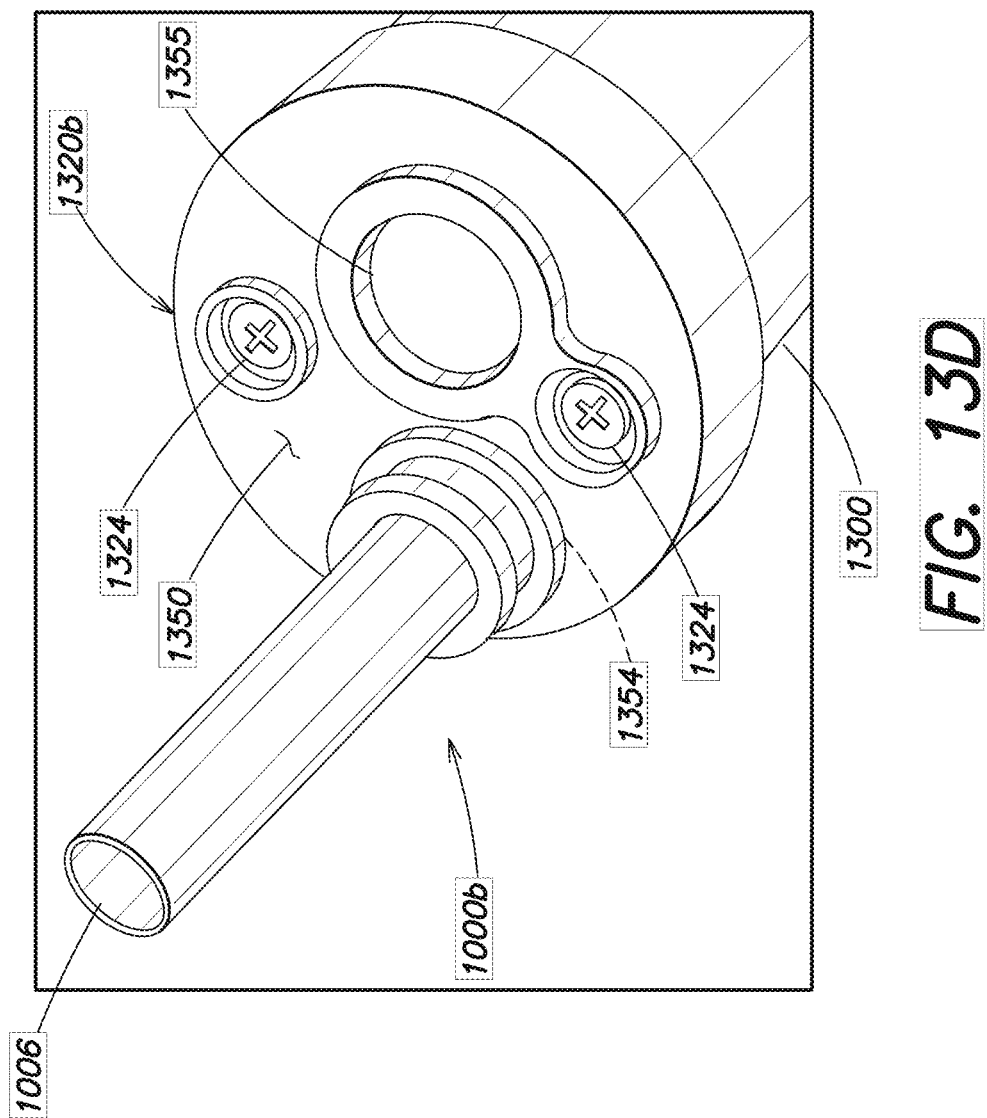
FIG. 13D shows a top perspective view of the lighting fixture of FIG. 13C with a cable and a feedthrough connector removed.
Figure 13E:
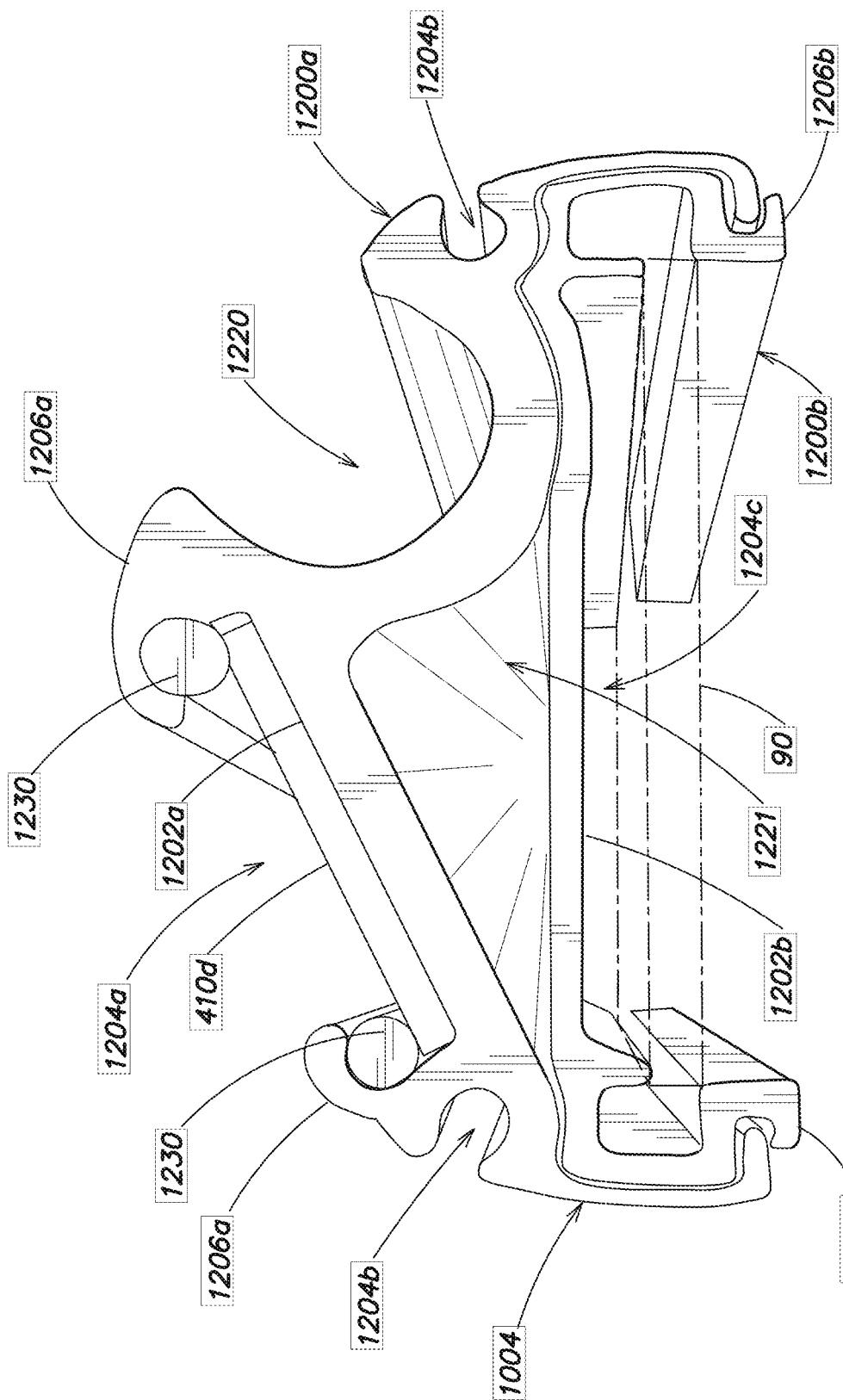
FIG. 13E shows a right-side view of a frame and the LED module in the lighting fixture of FIGS. 13A-1 and 13A-2.

FIGS. 13A-1-13E show several views of another lighting fixture 1000b. Similar to the lighting fixture 1000a, the lighting fixture 1000b may include a frame 1004 to support one or more LED modules 410d and control circuitry 90. The frame 1004 may further support a coolant pipe 1006 to cool the LED modules 410d during operation. The lighting fixture 1000b may further include a tube 1300 with respective ends covered by end caps 1320a and 1320b (note: only the end cap supports 1350 are shown).

The combination of the tube 1300 and the end caps 1320a and 1320b may once again provide an enclosure to contain the frame 1004, the LED modules 410d, the control circuitry 90, and a portion of the coolant pipe 1006. In this example, the end cap 1320b may include an electrical feedthrough opening 1355 with a threaded connector 1157 to securely couple an electrical cable to the lighting fixture 1000b. The electrical cable may be routed through the electrical feedthrough opening 1355 and secured via the threaded connector 1157. The threaded connector 1157 may also support a power and/or communications port to couple the electrical cable to the lighting fixture 1000b.

FIG. 13E shows the frame 1004 may include a first frame component 1200a and a second frame component 1200b. The first frame component 1200a may provide a mounting channel 1204a on a first side 1202a to support the LED modules 410d. As before, the mounting channel 1204a may be defined, in part, by the ridges 1206a. In this example, the mounting channel 1204a may be shaped and/or dimensioned such that wedges 1230 may be disposed and coupled to the ridges 1206a to press and secure the LED module 410d to the first frame component 1200a, in part, to increase thermal contact. The wedge(s) 1230 may be mechanically compliant components.

The first frame component 1200a may further include a second side 1202b with ridges 1206b that define, in part, a mounting channel 1204c to couple to a second frame component 1200b carrying the control circuitry 90. The second frame component 1200b may be slidably coupled to the mounting channel 1204c and may further define a separate mounting channel to couple to the control circuitry 90. In some implementations, the second frame component 1200b may instead be snap-fit and/or press-fit into the mounting channel 1204c.

The first frame component 1200a may include a coolant channel 1220 that is disposed at one end of the first side 1202a to receive the coolant pipe 1006. The assembly of the first frame component 1200a and the second frame component 1200b may also define a center channel 1221, which reduces the weight of the lighting fixture 1000b, the amount of material used for manufacture, and/or provides a thermal barrier to increase the thermal resistance between the LED modules 410d and the control circuitry 90 to reduce heating of the control circuitry 90.

For the lighting fixtures 1000a and 1000b, the LED modules 410a-410d are shown in FIGS. 2A-2I and 13A-13E to be disposed on one side of the first frame component 1200a. However, it should be appreciated that the LED modules may also be disposed on different sides of the frame to emit radiation with a larger angular distribution compared to lighting fixtures where the LED modules are disposed only on one side of the frame. Said in another way, each LED module may have a particular field of view within which radiation is emitted. By placing LED modules on different sides of the frame, the lighting fixture may provide radiation covering a larger area. For example, the lighting fixture may have multiple LED modules disposed on different sides of a frame to provide bi-directional (e.g., interlighting), tri-directional, or quad-directional illumination.

In some implementations, the lighting fixture may include two LED modules disposed on opposing sides of a frame to emit radiation in opposing directions. If the two LED modules have a field of view of a hemisphere (i.e., the field of view is equal to a steradians or the field of view has a 180 degree angular distribution), the lighting fixture may provide substantially omni-directional illumination of the plants. For example, the lighting fixture may be hung from a ceiling in a vertical orientation to illuminate two or more walls of plants where the plants are grown on the vertical surfaces of the walls. In another example, the controlled agricultural environment may include a cylindrical wall where the plants are grown. The lighting fixture may be positioned along a center axis of the cylindrical wall to provide omni-directional lighting of all the plants disposed on the cylindrical wall.

Figure 14:
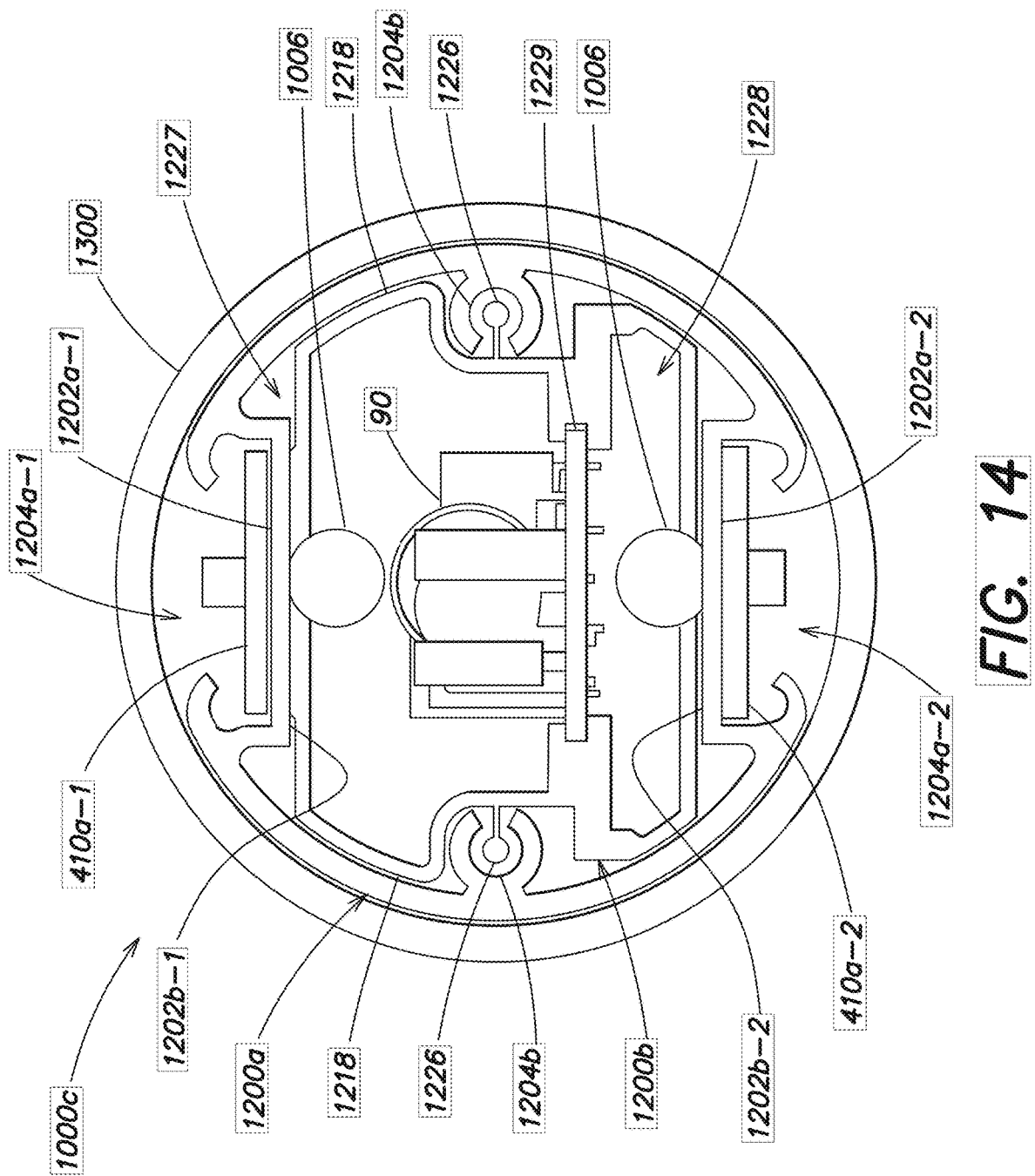
FIG. 14 shows a cross-sectional view of another exemplary lighting fixture providing bi-directional lighting (inter-lighting).

In some implementations, multi-directional emission of radiation may be accomplished, in part, by constructing the frame from multiple frame components. For example, FIG. 14 shows an exemplary lighting fixture 1000c configured to provide bi-directional lighting (interlighting). As shown, the lighting fixture 1000c may include a first frame component 1200a with a first exterior side 1202a-1 to support a LED module 410a-1 via a first exterior mounting channel 1204a-1 and a second exterior side 1202a-2 opposite the first exterior side 1202a-1 to support a LED module 410a-2 via a second exterior mounting channel 1204a-2. The first frame component 1200a may further include a first interior side 1202b-1 and a second interior side 1202b-2 that each support a coolant pipe 1006 (i.e., the lighting fixture 1000c may have two coolant pipes 1006). The first and second mounting channels 1204a-1 and 1204a-2 may be coupled together via side ribs 1218. As before, each side rib 1218 may still form a mounting channel 1204b to couple a second frame component 1200b to the first frame component 1200a and/or couple respective end caps 1320a and 1320b to the first frame component 1200a.

The side ribs 1218 may further be shaped and/or dimensioned such that the first frame component 1200a defines a cavity 1227 separating the first interior side 1202b-1 from the second interior side 1202b-2. In some implementations, the first frame component 1200a may be split into two separate components to facilitate assembly, in particular, the press-fit of the coolant pipes 1006 to the first frame component 1200a. The pair of frame components may then be coupled together using various coupling mechanisms including, but not limited to, a screw fastener, a bolt fastener, adhesive, a clip, and a clamp.

FIG. 14 shows the second frame component 1200b may be inserted into the cavity 1227 and slidably coupled to the first frame component 1200a via the rails 1226 disposed on the second frame component 1200b that engage the mounting channels 1204b. The second frame component 1200b, in turn, may define a cavity 1228 to contain the control circuitry 90 via mounting channels 1229. Thus, the control circuitry 90 may remain disposed between the coolant pipes 1006 and, by extension, the LED modules 410a-1 and 410a-2. In some implementations, the control circuitry 90 may be sandwiched between the coolant pipes 1006 to reduce or, in some instances, prevent heating of the control circuitry 90 by the LED modules 410a-1 and 410a-2.

FIG. 14 further shows the tube 1300 may contain the first frame component 1200a, the second frame component 1200b, the LED modules 410a-1 and 410a-2, and the control circuitry 90 as before. It should be appreciated the dimensions of the tube 1300, the first frame component 1200a, the second frame component 1200b, and the coolant pipes 1006 may be adjusted to fit within the cavity 1302 of the tube 1300.

Figure 16A:
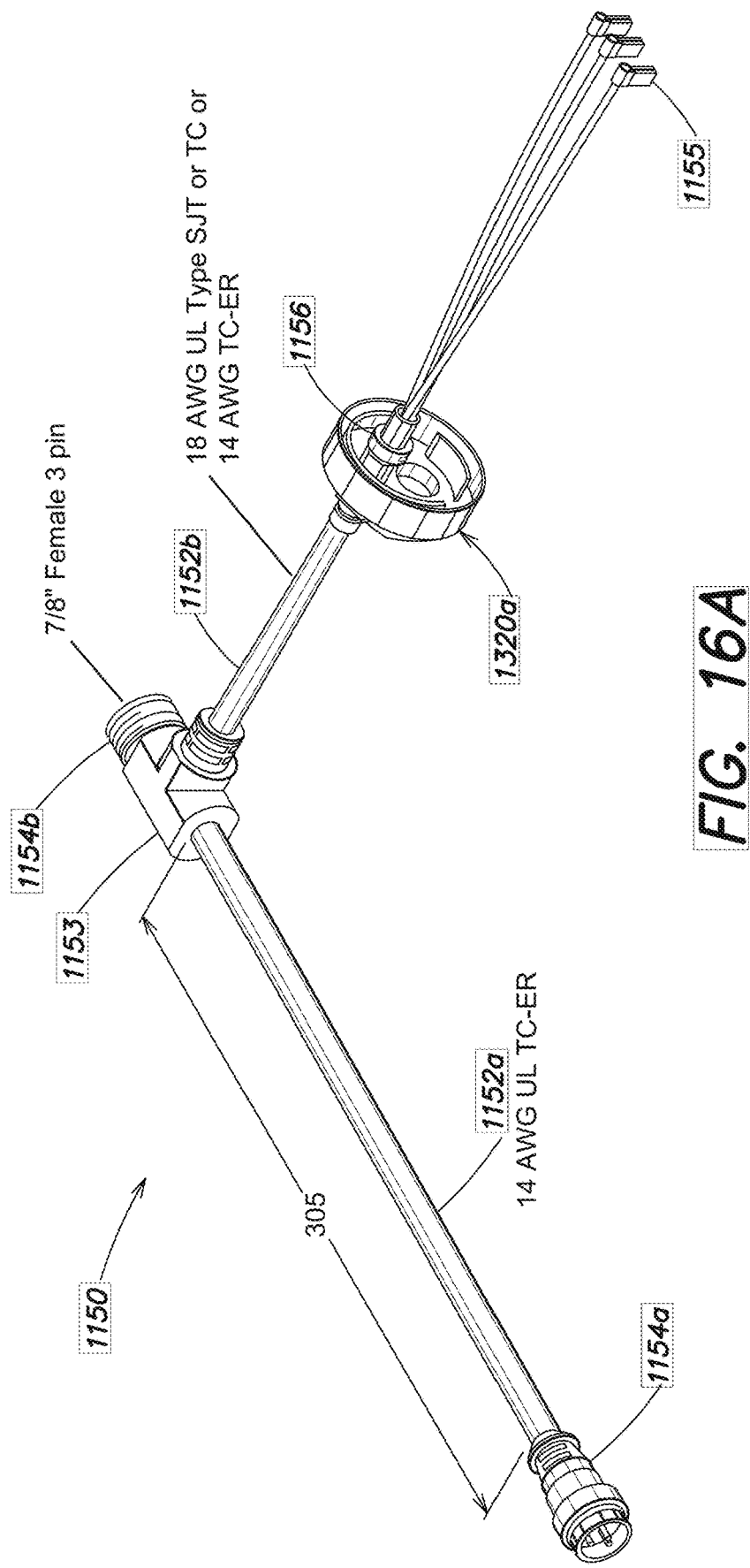
FIG. 16A shows a perspective view of another exemplary electrical cable assembly with flag connectors.
Figure 16B:
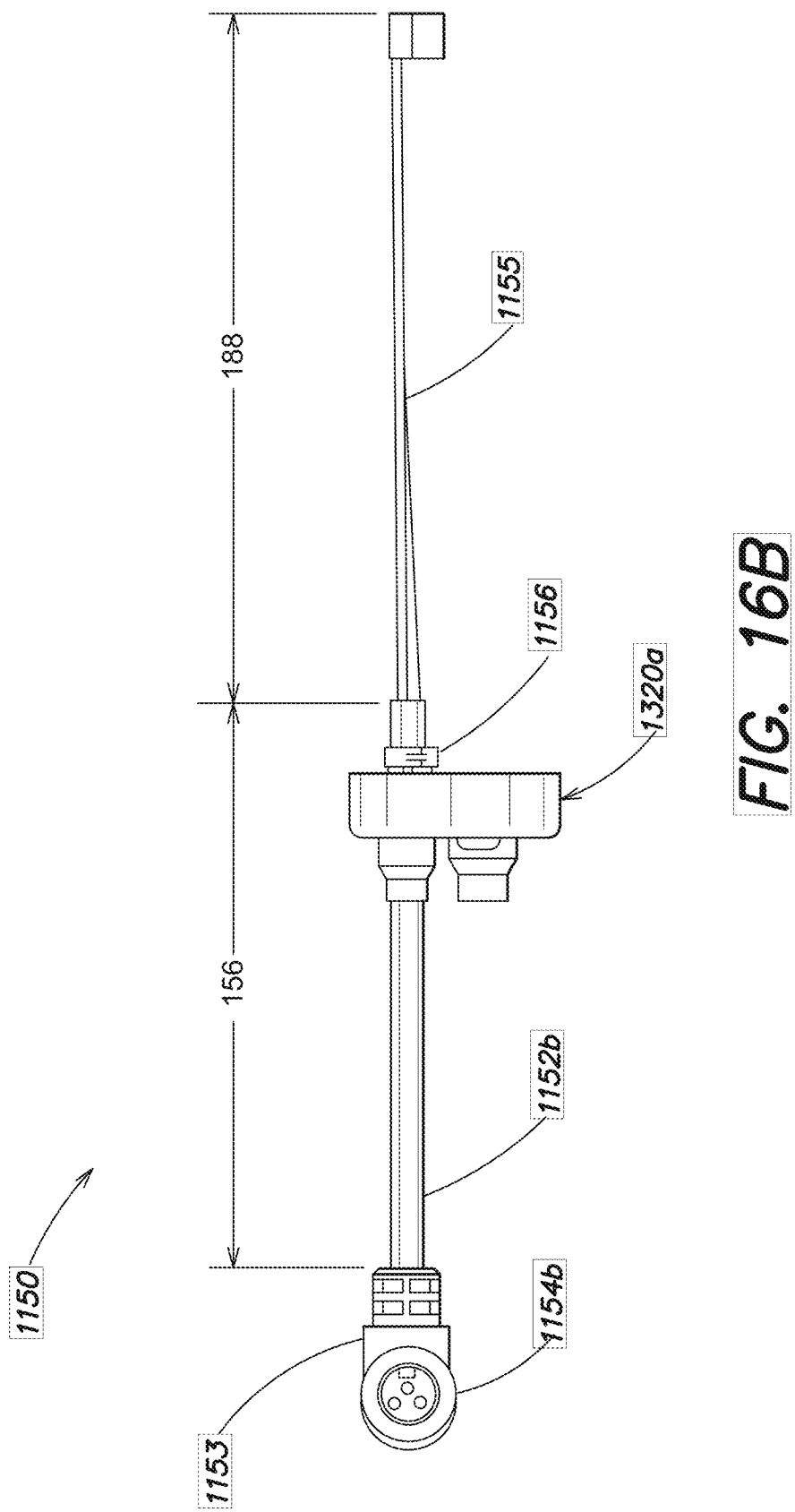
FIG. 16B shows a side view of the electrical cable assembly of FIG. 16A.
Figure 16C:
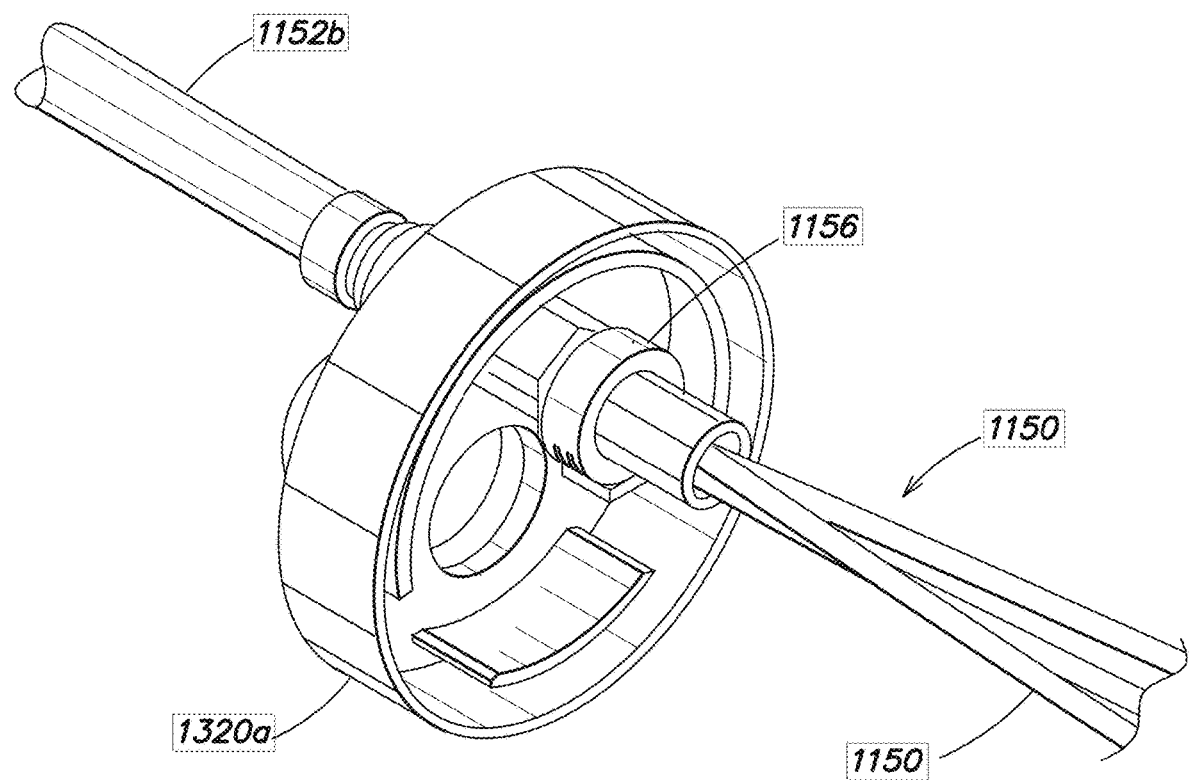
FIG. 16C shows a magnified view of the electrical cable assembly of FIG. 16A fed through an end cap in the lighting fixture of FIG. 2A.

FIGS. 16A-16C show an exemplary electrical cable assembly 1150 partially routed through an end cap 1320a in the lighting fixture 1000a. The electrical cable assembly 1150 may generally provide AC power supplied at a voltage ranging between 208 V to 277 V and a current ranging between 15 A and 30 A. As shown, the electrical cable 1150 may include a drop tee connector 1153 to facilitate connection to multiple lighting fixtures 1000a or 1000b. The drop tee connector 1153 may include a first cable section 1152a with a male connector 1154a, a female connector 1154b directly disposed on the drop tee connector 1153, and a second cable section 1152b for the lighting fixture. The second cable section 1152b may pass through the electrical feedthrough 1335 of the end cap cover 1330 and the electrical feedthrough opening 1355 of the end cap support 1350. In some implementations, the cable section 1152b may include one or more flag connectors 1155 for connection to the control circuitry 90 and/or the power board 91.

In some implementations, the end cap 1320a may include a sleeve disposed within the cavity 1302 of the tube 1300 where a portion of the cable section 1152b passes through the sleeve. FIG. 28C shows a clamp 1156 may securely couple the cable section 1152b to the sleeve, in part, to prevent the cable section 1152b from being pulled out from the end cap 1320a.

In some implementations, the electrical cable assembly 1150 and the end cap 1320a may be assembled together before the end cap 1320a is installed on the frame 1004 and/or the tube 1300. Said in another way, the electrical cable assembly 1150 and, in particular, the cable section 1152b may be coupled to the end cap 1320a separately before assembly with the other components of the lighting fixtures 1000a and 1000b.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

The above-described embodiments can be implemented in multiple ways. For example, embodiments may be implemented using hardware, software or a combination thereof. When implemented in software, the software code can be executed on a suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in a suitable form, including a local area network or a wide area network, such as an enterprise network, an intelligent network (IN) or the Internet. Such networks may be based on a suitable technology, may operate according to a suitable protocol, and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Some implementations may specifically employ one or more of a particular operating system or platform and a particular programming language and/or scripting tool to facilitate execution.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A fluid-cooled LED-based lighting fixture for an agricultural environment, the lighting fixture comprising:
   a frame having a coolant channel;
   at least one LED light source, coupled to the frame, to emit radiation;
   control circuitry, coupled to the frame and electrically coupled to the at least one LED light source, to receive AC power and to control the at least one LED light source;
   a tube defining a cavity with a first open end and a second open end, the cavity containing the frame, the at least one LED light source, and the control circuitry, the tube being transparent to the radiation;
   a first end cap disposed at the first open end of the tube and coupled to the frame;
   a second end cap disposed at the second open end of the tube and coupled to the frame, the first and second end caps enclosing the cavity of the tube; and
   a coolant pipe, at least partially disposed in and thermally coupled to the coolant channel of the frame, to carry a fluid coolant that extracts heat generated by the at least one LED light source during operation of the lighting fixture, the coolant pipe passing through a first fluidic feedthrough in the first end cap and a second fluidic feedthrough in the second end cap,
   wherein:
   the coolant pipe is formed from copper; and
   the coolant pipe is press fit into the coolant channel of the frame.

2. The lighting fixture of claim 1, wherein the tube has a cross-sectional shape, in a plane parallel to the first and second open ends of the tube, that is at least one of a circle, a semi-circle, an ellipse, or a polygon.

3. The lighting fixture of claim 2, wherein:
the cross-sectional shape of the tube is a circle; and
when the lighting fixture is deployed in the agricultural environment and coupled to a support structure, the lighting fixture is at least one of rotatably adjustable or translationally adjustable with respect to the support structure such that the radiation emitted by the at least one LED light source is redirected onto different portions of the agricultural environment when the lighting fixture is moved with respect to the support structure.

4. The lighting fixture of claim 3, wherein the lighting fixture is rotatably adjustable with respect to the support structure about a longitudinal axis of the tube.

5. The lighting fixture of claim 3, wherein the lighting fixture is coupled to the support structure via at least one of a pin joint or a slider joint.

6. The lighting fixture of claim 1, wherein the tube has an exterior width of about 2 inches.

7. The lighting fixture of claim 6, wherein the tube has an exterior length of about 48 inches or about 96 inches.

8. The lighting fixture of claim 1, wherein the tube is formed from at least one of glass, polycarbonate, acrylic, or polymethylmethacrylate (PMMA).

9. The lighting fixture of claim 1, wherein the tube has a transmittance greater than or equal to 80% for ultraviolet radiation having wavelengths ranging between 170 nm and 400 nm.

10. The lighting fixture of claim 1, wherein the frame is coupled to the first and second end caps such that the tube does not physically contact the frame, the at least one LED light source, the control circuitry, and the coolant pipe.

11. The lighting fixture of claim 10, wherein:
the cavity of the tube further contains at least one of air, gas, or vacuum; and
the air, gas, or vacuum separating the tube from the frame, the at least one LED light source, the control circuitry, and the coolant pipe forms a thermal barrier that reduces transfer of the heat generated by the at least one LED light source during operation of the lighting fixture to the agricultural environment.

12. The lighting fixture of claim 1, wherein:
the frame thermally expands due to the heat generated by the at least one LED light source during operation of the lighting fixture such that a first length of the frame changes relative to a second length of the tube; and
the first and second end caps deform in response to the relative change in the first and second lengths so as to remain coupled to the frame and the tube.

13. The lighting fixture of claim 1, wherein the cavity is sufficiently sealed such that water does not infiltrate into the cavity when water washes over the lighting fixture.

14. The lighting fixture of claim 13, wherein water does not infiltrate into the cavity when the lighting fixture is submerged in water.

15. The lighting fixture of claim 1, wherein:
the first end cap comprises:
an end cap cover having a first sidewall that defines a first cavity to receive the tube and the frame; and
an end cap support, disposed within the first cavity of the end cap cover and coupled to the frame, having a second sidewall that is concentrically aligned with the first sidewall such that the first and second sidewalls form a clamp to couple the first end cap to the tube; and
the tube is disposed between the first and second sidewalls.

16. The lighting fixture of claim 15, wherein the end cap cover is formed from at least one of rubber, urethane, or silicone.

17. The lighting fixture of claim 15, wherein the end cap support is formed from at least one of glass-filled polycarbonate.

18. The lighting fixture of claim 1, wherein the frame further comprises:
a first frame component having a first side that couples to the at least one LED light source and a second side opposite the first side; and
a second frame component, coupled to the second side of the first frame component, to couple to the control circuitry.

19. The lighting fixture of claim 18, wherein:
the coolant channel is formed on the second side of the first frame component such that the coolant channel is disposed between the at least one LED light source and the control circuitry; and
the coolant pipe extracts the heat generated by the at least one LED light source during operation of the lighting fixture via heat conduction through the first frame component.

20. The lighting fixture of claim 18, wherein the first frame component is formed from aluminum.

21. The lighting fixture of claim 18, wherein the second frame component electrically isolates the control circuitry from the first frame component.

22. The lighting fixture of claim 18, wherein the second frame component is formed from plastic.

23. The lighting fixture of claim 18, wherein the first frame component further comprises:
a first mounting channel, formed on the first side, to slidably receive the at least one LED light source; and
a second mounting channel, formed on the second side, to slidably receive the second frame component.

24. The lighting fixture of claim 18, wherein:
the tube has an exterior length;
the first frame component spans the exterior length of the tube; and
the second frame component spans a portion of the length of the tube.

25. The lighting fixture of claim 1, wherein the coolant pipe is coated with nickel.

26. The lighting fixture of claim 1, wherein the coolant pipe has an exterior width less than or equal to about 0.5 inches.

27. The lighting fixture of claim 1, wherein:
the at least one LED light source comprises a plurality of LED light sources to emit the radiation; and
the radiation includes one or more wavelengths or wavelength bands.

28. The lighting fixture of claim 27, wherein the plurality of LED light sources comprises at least one of:
a red LED to emit red light;
a white LED to emit white light; or
a blue LED to emit blue light.

29. The lighting fixture of claim 28, wherein the radiation emitted by the red LED, the white LED, and the blue LED is independently adjustable via the control circuitry.

30. The lighting fixture of claim 1, wherein the at least one LED light source comprises:
a first LED light source having a first field of view and emitting first radiation within the first field of view to illuminate the agricultural environment; and
a second LED light source having a second field of view that does not overlap the first field of view and emitting second radiation within the second field of view to illuminate the agricultural environment.

31. The lighting fixture of claim 30, wherein a first optical axis of the first field of view and a second optical axis of the second field of view are oriented in opposing directions such that the first and second radiation provides interlighting of the agricultural environment.

32. The lighting fixture of claim 30, wherein the first and second fields of view are hemispherical in shape such that the first and second radiation provides omni-directional illumination of the agricultural environment.

33. The lighting fixture of claim 1, wherein:
the AC power is greater than or equal to about 175 W; and
the tube has an exterior width of about 2 inches and an exterior length of about 96 inches.

34. The lighting fixture of claim 1, wherein:
the AC power is greater than or equal to about 175 W; and
the lighting fixture illuminates a portion of the agricultural environment having a volume of about 35 cubic feet.

35. The lighting fixture of claim 1, wherein:
the at least one LED light source emits the radiation at a nominal intensity; and
the control circuitry includes a dimmer to controllably reduce the radiation down to about 1% of the nominal intensity.

36. The lighting fixture of claim 1, further comprising:
an alert indicator, electrically coupled to the control circuitry and disposed on an exterior surface of the frame that is perceivable by a user when the lighting fixture is installed in an agricultural environment, to provide at least one of a visual or audio alert when the lighting fixture meets a condition.

37. The lighting fixture of claim 36, wherein the condition is met when the lighting fixture overheats.

38. A fluid-cooled LED-based lighting fixture, comprising:
a frame, comprising:
a first frame component having a first side and a second side, opposite the first side, having a coolant channel formed therein, the first frame component having at least first one mounting channel; and
a second frame component having at least one rail to slidably couple the second frame component to the at least one first mounting channel of the first frame component;
at least one LED light source, coupled to the first frame component, to emit radiation;
control circuitry, coupled to and mechanically supported by the second frame component and electrically coupled to the at least one LED light source, to receive AC power and to control the at least one LED light source; and
a coolant pipe, at least partially disposed in and thermally coupled to the coolant channel of the first frame component, to carry a fluid coolant that extracts heat generated by the at least one LED light source,
wherein:
the first frame component thermally conducts the heat generated by the at least one LED light source to the coolant pipe;
the second frame component electrically isolates the control circuitry from the first frame component; and
the lighting fixture further comprises:
a tube defining a cavity with a first open end and a second open end, the cavity containing the frame, the at least one LED light source, the control circuitry, and at least a portion of the coolant pipe, the tube being transparent to the radiation;
a first end cap disposed at the first open end of the tube and coupled to the frame, the first end cap having a first fluidic feedthrough through which the coolant pipe passes through; and
a second end cap disposed at the second open end of the tube and coupled to the frame, the second end cap having a second fluidic feedthrough through which the coolant pipe passes through, the first and second end caps enclosing the cavity of the tube,
wherein the frame is coupled to the first and second end caps such that the tube only physically contacts the first and second end caps.

39. The lighting fixture of claim 38, wherein:
the first frame component has a first length; and
the second frame component has a second length less than the first length.

40. The lighting fixture of claim 38, wherein:
the cavity of the tube further contains at least one of air, gas, or vacuum; and
the air, gas, or vacuum separating the tube from the frame, the at least one LED light source, the control circuitry, and the coolant pipe forms a thermal barrier that reduces transfer of the heat generated by the at least one LED light source during operation of the lighting fixture to an agricultural environment.

41. The lighting fixture of claim 38, wherein:
the frame thermally expands due to the heat generated by the at least one LED light source during operation of the lighting fixture such that a first length of the frame changes relative to a second length of the tube; and
the first and second end caps deform in response to the relative change in the first and second lengths so as to remain coupled to the frame and the tube.

42. The lighting fixture of claim 38, wherein:
the cross-sectional shape of the tube is a circle; and
when the lighting fixture is deployed in an agricultural environment and coupled to a support structure, the lighting fixture is at least one of rotatably adjustable or translationally adjustable with respect to the support structure such that the radiation emitted by the at least one LED light source is redirected onto different portions of the agricultural environment when the lighting fixture is moved with respect to the support structure.

43. A fluid-cooled LED-based lighting fixture, comprising:
a frame having a coolant channel;
at least one LED light source, coupled to the frame, to emit radiation;
control circuitry, coupled to the frame and electrically coupled to the at least one LED light source, to receive an electrical power input and to control the at least one LED light source, the electrical power input being greater than or equal to about 175 W; and
a coolant pipe, at least partially disposed in and thermally coupled to the coolant channel of the frame, to carry a fluid coolant that extracts heat generated by the at least one LED light source during operation of the lighting fixture,
wherein:
the coolant pipe is formed from copper;
the coolant pipe is press fit into the coolant channel of the frame; and
the frame, the at least one LED light source, the control circuitry, and at least a portion of the coolant pipe are dimensioned to fit within a tube having an exterior diameter of about 2 inches and an exterior length of about 96 inches.

44. The lighting fixture of claim 43, further comprising:
the tube defining a cavity to contain the frame, the at least one LED light source, the control circuitry, and at least a portion of the coolant pipe.

45. The lighting fixture of claim 44, wherein:
the tube has a first open end and a second open end; and
the lighting fixture further comprises:
   a first end cap disposed at the first open end of the tube and coupled to the frame, the first end cap having a first fluidic feedthrough through which the coolant pipe passes through; and
   a second end cap disposed at the second open end of the tube and coupled to the frame, the second end cap having a second fluidic feedthrough through which the coolant pipe passes through, the first and second end caps enclosing the cavity of the tube.

46. The lighting fixture of claim 45, wherein the frame is coupled to the first and second end caps such that the tube does not physically contact the frame, the at least one LED light source, the control circuitry, and the coolant pipe.

47. The lighting fixture of claim 46, wherein:
the cavity of the tube further contains at least one of air, gas, or vacuum; and
the air, gas, or vacuum separating the tube from the frame, the at least one LED light source, the control circuitry, and the coolant pipe forms a thermal barrier that reduces transfer of the heat generated by the at least one LED light source during operation of the lighting fixture to an agricultural environment.

48. The lighting fixture of claim 45, wherein:
the frame thermally expands due to the heat generated by the at least one LED light source during operation of the lighting fixture such that a first length of the frame changes relative to a second length of the tube; and
the first and second end caps deform in response to the relative change in the first and second lengths so as to remain coupled to the frame and the tube.

49. The lighting fixture of claim 44, wherein:
the cross-sectional shape of the tube is a circle; and
when the lighting fixture is deployed in the agricultural environment and coupled to a support structure, the lighting fixture is at least one of rotatably adjustable or translationally adjustable with respect to the support structure such that the radiation emitted by the at least one LED light source is redirected onto different portions of the agricultural environment when the lighting fixture is moved with respect to the support structure.

50. A fluid-cooled LED-based lighting fixture for an agricultural environment, comprising:
   a frame having a coolant channel;
   at least one white LED light source, coupled to the frame, to emit photosynthetically active radiation (PAR) at a first intensity;
   control circuitry, coupled to the frame and electrically coupled to the at least one white LED light source, to receive an electrical power input and to control the at least one white LED light source, the electrical power input being greater than or equal to about 175 W, the control circuitry including a dimmer to controllably reduce the first intensity of the PAR to a second intensity less than the first intensity;
   a tube defining a cavity with a first open end and a second open end, the cavity containing the frame, the at least one white LED light source, and the control circuitry, the tube further containing one of air, gas, or vacuum physically separating the tube from the frame, the at least one white LED light source, and the control circuitry to form a thermal barrier that reduces transfer of heat generated by the at least one white LED light source during operation of the lighting fixture to the agricultural environment, the tube being transparent to the radiation, the tube having an exterior diameter of about 2 inches and an exterior length of about 96 inches;
   a first end cap disposed at the first open end of the tube and coupled to the frame;
   a second end cap disposed at the second open end of the tube and coupled to the frame, the first and second end caps enclosing the cavity of the tube; and
   a coolant pipe, at least partially disposed in and thermally coupled to the coolant channel of the frame, to carry a fluid coolant that extracts heat generated by the at least one white LED light source during operation of the lighting fixture, the coolant pipe passing through a first fluidic feedthrough in the first end cap and a second fluidic feedthrough in the second end cap.

\* \* \* \* \*